(12) United States Patent
Tofsted et al.

(10) Patent No.: US 9,998,694 B2
(45) Date of Patent: *Jun. 12, 2018

(54) PASSIVE IMAGING CORRECTION METHOD USING FEEDBACK

(71) Applicant: U.S. Army Research Laboratory, Adelphi, MD (US)

(72) Inventors: David H Tofsted, Las Cruces, NM (US); Sean G O'Brien, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/684,755

(22) Filed: Apr. 13, 2015

(65) Prior Publication Data

US 2015/0229854 A1   Aug. 13, 2015

Related U.S. Application Data

(62) Division of application No. 13/667,048, filed on Nov. 2, 2012, now Pat. No. 9,006,633.

(51) Int. Cl.
*H04N 5/357* (2011.01)
*G03B 7/085* (2006.01)
(Continued)

(52) U.S. Cl.
CPC ............. *H04N 5/357* (2013.01); *G02B 26/00* (2013.01); *G02B 26/06* (2013.01); *G03B 7/085* (2013.01);
(Continued)

(58) Field of Classification Search
CPC ........ G06T 5/001; G02B 26/00; G02B 26/06; G03B 7/085; H04N 5/238; H04N 5/357; H04N 5/2254; H04N 5/255; H01L 27/00
(Continued)

(56) References Cited

U.S. PATENT DOCUMENTS 5,392,094 A * 2/1995 Kudo .................. G03F 7/70075
355/55
6,163,381 A * 12/2000 Davies ...................... G01J 9/00
356/521
(Continued)

*Primary Examiner* — Steven H Whitesell Gordon
*Assistant Examiner* — Jerry Brooks
(74) *Attorney, Agent, or Firm* — Lawrence E. Anderson

(57) ABSTRACT

A method for image processing comprising providing an opening for entrance of light; the light being capable of being formed into an image; providing at least one optical element in an optical train configured to focus light; providing a variable aperture operatively associated with the at least one optical element; the variable aperture being placed in the optical train at an image plane and comprising mask settings for shielding portions of the light; providing an imager; providing at least one processor operatively connected to the variable aperture and imager; the at least one processor configured to control the passage of the light through the variable aperture; selectively masking portions of light using the mask settings of the variable aperture; obtaining image results using the settings; comparing image results obtained by the mask settings, and determining the phase correction that provides the optimal image results.

20 Claims, 36 Drawing Sheets

(51) Int. Cl.
*G02B 26/00* (2006.01)
*H04N 5/225* (2006.01)
*H04N 5/238* (2006.01)
*G02B 26/06* (2006.01)
*G06T 5/00* (2006.01)

(52) U.S. Cl.
CPC ........... *G06T 5/001* (2013.01); *H04N 5/2254* (2013.01); *H04N 5/238* (2013.01)

(58) Field of Classification Search
USPC ....................................... 250/208.1; 353/122
See application file for complete search history.

(56) References Cited

U.S. PATENT DOCUMENTS

| | | | |
|---|---|---|---|
| 7,038,791 B2* | 5/2006 | Smith | G01J 1/4257 |
| | | | 356/520 |
| 7,635,832 B2* | 12/2009 | Dean | G01M 11/005 |
| | | | 250/201.7 |
| 2004/0208595 A1* | 10/2004 | Mok | H04B 10/1125 |
| | | | 398/128 |
| 2005/0045801 A1* | 3/2005 | Smith | G01J 9/00 |
| | | | 250/201.9 |
| 2005/0151961 A1* | 7/2005 | McGraw | G01J 1/02 |
| | | | 356/121 |

* cited by examiner

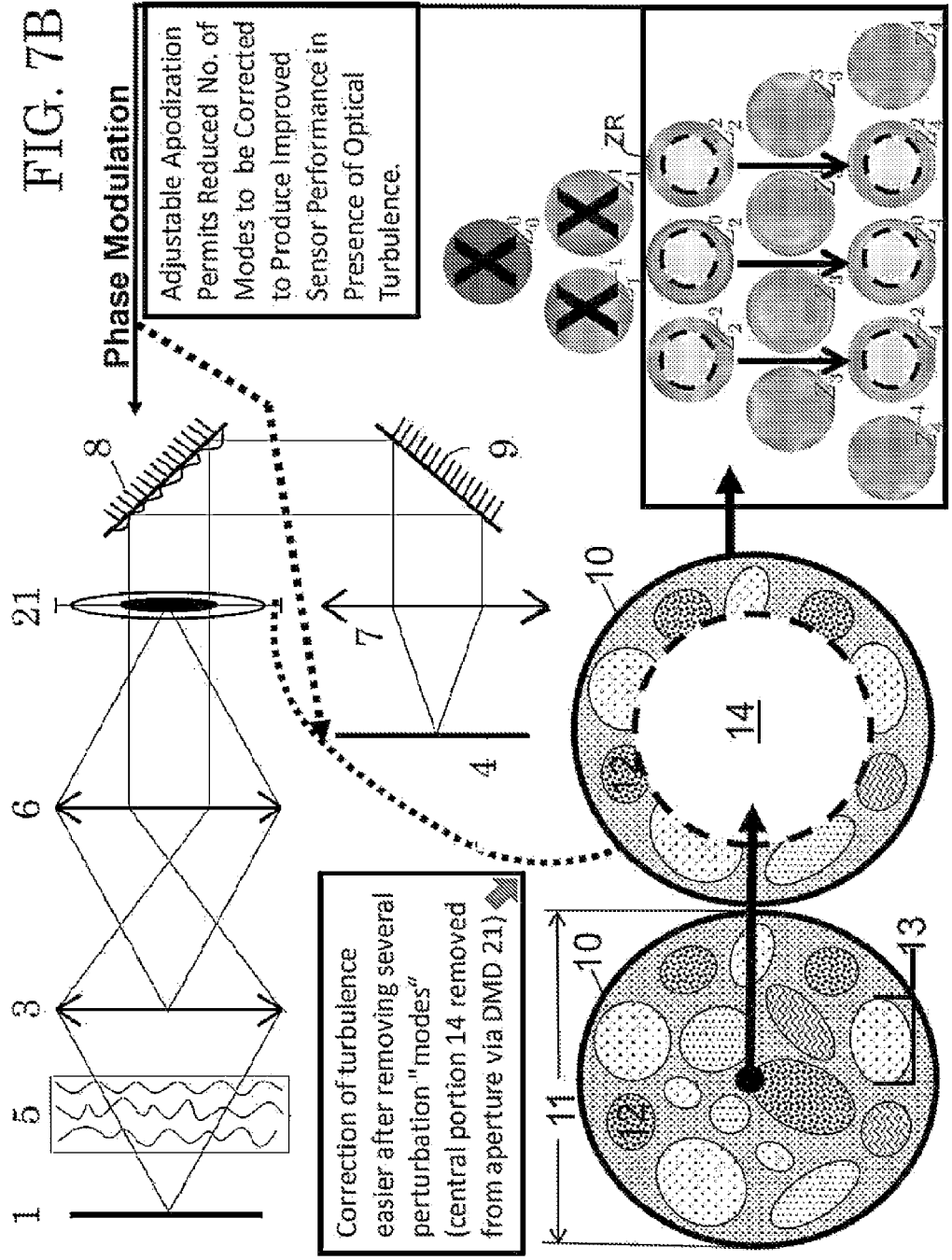

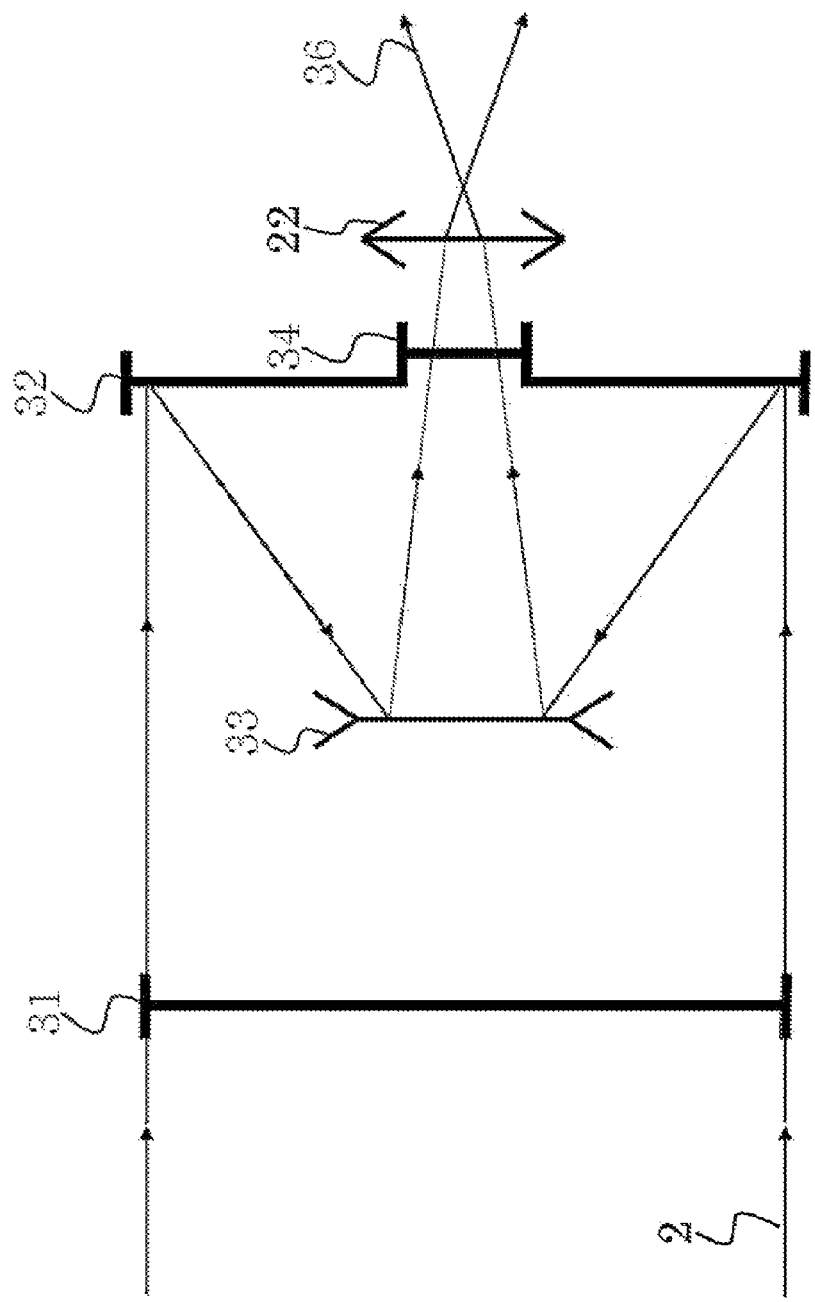

No secondary mirror central obscuration

| PASSIVE ANALYSIS OF SCENE CONTENT AND OPTIMIZATION USING BASIC OPTICS SYSTEM (e.g. lenses, mirrors, and stops) PLUS THREE ADDITIONAL ELEMENTS WHICH CAN BE USED ALONE OR IN COMBINATION WITH ONE ANOTHER |
|---|
| 1- Digital micro-mirror device interfaced and connected to a computer or microprocessor control unit into the optical path; adapts the shape of the wave front that is permitted to pass through the optical train to the final lens and be focused onto the image plane.(Suitably interfaced and connected to a computer or microprocessor control unit into the optical path). |
| 2 -Spatial light modulator (SLM) in optical path interfaced to a computer or microprocessor control unit. The SLM controls phase of light across wave front (suitably interfaced to a computer or processor) or microprocessor control unit into the optical path. |
| 3. Feedback control circuit designed to test the current state of clarity of the images being produced by the current settings of the optical adjustments of the first and second elements. Based on the latest observed clarity, previously tested settings, and a controller algorithm connected between the feedback circuit and the controlling algorithms running the first and second elements, the computer invokes a series of corrective adjustments to the first two elements, seeking a best fit to optimize the wave front conjugation that mitigates the effects of diffraction, propagation, and turbulent distortions. |

FIG.29

PASSIVE IMAGING CORRECTION METHOD USING FEEDBACK

CROSS REFERENCE TO RELATED APPLICATIONS

This application is a divisional application of and claims priority to U.S. patent application Ser. No. 13/667,048, entitled "Passive Imaging Correction System Using Feedback and Method Thereof," by David H. Tofsted and Dr. Sean G. O'Brien, filed Nov. 2, 2012, herein incorporated by reference in its entirety.

STATEMENT OF GOVERNMENT INTEREST

The embodiments herein may be manufactured, used, and/or licensed by or for the United States Government without the payment of royalties thereon.

BACKGROUND OF THE INVENTION

The present invention is directed to, inter alia, passive correction of turbulence affected incoherent imaging using an optical system (and methodology) for, inter alia, reducing the effects of short-exposure blur due to atmospheric optical turbulence.

Optical signals passing through a time varying inhomogeneous medium, such as the Earth's lower atmosphere, can become significantly distorted when propagating over ranges of even as short as several hundred meters. The primary mechanism of this distortion is due to temperature fluctuations driven by heating and cooling of the air which is most severe at the Earth's surface. In such cases, several optical distortion effects impact propagating optical waves and signals. Coherent propagation is significantly affected by turbulent scintillation (amplitude fluctuation) effects, and beam wander of propagating laser beams. For incoherent wave sources being viewed by passive imaging systems, three effects occur: Short exposure images show blurring of point sources in the object plane. Point objects also appear to wander in position due to angle-of-arrival variations. Thirdly, point sources separated by angular distances exceeding a characteristic value (the isoplanatic angle) appear to wander independently.

Systems for correcting for turbulence effects on imaging through use of an imaging system containing a Spatial Light Modulator (SLM) to modify the phase of the incoming radiation have been disclosed, such as, for example, M. A. Vorontsov, G. W. Carhart, and J. C. Ricklin, "Adaptive phase-distortion correction based on parallel gradient descent optimization," Opt. Lett. 22, 907-909 (1997) (hereby incorporated by reference) and G. W. Carhart, J. C. Ricklin, V. P. Sivokon, and M. A. Vorontsov, "Parallel perturbation gradient descent algorithm for adaptive wavefront correction," in Adaptive Optics and Applications, R. Tyson and R. Fugate, eds., Proc. SPIE 3126, 221-227 (1997) (hereby incorporated by reference). These methods described in these papers focus on two aspects: the use of a Spatial Light Modulator (or deformable mirror, which functions in a similar fashion) and use of the Parallel Gradient Descent (PGD) optimization method, which has now evolved to be known as the Stochastic Parallel Gradient Descent (SPGD) method.

Ground-to-ground imaging-through-turbulence problems essentially involve image blur, which is caused primarily by turbulence close to the system receiving aperture, and image distortion, which is due to turbulence weighted toward the target object that is under observation by the system. Because the atmospheric optical turbulence strength is greatest close to the ground, the dominant effect impacting ground-based imaging systems is turbulence-induced blur close to the system aperture. As used herein, the terminology "blur" signifies to make indistinct and hazy in outline or appearance, reducing high angular-frequency detail, as opposed to obscuration which affects contrast, which reduces all angular-frequency detail equally. As used herein, the terminology "distort" as it relates to optics means a change in the shape of an image resulting from variations in the perceived relative angular positions of different scene features of a given viewed object.

To correct for image blur, various system configurations have been proposed in past work. These usually involve active system implementations that feature some sort of illumination device to produce what is commonly known as a "guide star." A guide star is a compact illumination source of known geometry and phase that can be imaged through the turbulent atmosphere by the imaging system. The system then analyzes the propagated characteristics of this guide star and uses the results of this diagnosis to formulate a correction to the optical system. This correction always involves a deformable optical device, either a deformable mirror or a spatial light modulator (SLM). The guide star can be formed by an illumination beam propagated by the system itself, producing an illuminated spot in the object field of view, or by an illumination source placed in the imaged object field of view and oriented toward the receiver optics. The following patent materials rely on the use of guide stars and/or the use of a wave front sensor: U.S. Published Application No. 2004/0208595, Free Space Communication System with Common Optics and Fast, Adaptive Tracking, by Fai Mok and James Kent Wallace; U.S. Published Application No 2005/0045801, State Space Wavefront Reconstructor for an Adaptive Optics Control, by Carey A. Smith; U.S. Published Application No 2006/0049331, Adaptive Optics Control System, by Carey A. Smith; U.S. Pat. No. 7,038,791, Signal-to-Noise Ratio Tuned Adaptive Optics Control System, by Carey A. Smith; U.S. Published Application No 2010/0080453 A1, System for Recovery of Degraded Images, by Nicholas George; and U.S. Pat. No. 6,163,381, Dual Sensor Atmospheric Correction System, by Donald W. Davies, Mark Slater, and Richard A. Hutchin.

Unfortunately, there are several problems with the use of guide stars. First, a guide star approach is not a passive solution. Active systems that require the illumination of a target scene prior to detection of significant targets are not stealthy and are undesirable in most tactical situations that are of interest in a military situation. Second, many imaged objects may not have useful reflective properties that will work properly with an illumination beacon. To provide a proper guide star an object would need to have a corner reflecting or shallow convex specular surface (a "glint" target) nearby. Most natural objects are diffuse reflectors and thus do not return glints. Many man-made objects are also diffuse reflectors or have specular surfaces that are sharply curved and thus only return a very weak glint. Other alternatives, such as placing an illuminator in the object plane, requiring objects of interest to mount glint reflectors, or forming laser-induced fluorescence (LIF) guide stars on target surfaces are obviously not practical from an Army application standpoint. Another difficulty with the guide star approach is that the coherent propagating wave from a guide star is affected by turbulent scintillation, which is most strongly weighted at the center of the optical path, not at the system receiver. Thus the guide star method is not optimized to produce a useful result for removing turbulent blur.

Therefore, a means is needed to image objects through turbulent blur that does not require an active illumination beacon (a guide star) and is optimized to sense turbulent blur perturbations on imaged incoherent radiation.

As opposed to active wave front sensing techniques, U.S. Published Application No 2005/0151961, Surface Layer Atmospheric Turbulence Differential Image Motion Measurement, by John T. McGraw, Peter C. Zimmer, and Mark R. Ackermann simply attempts to sense the image distorting effects of the atmosphere without actually attempting to modify or correct for turbulence effects.

Two known exceptions to the general approach of active wave front sensing are Patent 2010/0053411 A1, Control of Adaptive Optics based on Post-Processing Metrics, by M. Dirk Robinson and David G. Stork, and the method proposed in G. W. Carhart, J. C. Ricklin, V. P. Sivokon, and M. A. Vorontsov, "Parallel perturbation gradient descent algorithm for adaptive wavefront correction," in Adaptive Optics and Applications, R. Tyson and R. Fugate, eds., Proc. SPIE 3126, 221-227 (1997). Both of these propose a system or a method to perform wavefront correction based on post-processing of received imagery to produce a metric that is then used in guiding the correction of images. The former proposed a system. The latter proposed a processing approach based on an algorithm. Both based their corrections on image analysis alone.

As indicated above, the guide star concept is generally not preferred in ground-to-ground imaging applications for blur correction. In assessing the impact of turbulence on boundary layer imaging, two observations are manifest. First, the turbulence that is causing the most image blur is close to the sensing aperture. Second, scene elements that are separated in the scene by a significant angular separation experience anisoplanatic effects limiting the ability of a system to correct turbulent image perturbations at large angular separation from the guide star. Anisoplanatism means that turbulent perturbations in different parts of the atmospheric field are causing different turbulent perturbations in different parts of an imaged scene. This effect impairs the performance of guide-star-based systems, because turbulent perturbations on the guide star wavefront in one part of the image frame are not the same turbulent perturbations that impact scene elements in another part of the image frame. Guide-star-based systems thus do not do well at correcting for turbulent blur in different parts of an imaged scene, underscoring the need for a passive method that can correct for turbulence sequentially in different parts of the image.

Unlike systems that rely on a coherent "guide star" signal to provide a sufficient density of photons to feed a wavefront detection process, atmospheric boundary layer imagers typically observe light emerging from a plurality of decorrelated emission sources. In particular, source points present on surfaces that are rough on the order of a single wavelength of the propagating radiation, will not produce a single coherent source even in a point source sense. In this instance a second type of solution to compensating for turbulence has been sought. This second form of solution involves a purely passive approach, of varying implementations, generally involving one or more post-imaging processing procedures for detected signals to remove the impacts of turbulence. One such algorithmic approach entails dewarping of the imaged field, to remove image distortion, based on analysis of the temporally varying apparent positions of objects. Another approach uses long-term averaging of images to essentially remove the angle-of-arrival variations followed by inverse filtering using a best-guess of the long-exposure atmospheric MTF. Various combinations of these two approaches can be constructed, including analysis of and segmentation of images to separately study constant regions of images and regions that are considered to be temporally evolving that may contain scene elements of interest. Many of these procedures fall under the category termed the "lucky pixel" or "lucky patch" method, initially proposed by D. L. Fried, "Probability of getting a lucky short-exposure image through turbulence," J. Opt. Soc. Am., 68:1651-1658 (1978). However, whereas Fried's initial proposal suggested capturing complete distortion free images, later implementations of this concept [e.g. Carhart, G. and M. Vorontsov, Opt. Lett. 23, 745-747 (1998) or Vorontsov, M., JOSA A 16, 1623-1637 (1999)] first segment the images into a series of sections, analyze each section separately to determine the relative clarity (spatial frequency content based on an image quality metric) of each, and then, on a section-by-section basis, proceed to composite a complete reduced-turbulence equivalent image as a mosaic. Unfortunately, for many terrestrial (ground-to-ground) imaging scenarios the probability of obtaining any portion of an image that is free of significant turbulence may be so small as to provide a negligible chance of obtaining a set of null-turbulence patches sufficient to construct an unperturbed image. One means of rapidly evaluating the overall quality of either an image portion or a complete imaged scene involves constructing a sum of squares of the normalized image scene pixels [N. Mahajan, J. Govignon, and R. J. Morgan, "Adaptive optics without wavefront sensors," SPIE Proc., 228, Active Optical Devices and Applications, 63-69 (1980)]. As Mahajan et al. explained, the variance of the image information is related to the area under the combined atmosphere plus system MTF. Using this metric, it is possible to gauge the level of spatial frequency energy in a scene. Also, while D. L. Fried, "Probability of getting a lucky short-exposure image through turbulence," J. Opt. Soc. Am., 68:1651-1658 (1978) focused on only the probability of detecting a lucky short-exposure image of a scene, a later study by R. E. Hufnagel, "The Probability of a Lucky Exposure," Tech. Memo. REH-0155, The Perkin-Elmer Corp. (1989) (hereby incorporated by reference) considered how this capability is enhanced for signals that have been partially corrected through the removal of an increasing number of phase perturbation aberration modes. In particular, Hufnagel considered cases involving 0 (short-exposure image only), 3 (2nd order aberrations), 7 (2nd and 3rd order aberrations) and 12 (2nd through 4th order aberrations corrected) modes compensated. Hufnagel's study, interpreted for the lucky patch problem, indicates that while the lucky patch method acting on a short-exposure image series could provide significant improvement for cases where the ratio of the diameter of the optics to the coherence radius (X=D/r0) is no more than three, by correcting 7 aberration modes, the lucky patch correction technique would be one million times more likely to find a lucky patch at X=10. This implies that the lucky patch approach could be extended to turbulence conditions ten times stronger (triple the range) of the baseline lucky patch method alone.

In U.S. Published Patent Application No. 2010/0053411, entitled "Control of Adaptive Optics based on Post Processing Metrics," by M. Dirk Robinson and David G. Stork, a system is proposed that performs wavefront correction, based on post-processing of received imagery to produce a metric that is then used in guiding the correction of images. The system appears to only apply to static targets.

However, it would appear that if one attempts to correct imagery based solely on analysis of received imagery, the number of phase perturbation aberration modes (expressed in terms of Zernike expansion functions [e.g. V. N. Mahajan, "Zernike annular polynomials and optical aberrations of systems with annular pupils," Appl. Opt. 33:8125-8127 (1994) or G.-M. Dai and V. N. Mahajan, "Zernike annular polynomials and atmospheric turbulence," J. Opt. Soc. Am. A 24:139-155 (2007)] present at the system aperture gives rise to a problem. That problem is a limitation on how frequently a given mode may be corrected given a specific rate of image collection by the optical system, in combination with the strength of aberration due to a specific mode. To assess the effective number of active perturbation modes present one must be able to evaluate the statistical state of the wavefront present at the system aperture. D. L. Fried, "Optical resolution through a randomly inhomogeneous medium for very long and very short exposures," J. Opt. Soc. Am. 56:1372-1379 (1966) suggested that an appropriate measure of the decorrelation in the phase front present in the system aperture is the turbulent coherence diameter, designated $r_0$. This length is a width measured in a plane transverse to the direction of wave propagation over which the wave phase coherence decays by a value of $\exp(-1)$. For many common long-range surveillance receiving systems imaging objects at several kilometers distance the wavefront will become decorrelated within the diameter of the receiver aperture at even moderate optical turbulence levels (characterized by the dimensionless ratio $X=D/r_0$, where D is the diameter of the system aperture). In the case where X significantly exceeds unity, the wave will exhibit random phase fluctuations that can cause image blurring effects, even accounting for short-exposure imaging [Tofsted, D. H, "Reanalysis of turbulence effects on short-exposure passive imaging," Opt. Eng., 50:01 6001 (2011) (hereby incorporated by reference)]. To describe these decorrelations in the propagating phase front, various orthonormal families of basis functions may be utilized [e.g. V. N Mahajan, "Zernike annular polynomials and optical aberrations of systems with annular pupils," Appl. Opt. 33:8125-8127 (1994). Fried, "Statistics of a Geometric Representation of Wavefront Distortion," J. Opt. Soc. Am. 55:1427-1431 (1965)]. As the ratio X exceeds unity, the effective number of non-zero expansion modes needed to describe the wave perturbation function increases approximately as $X^2$. Therefore, for any given degree of turbulent perturbation one must have a specific plan to enable phase corrections [see detailed discussions of FIGS. 5, 11, and 14 through 18] based on an organized methodology.

A further example of prior art is the application of the stochastic parallel gradient descent technique in tracking the effects of turbulent fluctuations. This stochastic method attempts to adjust a sequence of deformable mirror pistons by performing random fluctuations of the current choice of piston settings, and adaptively modifying the best guess of the correction state based on the outcome of each stochastic perturbation. Weighting methods may be used to selectively focus the algorithm on the correction of lower order modes. The limitation of this approach is the high number of image samples to be collected rapidly enough (several thousand sample images per second) to track the evolving state of the various perturbation modes. This is because the method is relatively inefficient, relying on a stochastic adjustment procedure. Because the maximum sampling rate of an image at an adequate signal-to-noise ratio is limited by the amount of ambient light available to produce the image and the system's light gathering capability, sufficiently high frame rates may not be possible without the augmentation of the system by a high intensity light source in the imaged scene to provide the necessary illumination. This amenity may not be available in military or in many other contexts.

SUMMARY OF THE INVENTION

The present invention is directed to an improved adaptive optics control system utilizing adaptive aperture techniques with or without phase compensation techniques. A preferred embodiment system comprises a variable aperture, such as for example a controllable mirror, placed in an image plane of the system aperture to perform adaptive apodization, a wavefront corrector, and a feedback system based on analysis of image quality to determine updated settings to apply to the apodization mirror and deformable wavefront corrector. The wavefront corrector may comprise a surface controlled by a plurality of actuators, which may be programmed to approximate a sum of weighted Zernike modes selected to approximate the conjugate of the current short-exposure blur deformation to the propagated phase perturbations in the system apodized aperture. Specific settings of the phase map may be governed by a calculation based on a programmed sequence of sub-aperture measurements of phase to produce an estimate of the current atmospheric perturbations affecting a given sub-image frame region of the observed scene. Feedback response may be used to determine the evolution of the current atmospheric state and to adapt the phase correction for different sub-frame regions of the image field of view. The system variable aperture (or apodization) may be separately tuned to reduce the effective number of Zernike perturbation modes that must be tracked by the system. The annular setting of the apodization pattern provides control of both the maximum angular frequency response of the apodized system aperture as well as controlling the number of Zernike perturbation modes necessary to drive the wavefront corrector.

A preferred embodiment of the present invention is directed to an optical signal modification system designed to remove and correct severe amplitude and phase distortions in propagated fields emitted from a plurality of incoherent object plane source points based on the combined operation of a digital micro-mirror device (DMD) with or without a spatial light modulator (SLM), and a processing subsystem using image plane feedback to optimize the choice of SLM and DMD settings based on passive inputs. In a preferred embodiment, a dynamic feedback system may be based on an ordered search procedure designed to sense sub-frame image shifts of observed objects through selected sub-aperture regions in combination with modeling of the conjugate phase necessary to drive the correction settings for a plurality of Zernike perturbation modes from 2nd to 4th order. Coupled to this rapid Zernike computation method is a radial model sampling method for controlling the system aperture apodization function involving setting of an inner and outer edge of an annular entrance pupil apodization pattern. The primary perturbations this design is configured to address are short-exposure blur effects related to the atmospherically degraded apparent imaging system modulation transfer function (MTF). A primary objective of a preferred embodiment of the present invention is to best approximate the conjugate of the atmospheric perturbations affecting image quality. To form a coordinated pair of correction signals applied simultaneously to the SLM and DMD elements of the optical correction system, a master sequencing program is designed to (1) assess feedbacks from sub-aperture sample image processing results, (2)

assign current settings for the SLM and DMD subsystems, (3) select successive sub-frame image regions on which to focus the correction algorithm, and (4) schedule sequences of sub-frame sub-aperture image collections for analysis and full-frame full-apodized aperture image collections for output based on optimized SLM and DMD computed settings.

In an alternative embodiment, the SLM is absent, and the DMD is programmed to only model a variable system aperture, with or without an annular shape. The resulting system will select an optimized effective system aperture diameter based on the current state of turbulence, which is determined by feedback based on image quality. In both embodiments, the image quality for computing the settings of the system aperture apodization is assessed using a sum of squares of image pixel values of a contrast stretched image, which thereby reflects the current level of correction of blur, quantifying the approach of the system-plus-atmospheric modulation transfer function (MTF) toward an optimal setting.

Alternatively, when computing the sum of squares, the image data can be multiplied by a regional weighting function that focuses on a particular portion of the image field. This method permits the apodization control system to selectively enhance different specific portions of the image that may be at different ranges, experiencing different levels of turbulence-induced blur, thereby permitting the system to either focus on a single area of interest or to progressively scan across the full image field and generate a series of image patches that may be stitched together to produce a complete clear image.

The preferred method comprises an adaptive system based on a passive analysis of scene content and optimization of the same through the augmentation of the basic optics of a receiver system (lenses, mirrors, and stops) through the introduction of three specific additional elements. The first element is a digital micro-mirror device suitably integrated into the optical path and connected and interfaced to a computer or microprocessor control unit. This element adapts the shape of the wave front that is permitted to pass through the optical train to the final lens and be focused onto the image plane. The second element is a spatial light modulator suitably integrated into the optical path and connected and interfaced to a computer or microprocessor control unit. This element controls the phase of the light across the wave front. The third element is a feedback control circuit designed to test the current state of clarity of the images being produced by the current settings of the optical adjustments of the optical system, to adjust settings on the adaptive optical DMD and SLM elements to obtain sub-aperture sub-frame image sequences, to perform pattern matching of sub-aperture sub-frame images to determine relative angle-of-arrival offsets between different sub-aperture sub-frame images, to compute a conjugate phase model based on measured angle-of-arrival offsets, to apply this conjugate phase correction model to the SLM, to collect full-frame full-apodized aperture images, to supply said full images to an image output channel, and to sequentially control and/or react to user-directed control to select new sub-frame regions of interest on which to focus the feedback control circuit processing. The overall goal is to reduce wave front perturbations through aperture apodization removal of perturbation modes and optimize the wave front conjugation that mitigates the effects of diffraction and turbulent distortions on the propagated object scene.

In an alternative embodiment, the SLM is absent, and the feedback control circuit is programmed only to optimize the variable system aperture apodization setting for the DMD, with or without an annular shape. The resulting system will select an optimized effective system aperture diameter based on the current state of turbulence, which is determined by feedback based on image quality for a selected sub-frame region. In the embodiments with and without the SLM, the image quality may be assessed as a sum of squares of image pixel values of a contrast stretched image, which thereby reflects the current level of correction of blur, quantifying the approach of the system-plus-atmospheric modulation transfer function toward an optimal setting. Alternatively, when using the sum of squares methodology, the sum of squares image data can be multiplied by a regional weighting function that focuses on a particular portion of the image field. This method permits the Zernike tracking system to selectively enhance different specific portions of the image, thereby permitting the system to either focus on a single area of interest or to progressively scan across the full image field and generate a series of image patches that may be stitched together to produce a complete clear image.

The invention may be optionally designed as a surface-based imaging system for observing objects within the boundary layer and/or surface layer portions of the atmosphere. The preferred embodiments may be operated in concert with post-image acquisition processing methods which are capable of further enhancing the obtained imagery.

BRIEF DESCRIPTION OF THE DRAWINGS

The embodiments herein will be better understood from the following detailed description with reference to the drawings, in which:

FIG. 7B is a schematic illustration of a preferred embodiment depicting the functional capabilities of a preferred embodiment as the adjustable apodization effectuated by the DMD 21 permits reduction in the number of perturbation "modes" to be corrected, making the correction of turbulence procedure easier, improving sensor performance in the presence of optical turbulence. The mode removal method is shown schematically (for the purposes of an example) as removal of central portion 14 from aperture or pupil 10.

FIG. 8 is a schematic illustration wherein the positive lenses 3 in FIG. 7A is expanded as a Cassegrain system telescope (31, 32, 33, 34).

FIG. 19A is a schematic illustration showing a type of annular mask that may be used with reflector telescopes with radial vectors [56] and [58] denoting the inner and outer radii of a masked annular region.

FIG. 19B is a schematic illustration showing a type of annular mask that may be used with reflector telescopes with radial vectors [56] and [58] denoting the inner and outer radii of a masked annular region.

FIG. 19C is a schematic illustration showing a type of annular mask that may be used with reflector telescopes with radial vector 58 denoting the outer radius of a masked annular region.

FIG. 19D is a schematic illustration showing a type of mask that may be used with reflector telescopes and illustrates a reduced circular aperture necessary for the sub-aperture images; wherein [61] is an offset vector from the center of the aperture to the center of the mask's open circular region, [62] denotes the radius of the open mask region, and [63] denotes the boundary of the open region through which light may pass.

FIG. 19E is a schematic illustration providing the same functionality for a refractor telescopic aperture that has no secondary mirror central obscuration (whose extent is denoted by circle [55] in FIGS. 19A-D), wherein the center of the mask's open circular region [62] denotes the radius of the open mask region, and [63] denotes the boundary of the open region through which light may pass.

FIG. 19F is a schematic illustration providing the same functionality for a refractor telescopic aperture that has no secondary mirror central obscuration (whose extent is denoted by circle [55] in FIGS. 19A-D), and illustrating a reduced circular apertures for the sub-aperture images with radial vectors [56] and [58] denoting the inner and outer radii of a masked annular region.

FIG. 29 is a block text description of the digital micromirror device, spatial light modulator, and feedback control circuitry.

DETAILED DESCRIPTION OF PREFERRED EMBODIMENTS

Figure 1:
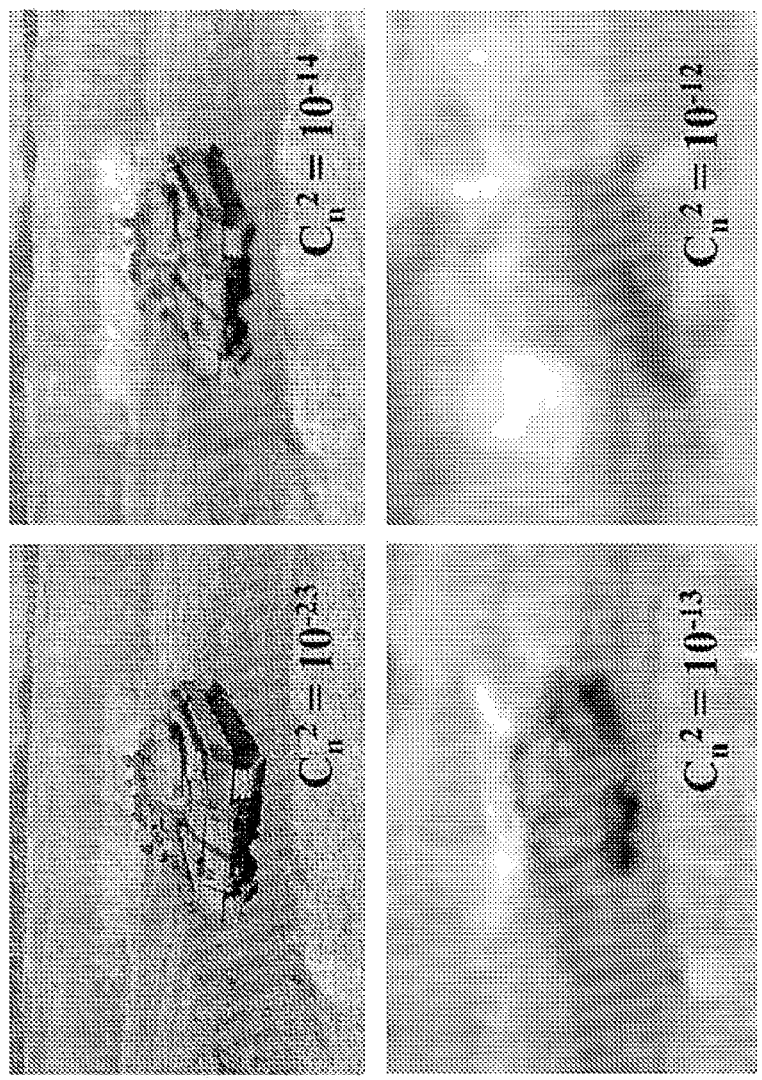
FIG. 1 illustrates a sequence of images depicting increasing distortion effects characterized by increasing turbulence strength $C_n^2$ (measured in dimensions of $m^{-2/3}$).

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The methodology of a preferred embodiment does not utilize any randomized search procedure, nor does it utilize any form of specialized emitting source in the object plane. Rather, a systematic search technique is proposed, in combination with an adaptive aperture control system, permitting the collecting of a sequence of sub-aperture images, constituting a sequence of circular mask images, evenly arranged over the region of the main annular mask (of a type illustrated in FIGS. 20 and 21) to be used for collecting full-frame images (typical sets consist of four (4), six (6), or eight (8) sub-aperture masks), to be sequentially applied by the DMD to collect information regarding the current phase perturbation state around the currently selected annular mask, from which a complete phase correction solution can be computed. This optimized approach permits tracking fewer perturbation modes in the controlled (adapted) apodized aperture at higher levels of turbulence than would be required for an un-apodized aperture or a randomized search procedure. A preferred methodology both simplifies the overall problem (by restricting the number of active turbulent modes in the adapted aperture) and can be handled more efficiently through use of a sampling method using a sequential series of sub-aperture sub-frame sample images. The rationale for this assessment is that method of the present invention both simplifies the overall problem (by restricting the number of active turbulent modes in the adapted aperture) and can be handled more efficiently through analysis of the series of sequential sub-aperture images. This optimized approach permits tracking fewer perturbation modes at higher levels of turbulence than are sustainable using a full aperture conjugation approach. The addition of, inter alia, the Digital Micromirror Device forms a critical new element that fundamentally changes the approach to producing the correction for turbulence induced image distortion. The Digital Micromirror Device facilitates the optimized use of a Spatial Light Modulator, making the solution simpler to evaluate and the conjugate correction easier to generate. That is, any imaging system must balance the rate of acquisition of full frames of image data against the noise produced at a given light level and the image sample dwell time. A given order of turbulence for a given aperture size and shape will require at least one data sample per perturbation term in the aperture. The available light level and the aperture settings determine the ability to correct for a given level of turbulence. The ability to reduce the number of turbulence perturbation modes and to efficiently correct for those modes provide the rationale for the preferred embodiments, optimized to light levels for viewing naturally illuminated objects.

FIG. 1 illustrates image distortion simulations depicting the influence of increasing turbulence strength measured by $C_n^2$, the refractive index structure parameter. The effect of turbulence is estimated relative to the coherence diameter, $r_0=3.018(k^2LC_n^2)^{-3/5}$ for constant $C_n^2$ along the optical path, where $k=2\pi/\lambda$ is the radiation wavenumber, $\lambda$ is the radiation wavelength set to 1.5 µm, L is the optical path length of 7.5 km. A preferred embodiment of the present invention may provide the capability to adaptively correct for turbulent phase perturbation up to a D-to-$r_0$ ratio of 10, where D is the maximum diameter of the system.

Figure 2:
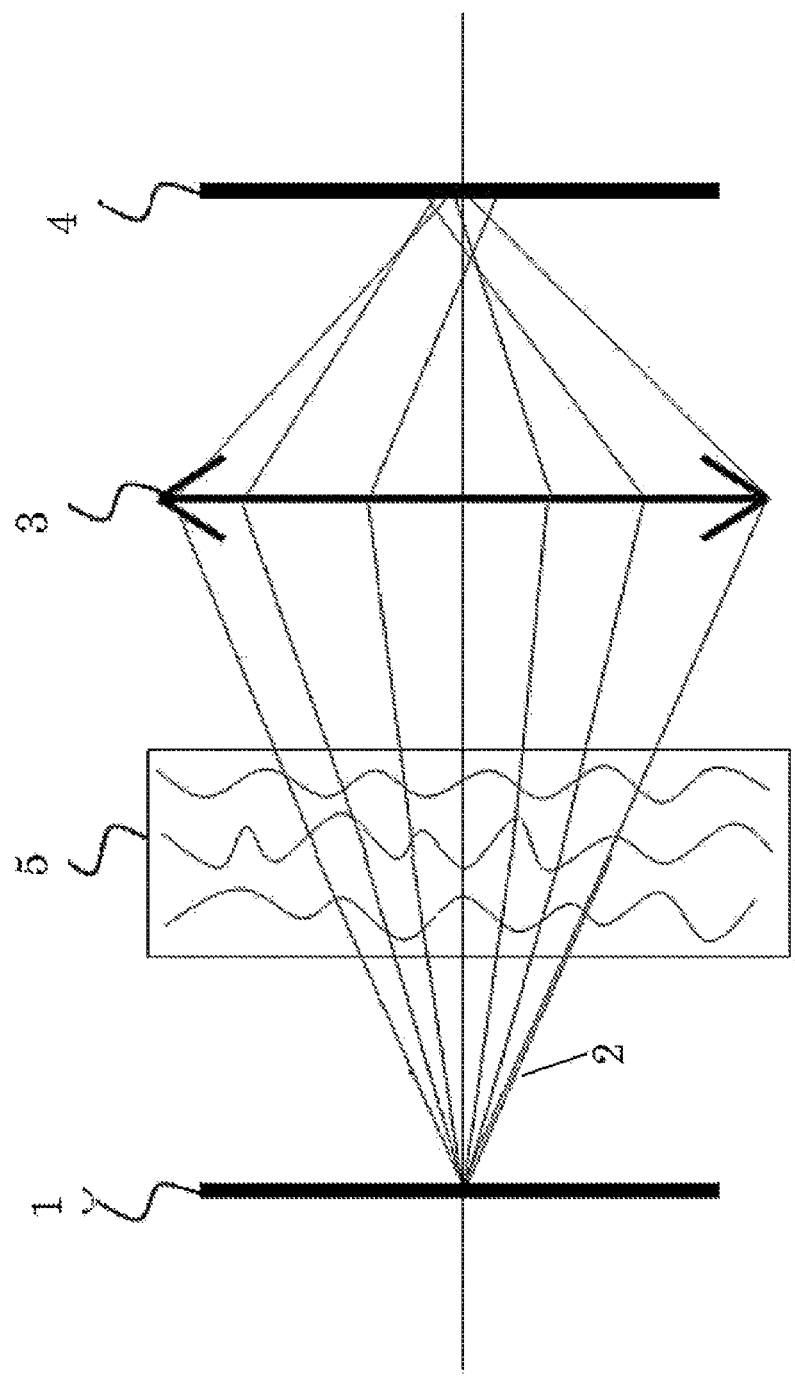
FIG. 2 is a schematic illustration of a simplified optics system.

FIG. 2 illustrates a very simple imaging system comprising an object plane 1, an image plane 4, and a single positive intervening lens 3. If the optical turbulence 5 is not present, the photons 2 would effectively follow straight paths from the object plane 1 to the system lens 3 where their paths are deflected in such a manner that the expanding spherical wave emitted from every point in the object plane is imaged onto a corresponding conjugate image point on image plane 4. This is, of course, a simplified view, and the image of a point source would be diffraction limited by the diameter of the system aperture corresponding in this case to the diameter of lens 3.

When optical turbulence (denoted as block 5) is present along the optical path between the object plane and the receiving aperture, the presence of refractive turbulence (turbulent temperature fluctuations in the atmosphere induce changes in the refractive index of the air) (shown as block 5) create random small tilts in the propagating direction of photons travelling through the air between the object plane 1 and the system aperture 3. These tilts cause different photons arriving at different portions of the system aperture to be focused onto different points of the image plane 4, creating a blurred image spot that may also be displaced from its original image point.

Another way of picturing the image distortion effects of the turbulence is by considering the phase perturbations imposed by the atmosphere due to propagation of light from a single image point. In FIG. 7B, bottom left, phase perturbations (e.g., 12) are shown pictorially as light and dark patches varying across the system entrance pupil or aperture 10. The complete aperture has an entrance pupil diameter D (11). Typical phase perturbations, illustrated as a series of patches of type 12 are considered to have a characteristic width 13 termed the turbulent "coherence diameter" (r-naught or $r_0$). It is common practice to characterize the turbulence impact on a system with aperture diameter D using the ratio X=D/$r_0$. R-naught is formally defined as the distance over which the propagating wavefront from a point source decorrelates by a factor of exp(−1). Of particular interest is the performance of a system with no turbulence correction. If no turbulence were present, a larger diameter aperture will always resolve greater image detail according to the value of the ratio $\Omega_0$=D/$\lambda$, which determines the maximum angular frequency resolvable by the system. When turbulence is present, though $\Omega_0$ is unchanged, the system's ability to image is degraded such that for X=D/$r_0$>3 the system performance actually decreases due to turbulent blur effects when D is increased. This behavior is computed based on the "Resolution," the integrated volume under the system's Modulation Transfer Function (MTF) for either short-exposure (snap-shot) or long-exposure (astronomical long-exposure imaging) cases in FIG. 3. The Response functions are plotted for a standard circular aperture system for varying X parameter values for different imaging scenarios where Q=D/($\lambda$L)$^{1/2}$ is a measure of the diffraction influence on the system.

Figure 3:
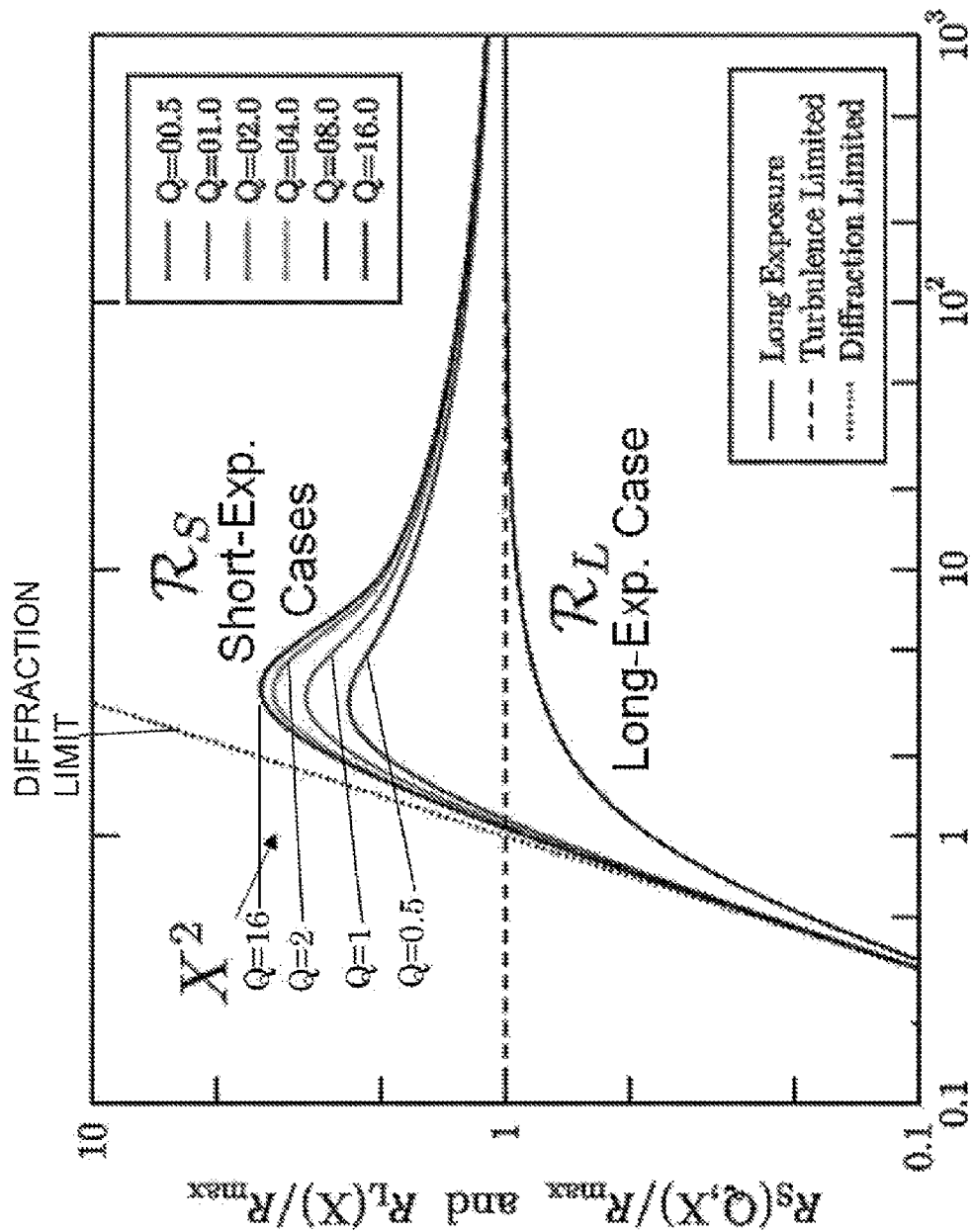
FIG. 3 is an illustration depicting graphically the concept that for most imaging applications featuring typical Q parameter values between 2 and 6, the peak performance of the system is obtained when X is approximately 3.

As illustrated graphically in FIG. 3, the peak performance of a system occurs when X is approximately 3. For most imaging applications the Q parameter is between 2 and 6, meaning that for most systems diffraction variations in performance are minimal when X>2.

To understand how the present invention can improve the capability for turbulent phase correction one first must introduce a model for describing perturbations in the system aperture. The most commonly used model is that of Zernike polynomials, a set of orthonormal expansion functions for a circular aperture (FIG. 4).

Figure 4:
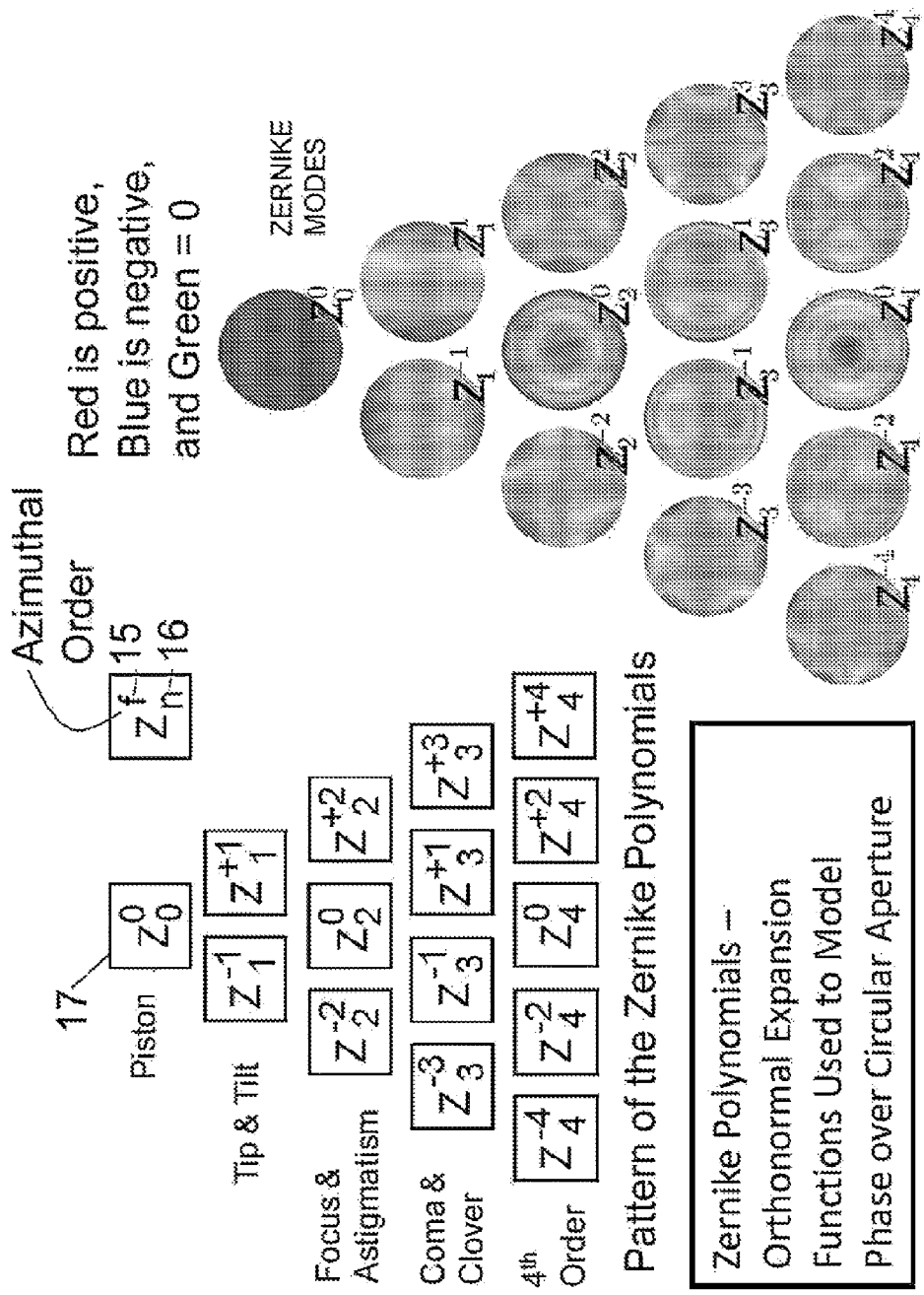
FIG. 4 is a schematic illustration of a commonly used model, the Zernike polynomials, a set of orthonormal expansion functions, for describing perturbations over a circular aperture.

FIG. 4 illustrates graphically the relations between Zernike polynomials of various orders and azimuthal dependencies, and their connections to lens design. Each box 17 is designed to represent a particular Zernike polynomial. These are a series of orthogonal functions designed to represent arbitrary contiguous functions on a circular two-dimensional plane, such as the entrance aperture of an optical system. Each Zernike function is designated by two indices: "n" (16) represents the maximum radial axis power (the "r" radial parameter in FIG. 11A), "f" (15) represents the azimuthal order. The Zernike polynomials along a particular row of the table are thus used to represent a given order of turbulent perturbations. In general, each Zernike polynomial consists of a product of two functions, a radial function dependent only on "r", and an azimuthal function dependent only on an azimuthal variable "a", as indicated in FIG. 11A. The azimuthal dependencies are given as either sine or cosine functions of different orders. For positive f indices the azimuthal dependence is cos(fa). For negative f indices the azimuthal dependence is sin(fa). The different rows (orders) of the diagram are often referred to by names affiliated with lens vision corrections, such as focus and astigmatism. Tip and tilt are of particular interest in atmospheric turbulence studies as these are associated with angle-of-arrival variations. However, as D. L. Fried, "Optical resolution through a randomly inhomogeneous medium for very long and very short exposures," J. Opt. Soc. Am. 56:1372-1379 (1966) pointed out, tip and tilt do not (by themselves) degrade propagated image quality. They only cause the location of a given image to be shifted on the image plane. Likewise, the piston effect only alters the overall mean phase of the wave entering the system, but does not alter the image quality. Note, also, that it is expected that the fixed system optics will remove the mean spherical wave focus aberration arising from the propagation, so that all that remains is to correct for various turbulence related perturbations.

With that in mind, any true corrections to remove turbulence blur effects will start with the n=2 row of the table. The term "Degrees of Correction", or "DoC", denotes the number of Zernike terms being corrected ("conjugated"). This term expresses the concept that the optical system sets a phase adjustment to the SLM that is such that it exactly (within the degree capable for the SLM device used) removes a given Zernike perturbation component. DoC=3 refers to removal of all n=2 row Zernike elements. DoC=7 refers to removal of all n=2 and n=3 elements. DoC=12 refers to removal of n=2 through n=4 elements. Lastly, DoC=0 refers to simply collecting short exposure imagery where no phase conjugation has been applied to remove any perturbations.

Figure 5:
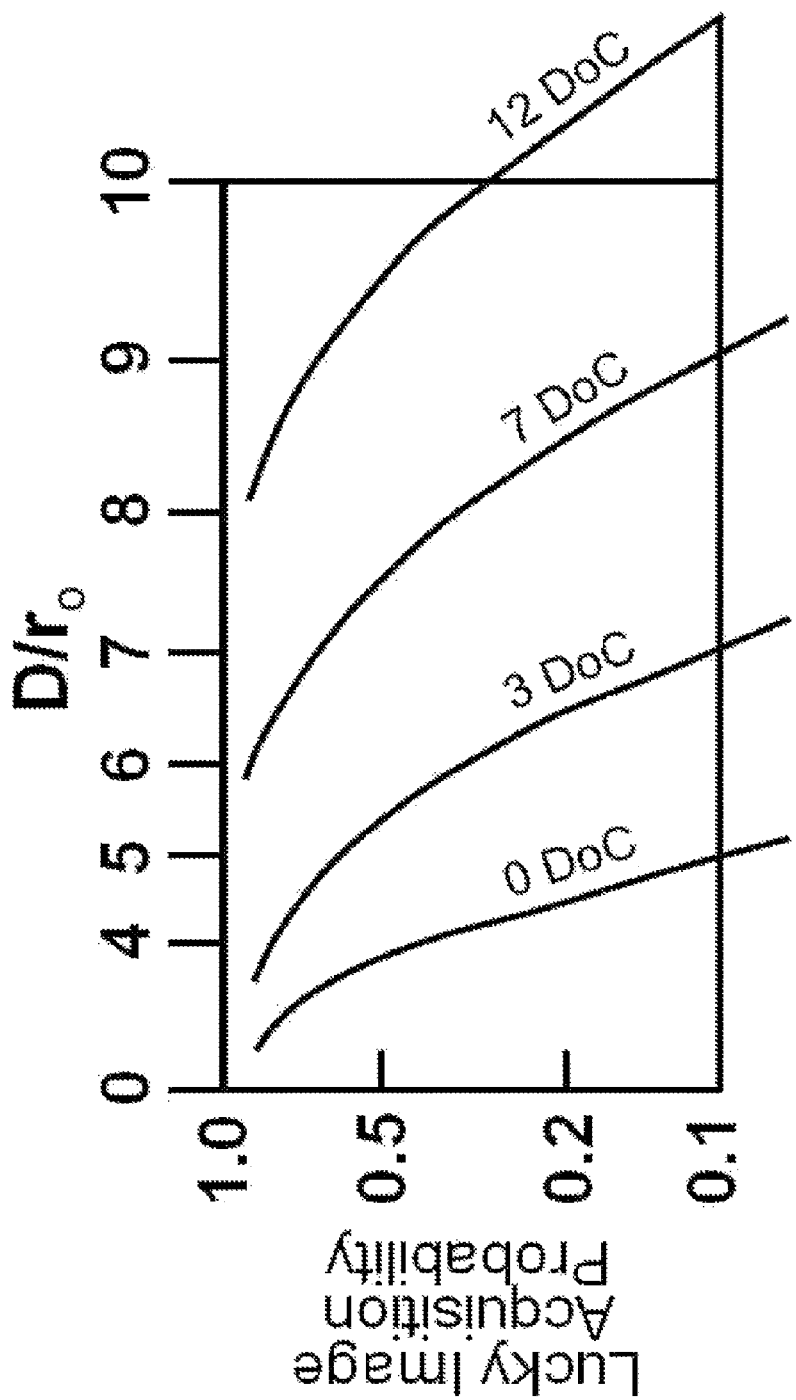
FIG. 5 is a graphical illustration based upon a publication in 1989 by R. Hufnagel illustrating the problem of acquiring "lucky" images, i.e., images that were free of significant degrees of turbulence-induced blur, wherein the results are distinguished by the number of degrees of "freedom" or as reinterpreted in the graph "degrees of correction" (DoC) used in partially conjugating or correcting the imagery corrected; wherein Hufnagel's "zero DoC" corresponds to acquiring short-exposure imagery (i.e. no adaptive correction at all).

These conjugation categories were used by R. Hufnagel (Hufnagel, R. E., "The Probability of a Lucky Exposure," Tech. Memo. REH-0155, The Perkin-Elmer Corp. (1989)) to quantify the ability to avoid turbulent image degradations when a given number of turbulent perturbation modes had been corrected (conjugated). A portion of Hufnagel's main figure has been re-digitized and re-formatted as FIG. 5. Hufnagel's paper considered the problem of acquiring "lucky" images, i.e. images that were substantially free of turbulence-induced blur. He distinguished the results he obtained according to the number of degrees of "freedom," or, as in the re-interpreted result plotted in FIG. 5, the number of "degrees of correction" (DoC), "partially conjugated" or corrected in the imagery collected. Hufnagel's zero DoC line corresponds to acquiring short-exposure imagery (i.e. no adaptive correction). Hufnagel's calculations indicate a zero DoC system is ineffective beyond $X=D/r_0=3$, corresponding to the peak of the system response curve of FIG. 3. For cases involving adaptive partial conjugation, Hufnagel's DoC=3, 7, and 12 curves indicate significant improvement is possible even if only some of the active wavefront perturbation modes are corrected. Since the coherence diameter, $r_0$, is proportional to range L to the –3/5 th power, the DoC=3 curve illustrates that for the same degree of resolution as the DoC=0 case, the system effective range is double the uncorrected performance (actually 1.752). Hufnagel's DoC=7 curve corresponds to a tripled (actual 2.66) range capability, while the DoC=12 curve corresponds to an approximately quadrupled (actual 3.72) range capability.

Therefore, a system that could correct for only 3, 7, or 12 Zernike terms, could perform imaging tasks out to $D/r_0$ values of 5.5, 7.5, or 9.5 versus the same performance of the DoC=0 case operating out to $D/r_0<4$, or a substantially increased range capability. The preferred embodiments described below detail the means of implementing and operating such a system. However, for the sake of completeness it is necessary to describe in some detail how such a system differs from other previous wavefront correction systems.

Figure 6:
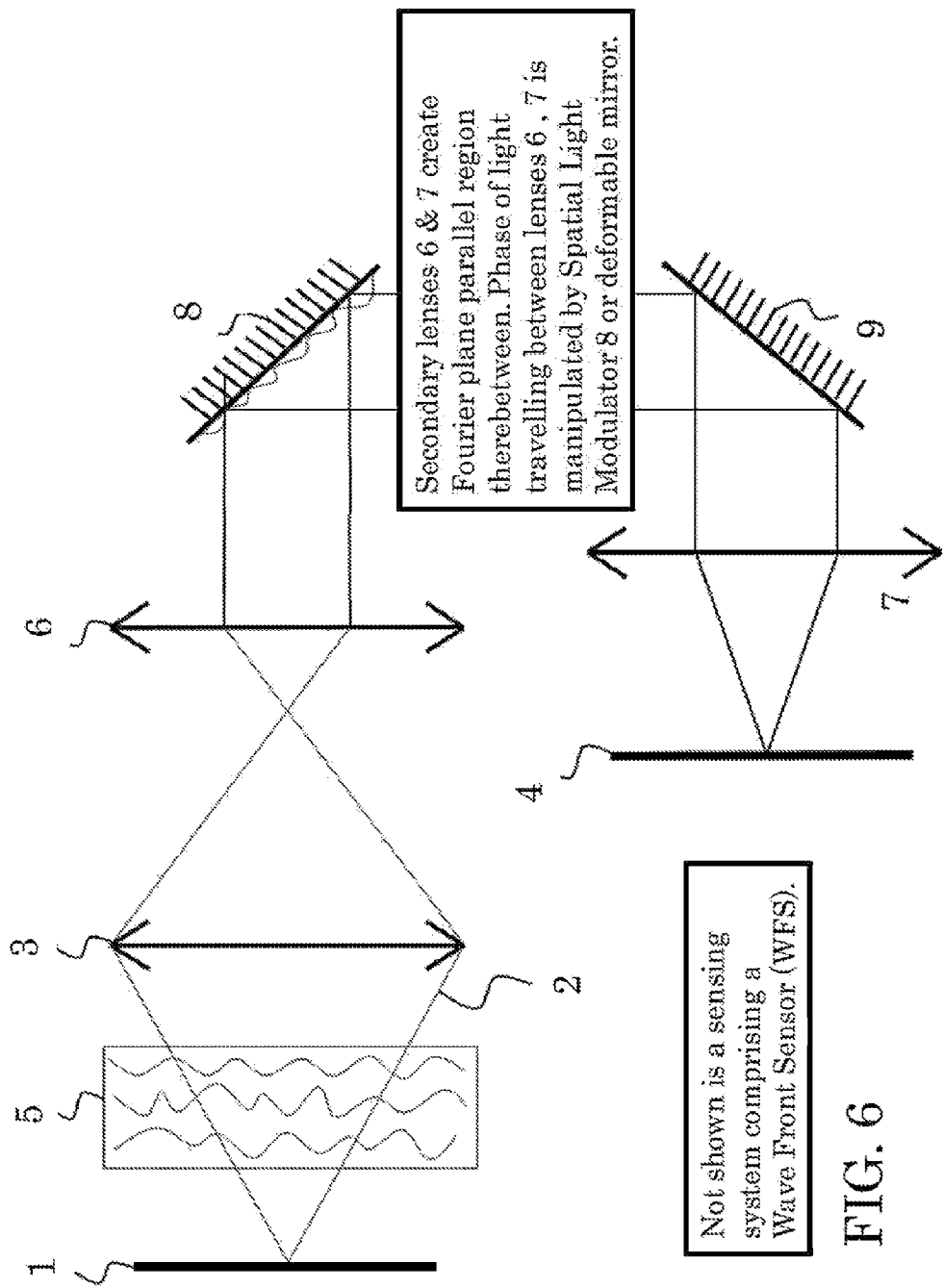
FIG. 6 is a schematic illustration of an adaptive optical configuration comprising features not shown in FIG. 2; including, a secondary set of lenses 6 and 7 that are used to create a Fourier plane parallel region between them such that a wavefront of light travelling between lenses 6 and 7 can have its phase manipulated by a Spatial Light Modulator 8 or other similar phase perturbation means such as a deformable mirror.

Schematically, most major active systems can be considered to be represented by an optics diagram of the type shown in FIG. 6. The FIG. 6 system contains additional features designed to mitigate turbulence effects beyond the basic system shown in FIG. 2. In addition to the object plane 1, turbulent atmosphere 5, perturbed propagating photons 2, main system entrance pupil and fixed lens system 3, and imaging plane 4, a secondary set of lenses 6 and 7 is used to create a Fourier plane parallel region between them. Light travelling between lens 6 and 7 can have its phase manipulated by a Spatial Light Modulator 8 or other similar phase perturbation means such as, for example, a deformable mirror. Usage of a deformable mirror (or, alternatively a spatial light modulator) may involve various attempts to adjust a sequence of deformable mirror pistons by performing fluctuations of the current choice of piston settings (or alternatively SLM modulations), and adaptively modifying the best guess of the correction state based on the outcome of each stochastic perturbation.

FIG. 7 illustrates the schematic of the optical system of the main preferred embodiment. Augmenting Spatial Light Modulator 8 takes a systematic, efficient, non-stochastic approach to wavefront modulation. Using the preferred method, it is possible to order the combinations of sample conditions "tested" through a dynamic algorithm involving sample images collected with a specific set of sub-aperture masks associated with a given main annular mask model. Also, different perturbation modes will evolve at different rates. It is expected, however, that the most rapidly evolving modes may also carry the least impact on the overall distortions in image quality in the image plane. On the other hand, those modes that have the most impact on image quality may be relatively slowly evolving and therefore require less attention when deciding which perturbation modes to track most closely. Hence, there will be an optimal combination that focuses just the right amount of tracking resources on just the right modes that optimizes the system performance. The optimal combination cannot be determined until usage of an assemblage of a preferred embodiment.

In the optical train of FIG. 6, provided for the purposes of comparison, there may exist several reflecting mirrors (as symbolized by the plane mirror 9) guiding the light through the final focusing lens 24 onto the image plane. Not shown in this figure is a sensing system that usually comprises a wavefront sensor (WFS), typically a Shack-Hartmann device, or in some cases a Linear Shearing Interferometer, or sometimes both. Regardless of the method used to sense the wavefront, there is always the requirement that a coherent source must always exist in the object plane (or near it) in order to provide the known radiation source that can be sensed by the WFS. Without such a known source, none of these active methods work. Often such embodiments require a laser source in the vicinity of the scene to be sensed, leading to a severe limitation on the utility of such techniques/instruments.

Figure 7A:
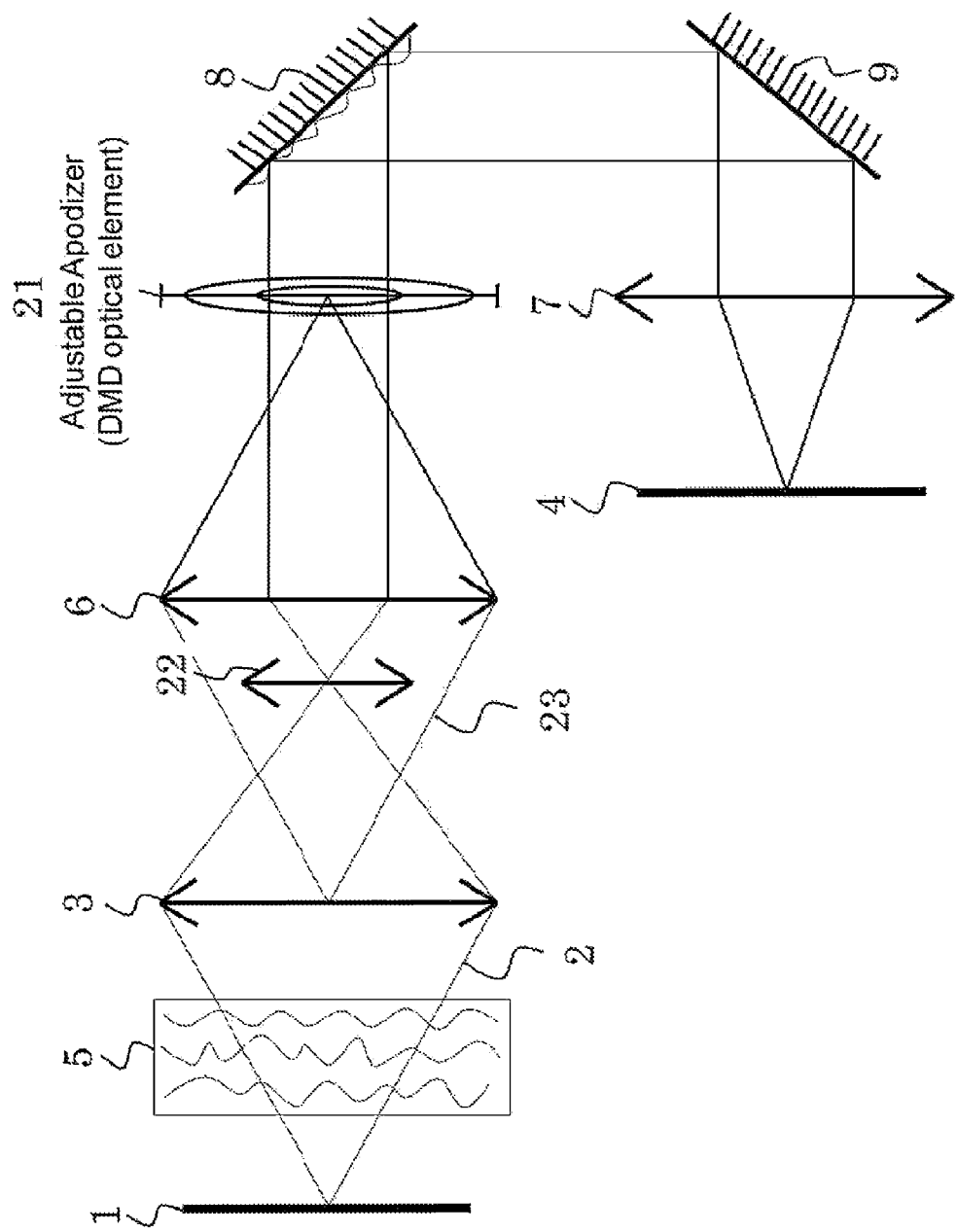
FIG. 7A is a schematic illustration of an optical configuration incorporating the principles of the present invention comprising a Digital Micro-mirror Device (DMD) 21 that has been located in the image plane of the system entrance pupil with a corresponding focus point in the DMD 21.

Consider next the optical train that is provided by a preferred embodiment of the present invention, shown in FIG. 7A. In FIG. 7A a Digital-Micro-mirror Device (DMD) 21 has been located at an image plane of the system entrance pupil 3, such that a point in the entrance pupil will have a corresponding focus point (denoted by focusing rays) in the Digital-Micro-mirror Device (DMD) 21. To facilitate this goal, a second positive lens 22 may be added between the system's main telescope (symbolized here as the single lens 3).

The location of the optical element 21 and the particular values of the focal lengths of the lenses 6 and 22 are instrumental in the operation of the instrument depicted in FIG. 7A. FIG. 7A illustrates, in schematic or abstract fashion, a preferred embodiment adaptive optics control system for removing the effects of short-exposure image blur of incoherent imaged scenes. The object plane 1 to be viewed is seen through an evolving optically turbulent medium 5. Rays of light 2 pass through the medium 5 and are randomly delayed as they enter the system's entrance pupil 3. The system's telescopic or refractive lens optical train is represented in this figure solely by lens 3. To prepare the incident radiation for the apodizing and phase modulating steps the incident radiation is passed through at least two shaping lenses (22 and 6). These result in a wave that is propagating approximately as a plane wave that is directed against a Digital Micro-mirror Device (DMD) (21). Though the FIG. 7A shows the passage through the DMD following straight lines, in actuality the beam would be reflected from 21 at a finite angle. The plane wave would then be directed against a Spatial Light Modulator (SLM) (8), further directed through the optical system via one or more reflective surfaces (9), eventually reaching a focusing lens 7 and directed to imaging plane.

The positioning of the DMD 21 is chosen such that the plane of (6) occurs at a real focal plane of the system entrance pupil (3), as denoted by light ray lines 2.

FIG. 7B is a schematic illustration of a preferred embodiment depicting the functional capabilities of a preferred embodiment. The adjustable apodization effectuated by the DMD 21 permits reduced number of modes to be corrected to produce improved sensor performance in presence of optical turbulence. The reduced number of modes may be, for example, be represented by the box ZR in FIG. 7B. Note that at the $Z_1$ level, the piston has been deleted as unnecessary. Likewise, the tip and tilt level (shown in FIG. 4) has been deleted. Correction of turbulence is made easier after removing several perturbation "modes" (central portion 14 removed from aperture or pupil 10).

FIG. 7B illustrates, diagrammatically, the impact apodization has in reducing the order of complexity of the random phase pattern of a propagated light wave in the system aperture. The full system entrance pupil is again designated by 10. The width of the aperture 11 is designated D, the system entrance pupil (aperture) diameter. Within this aperture, the phase perturbations of a propagating point source are illustrated abstractly as patches 12 in which the propagating wave front is approximately coherent. The characteristic width of these patches is associated with the term "coherence diameter" (13) and is defined as a length in the transverse plane to the main axis of propagation over which the wave reduces in coherence to exp(−1) of its value at zero distance. Coherence length is denoted as "$r_o$" (read r-nought). In the illustration, the number of independent coherence patches passed by the aperture is reduced from 15 to 9 when the center 14 of the aperture is blocked by the apodization technique. It is anticipated that a similar reduction will occur when modeling these phase patterns using a Zernike polynomial expansion method.

In brief, the upper left portion of FIG. 7B schematically illustrates the basic problem to be solved, where turbulent phase perturbations of the turbulent atmosphere 5 cause image distortions (blur and angle-of-arrival problems). The aperture 10 in the bottom left corner of FIG. 7B schematically depicts or represents the shape and physical extents of these perturbations. The lower right portion of FIG. 7B, is a diagrammatic attempt to show graphically the pattern of the Zernike polynomials, but the representation of these functions is actually much better in the color FIG. 4 of the plot. Each Zernike pattern is shown where color is used to show varying function value. Red is positive, blue is negative, and green is zero. As was pointed above, the $Z_0^0$ pattern, labeled piston, along with the tip and tilt terms, do not affect image quality. They are labeled with an "X" in FIG. 7B because they do not need to be corrected since they do not impact blur.

Shown in the upper portion of FIG. 7B is a preferred embodiment image correction optical system comprising an Adjustable Apodizer (AKA DMD optical element) 21. Utilizing DMD 21, the center of the system aperture is variably obscured (the descriptions associated with FIGS. 11, 19A-F, 26 illustrate this concept). Given that the center of the aperture can be obscured, the benefits include those depicted in box ZR of FIG. 7B. Moreover, the aperture 10 in the lower leftmost aperture 10 depicts the unobstructed aperture whereas the aperture 10 having the central portion 14 removed represents the obstructed aperture. Note that there are 15 perturbation regions in the leftmost aperture 10, while in the centrally obstructed aperture 10 to the right there are only 9 perturbation regions. Blocking part of the aperture removes perturbations. By so doing, the problem of correcting for the turbulence becomes easier by removing several perturbation "modes" that one no longer needs to track.

The schematic drawing in the lower right section of FIG. 7B schematically illustrates this effect, as three of the Zernike terms are blocked out with the letter X. The central obscuration is depicted in both the $Z_2^f$ row and the $Z_4^f$ row of the lower right section of FIG. 7B. As represented by the arrows, with the central obscuration in place the patterns $Z_2^{-2}$ and $Z_4^{-2}$, $Z_2^0$ and $Z_4^0$, and $Z_2^2$ and $Z_4^2$ are virtually identical. That is, in representing the aperture it will not be necessary to track all 6 of the identified terms, only 3, the other 3 "map into" the same space as the upper three when the aperture is sufficiently apodized. The arrow pointing from the apodized circle inside the rectangle ZR and the Zernike polynomial representations is designed to indicate that it is common that the phase is expanded in terms of a weighted sum of Zernike terms and that under the circumstances of an apodized aperture, fewer terms are needed to represent the same phase pattern.

Figure 10:
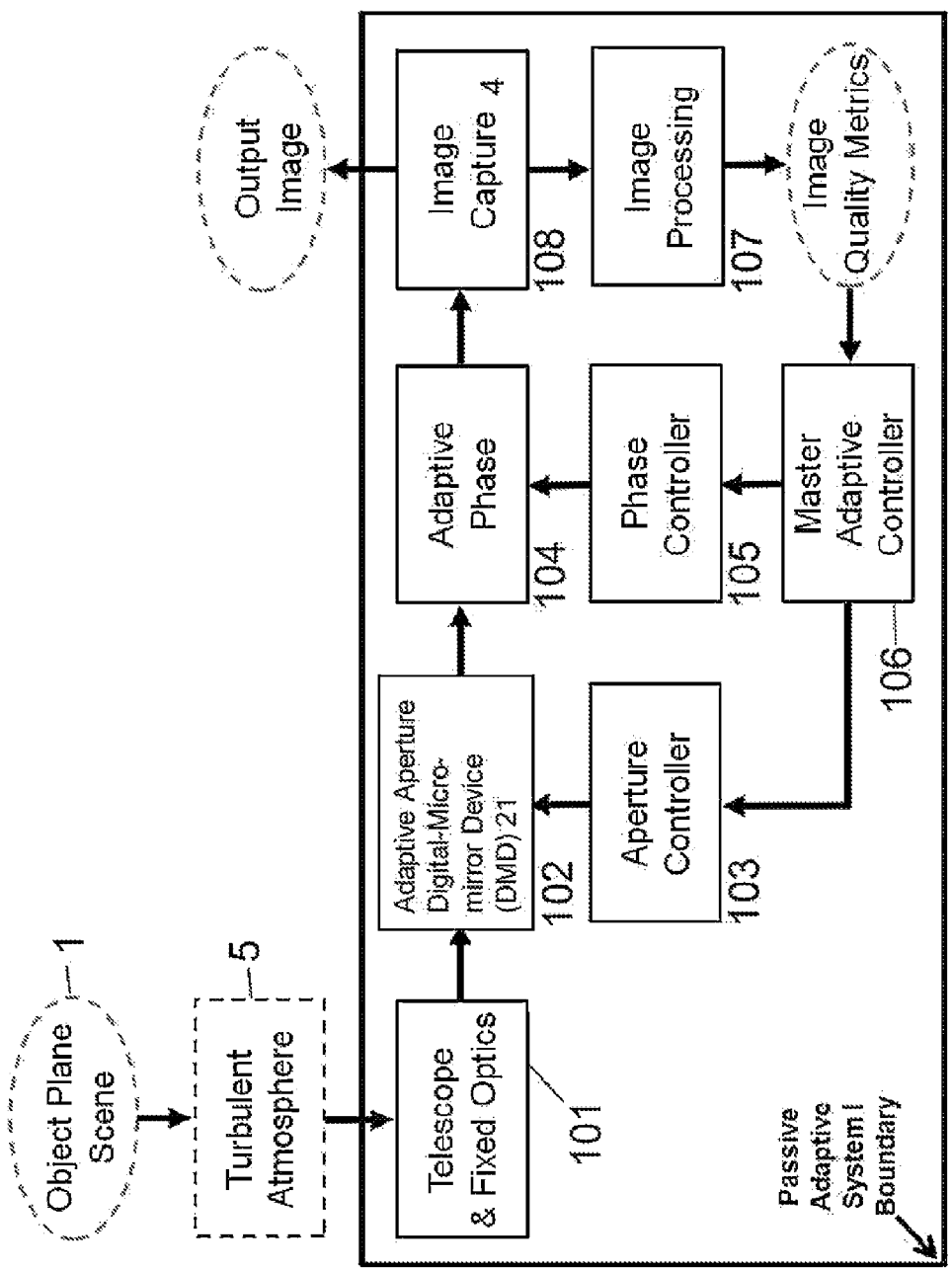
FIG. 10 is a schematic block diagram of a preferred embodiment system.

The upper right section of FIG. 7B correlates in part to FIG. 10 of the disclosure. Arrows are used to depict the highlights of the phase modulation and apodization control for performing the adaptive part of a preferred embodiment solution. FIG. 10, a system block diagram of a preferred embodiment, attempts to show how the control flow of the invention would work, as opposed to FIG. 7B which depicts the general concept of a preferred embodiment optical system.

In FIG. 8, the positive lenses 3 and 22 of FIG. 7A are expanded as a Cassegrain system telescope (31, 32, 33, 34) and a field lens 22. FIG. 8. provides a more detailed picture of the functioning of a reflector telescope embodiment of the system.

In FIG. 8, light arriving from the object plane 30 passes through the system entrance pupil 31 and is reflected from the telescope's main mirror 32 (effectively a positive lens). The light then travels to the secondary mirror 33 where it is again reflected and passes out through the back aperture stop of the telescope 34. The converging light will eventually reach some focal point (natural image plane), but before this can occur, an additional positive lens 22 is positioned in the optical path to cause the focal point to occur at a shorter range. This causes the light rays emerging from the focal plane to diverge more strongly. Positive lens 22 must be placed prior to the focal point of the exiting rays in order to cause the rays to diverge more rapidly beyond focal point. The reason for requiring this extra lens to be present can be seen in FIG. 9.

Figure 9:
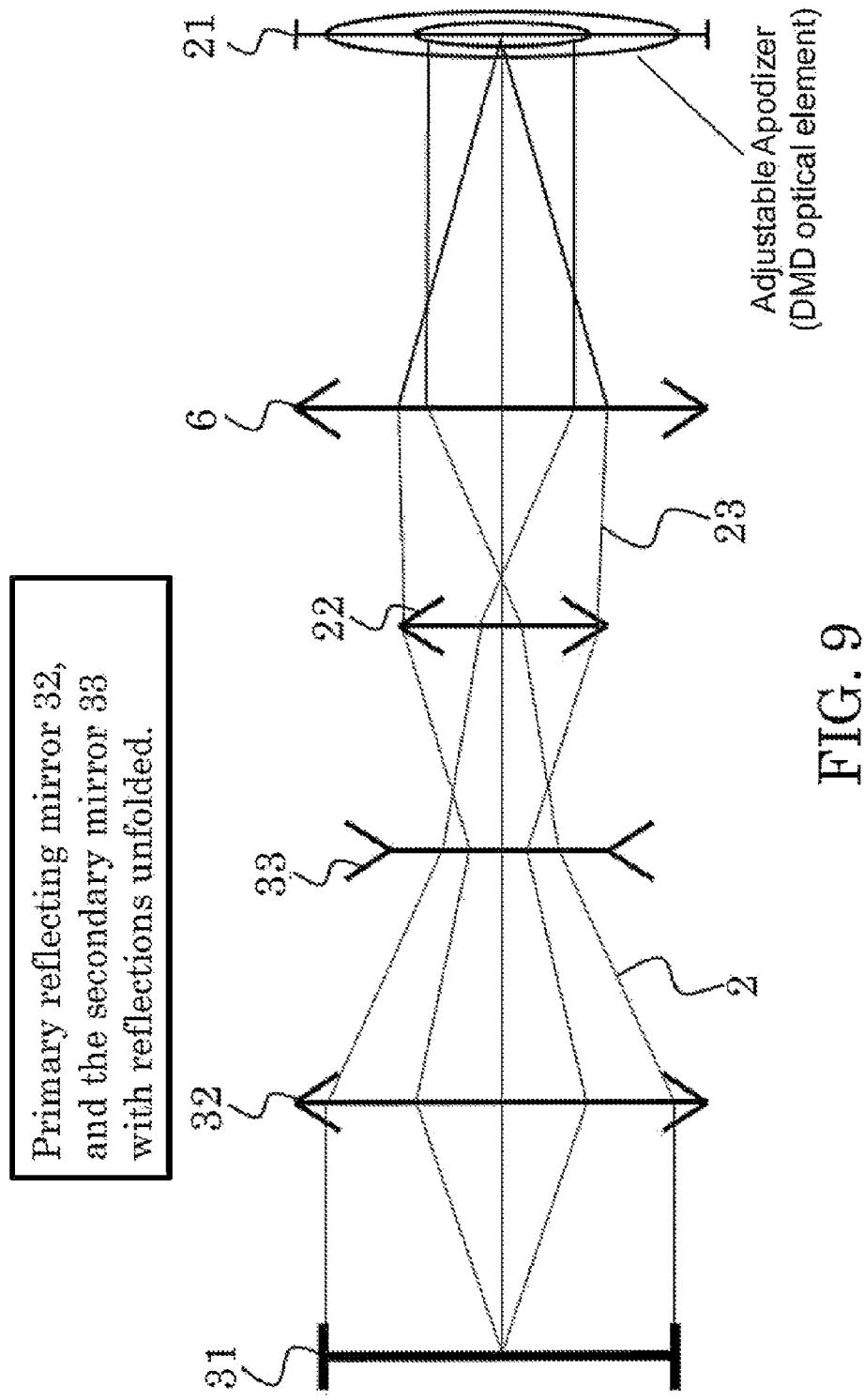
FIG. 9 is a schematic representation of a preferred embodiment optical system required to image entrance pupil 31 at the DMD 21 plane based on the system fixed lenses (primary reflecting mirror 32 and secondary mirror 33 (reflections having been unfolded)) by the positioning and focusing powers of positive lenses 22 and 6.

FIG. 9 is a schematic representation of the optical system required to image the entrance pupil at the DMD position 21 based on the system entrance pupil 31, the primary reflecting mirror at 32, and the secondary mirror (reflections have been "unfolded") at 33; i.e., the optical paths of the telescope's two mirrors have been "straightened out" (reflections eliminated) and are represented by effective lenses 32 (primary mirror) and 33 (secondary mirror). The entrance pupil 31 permits near-parallel light rays to enter the system. This light is concentrated by lens 22 (equivalent to lens 22 in FIG. 8) and then, once inverted, is passed through positive lens 6 to form an approximately parallel beam directed toward the DMD (21). Also traced through the system is a point at the center of the system entrance pupil 31 along ray lines 23 showing that the DMD 21 is in a focal plane of the system aperture. The choice of two positive lenses 22 and 6 is necessary based on the dual requirements that rays 2 be parallel upon exiting lens 6 and that rays 23 must focus at 21. As can be seen, the two separate positive lenses (22 and 6) ensure that both light rays 23 traced from a point in the entrance pupil 31 will focus at the DMD 21, and that parallel rays 2 emerging from the entrance pupil 31 will pass through the plane of the Digital-Micro-mirror Device (DMD) 21 as parallel rays. The only means of accomplishing both tasks is by inverting the rays (between 22 and 6) and by using two positive lenses. Both 22 and 6 are positive lenses and if lens 22 is placed in the optical train before the first focal point of the main telescope. By choosing to place the DMD in the image plane of the system's entrance pupil, whatever apodization effects are applied by the DMD are "effectively" also applied in the system entrance pupil (within the limits of diffraction and spread due to the use of finite optics and the current turbulence conditions).

This optical system supports the exploitation of the DMD (also designated as Adaptive Aperture 21) in the preferred method of blur correction system schematically illustrated in FIG. 10, as constructed in accordance with the principles of the present invention.

The Optical System in the embodiment depicted in FIG. 10 comprises an optical train, including the Telescope and Fixed Optics 101 described previously, the adaptive aperture 102 (the DMD 21 and hardware interface), the adaptive phase (an SLM and hardware interface) 104, and an Image Capture 108 means. The Adaptive Aperture 102 comprises the DMD 21 and its hardware interface and cabling. One source for DMD devices is Texas Instruments' Digital Micromirror Device (DMD). A DMD can be connected to a PC class computer using Logic PD's DLP LightCommander Development Kit. The Texas Instruments DLP Kit permits interfacing to the DMD through a PC whereby up to 1792 1-bit (black or white) XGA resolution (1024 by 768) images can be stored in the system memory. These images can be indexed to permit rapid control of the 1024-by-768 resolution micro-mirror surface. The Series 450 DMD micromirror control permits selection of the reflected region, timing of the choice of region selected for reflection, and is user controllable.

As described in Wikipedia, a digital micromirror device, or DMD, is an optical semiconductor that is the core of DLP projection technology and was invented by Dr. Larry Hornbeck and Dr. William E. "Ed" Nelson of Texas Instruments (TI) in 1987. The DMD project began as the Deformable Mirror Device in 1977, using micromechanical, analog light modulators. A DMD chip has on its surface several hundred thousand microscopic mirrors arranged in a rectangular array which correspond to the pixels in the image to be displayed. The mirrors can be individually rotated ±10-12°, to an on or off state. In the on state, light from the incoming ray bundle is reflected into the lens making the pixel appear bright on the screen. In the off state, the light is directed elsewhere (usually onto a heatsink), making the pixel appear dark. The mirrors are made out of aluminum and are around 16 micrometers across. Each one is mounted on a yoke which in turn is connected to two support posts by compliant torsion hinges. In this type of hinge, the axle is fixed at both ends and literally twists in the middle. Further according to Wikipedia, two pairs of electrodes control the position of the mirror by electrostatic attraction. Each pair has one electrode on each side of the hinge, with one of the pairs positioned to act on the yoke and the other acting directly on the mirror. The majority of the time, equal bias charges are applied to both sides simultaneously. Instead of flipping to a central position as one might expect, this actually holds the mirror in its current position. This is because attraction force on the side the mirror is already tilted towards is greater, since that side is closer to the electrodes. To move the mirrors, the required state is first loaded into an SRAM cell located beneath each pixel, which is also connected to the electrodes. Once all the SRAM cells have been loaded, the bias voltage is removed, allowing the charges from the SRAM cell to prevail, moving the mirror. When the bias is restored, the mirror is once again held in position, and the next required movement can be loaded into the memory cell. The bias system is used because it reduces the voltage levels required to address the pixels such that they can be driven directly from the SRAM cell, and also because the bias voltage can be removed at the same time for the whole chip, so every mirror moves at the same instant.

As depicted in FIG. 29, in addition to the components of a basic optics system (e.g., lenses, mirrors and stops), three additional elements are used in conjunction with the preferred embodiments, which can be used separately or in combination with one another. The first element is a digital micro-mirror device (e.g., DMD 21) suitably interfaced and connected to a computer or microprocessor control unit into the optical path. This element adapts the shape of the wave front that is permitted to pass through the optical train to the final lens and be focused onto the image plane. The second element is a spatial light modulator (SLM 8 or deformable mirrors) suitably interfaced to a computer or microprocessor control unit into the optical path. This element controls the phase of the light across the wave front. The third element is a feedback control circuit designed to test the current state of clarity of the images being produced by the current settings of the optical adjustments of the first and second elements. Based on the latest observed clarity, previously tested settings, and a controller algorithm connected between the feedback circuit and the controlling algorithms running the first and second elements, the computer invokes a series of corrective adjustments to the first two elements, seeking a best fit to optimize the wave front conjugation that mitigates the effects of diffraction, propagation, and turbulent distortions.

The feedback system utilizes an analysis of image quality to determine updated settings to apply to the apodization mirror (DMD 21) and deformable wavefront corrector (e.g., spatial light modulator SLM 8 or deformable mirrors). The wavefront corrector has a surface controlled by a plurality of actuators. These actuators are programmed to approximate a sum of weighted Zernike modes selected to approximate the conjugate of the current short-exposure blur deformation to the propagated phase perturbations in the system aperture. Specific settings the phase map are governed by a programmed sequence of perturbations designed to produce a basic estimate of each of N Zernike modes over a series of N+1 sample images. Feedback response is used to selectively modify the mean settings of the Zernike modes according to the current atmospheric state, with modifications to the present setting based on response from individual image responses to new modified settings. The system apodization (e.g., DMD 21) may be separately tuned to reduce the effective number of Zernike modes that must be tracked by the system. An annular setting on the apodization pattern permits the maximum angular frequency response of the complete system aperture while simplifying the modeling of the Zernike perturbations used to drive the wavefront corrector (e.g., spatial light monitor SLM 8 or deformable mirror).

The Adaptive Phase component 104 in FIG. 10 may be referred to in conjunction with the terminology wavefront corrector and comprises a spatial light modulator (SLM 8) and associated interface hardware. For example, Thorlabs sells a kit for an SLM device which could be adapted to provide a prototype device the enabling capability necessary for a proof-of-principle demonstration of the invention. This SLM is capable of 5 kHz operational variations which is greater than the 1-2 kHz envisioned necessary to support ground-level correction of turbulence.

The Image Capture element 108 comprises an imaging camera and associated frame grabber or other hardware interface and associated cabling. An example of the type of camera suitable for development purposes is the Basler Ace acA2000-340kc camera capable of 340 frames per second full image capture rate, but also up to several thousand frames per second capture for reduced (subframe) region of interest image captures. In conjunction with this camera, the EPIX PIXCI-E8 Frame Grabber with dual coaxial cables provides a data collection capability sufficient to capture the image data produced by the Basler camera.

In addition to the optical system that has been the focus of the discussion up to this point, a controller software package including several sub-modules will be located on a PC type computer. These sub-modules interact through a main controlling software program termed the Master Adaptive Controller 106. The sub-modules of this main control software could potentially be either contained on the same computer or be subtasked to independent micro-controllers in communications with the SLM and DMD submodules. These two modules are the Aperture Controller 103 and the Phase Controller 105. Each module can take simple information produced by the Master Adaptive Controller 106 and translate this information into specific control inputs required by each hardware sub-module to set the hardware to its desired dynamic setting.

The Image Capture module 108 contains the camera and frame grabber equipment, but it also includes a small module to either (a) collect a full frame image and pass it out to be displayed to the user or (b) collect subframe region of interest images and pass these on to the Image Processing module that determines the image state metrics and passes the results of this analysis to the Master Adaptive Controller.

The methods used in the processing of the data as well as the means of modifying the DMD in support of the phase correction solution are next described. Referring to the model of the phase variations present in a system aperture as illustrated in the lower left corner of FIG. 7B, the perturbations in the phase had a certain characteristic length scale that tended to shrink as turbulence worsened. Here, the impact of applying a given aperture mask to that perturbation pattern in the form of an Annular Apodization (FIG. 11) will be considered.

Figure 11:
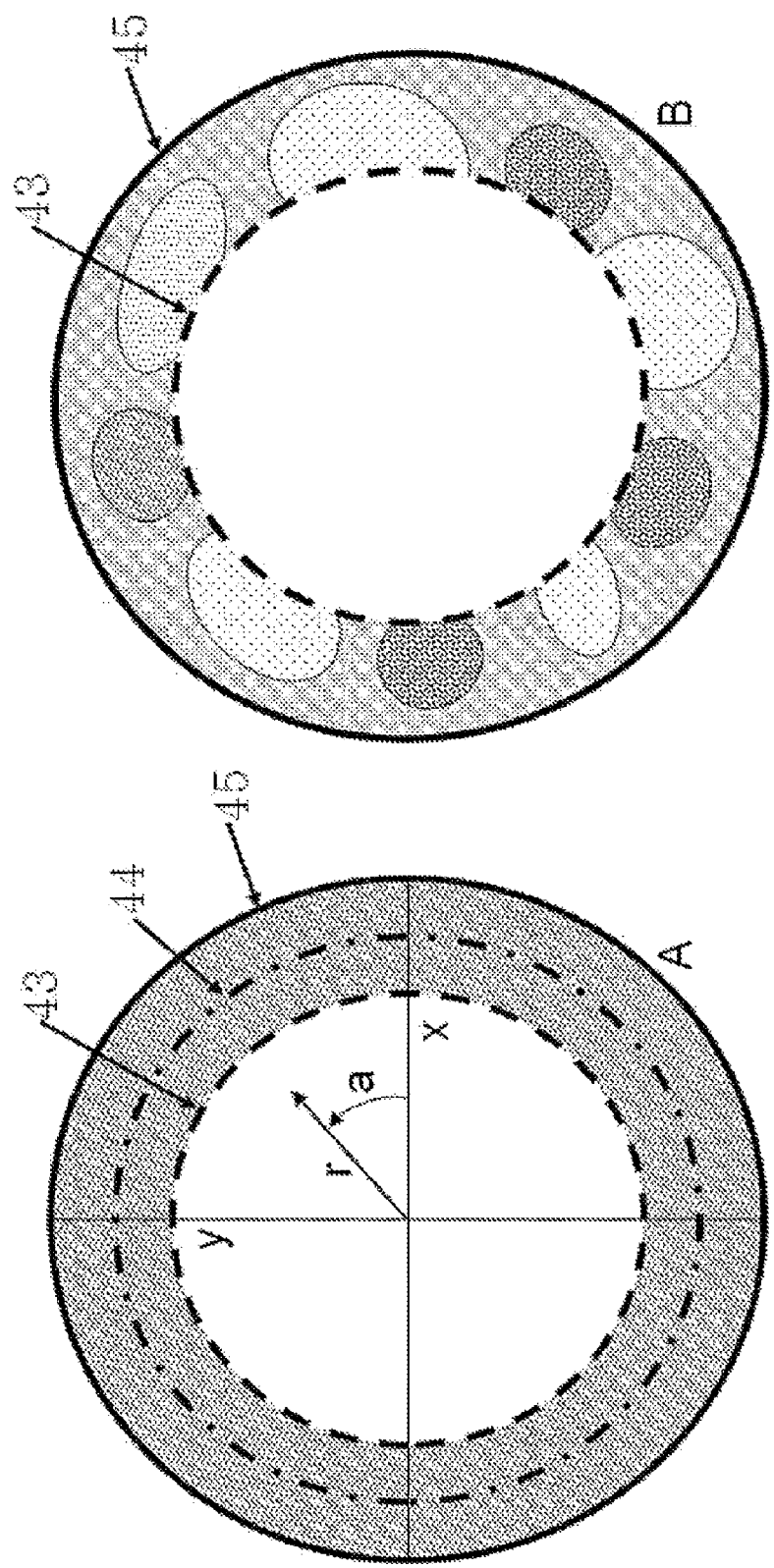
FIG. 11 schematically illustrates the impact of applying a given aperture mask to a perturbation pattern in the form of an Annular Apodization.

FIG. 11 illustrates the general DMD apodization and SLM phase controller schemes. In a preferred embodiment, the master controller software will direct information concerning the new settings to be applied to the DMD to produce an inner circle 43 and an outer circle 45. In terms of phase, a series of coefficients will be used to designate the phase along the inner circle 43, the middle circle 44, and the outer circle 45 using a scheme that permits either linear phase variations across the span between the inner and outer circles or a quadratic model. In the azimuthal direction, denoted by angle "a", a series of Fourier expansion terms will be used. The exact nature of this model is discussed further below.

An alternative choice to the selection of an annular apodization pattern n annular apodization pattern might be to simply choose an apodization pattern that restricts the aperture so only (on average) a single mode of turbulence is present (i.e. X=1). As shown in graphically in FIG. 7B (bottom left corner) such a choice is close to the diffraction limited behavior (that is, in the language of FIG. 7B, the short-exposure resolution, $R_S$, approximately equals the diffraction limited behavior of $X^2$). But by choosing to stop the aperture down, the maximum frequency passed by the system entrance pupil, given by $\Omega_0'=D'/\lambda$, is significantly reduced when the new entrance pupil diameter D' may be considerably smaller than the original system diameter D.

Figure 12:
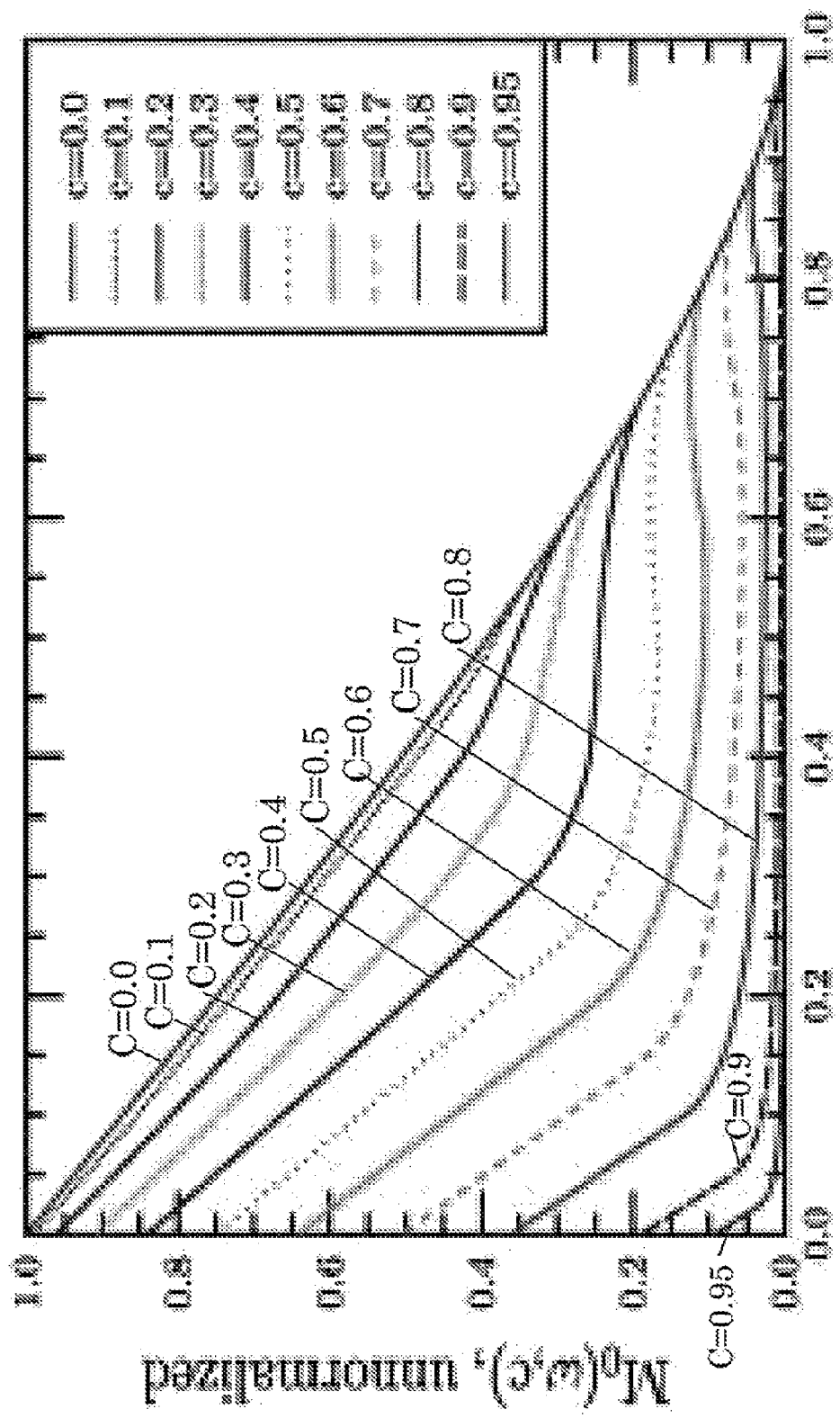
FIG. 12 schematically illustrates plots of the Modulation Transfer Function of an imaging system for a central obscuration of relative diameter c=D1/D2 (where D1 43 and D2 45 are the inner and outer diameters in FIG. 11A, respectively).

An annular apodization pattern has two advantages over an unobstructed circular pattern. First, as comparison between FIG. 11 (right annulus B) and FIG. 7B (bottom left corner) reveals, by applying a central mask several independent phase perturbation regions will be removed from the central region of the entrance pupil (in the illustration, six perturbation regions are masked off). This masking reduction simplifies the determination of the dynamic perturbation pattern for a given region of the object plane. Secondly, regardless how large the central obscuration is, the annular pupil system will always have the same maximum angular resolution as an unobstructed system of the same outer diameter. This is because the outer diameter always determines the maximum angular frequency response. This point is illustrated in FIG. 12, which plots the MTF of an imaging system for a central obscuration of relative diameter $c=D_1/D_2$ (where $D_1$ and $D_2$ are the inner diameter 43 and outer diameter 45 in FIG. 11 (part A).

Referring once again to a preferred embodiment system comprising an SLM 8 (for phase correction) and a DMD 21, this system is more effective than a system featuring a Wavefront Sensing system, since such systems are practically impossible to implement in the atmospheric boundary layer because one can never guarantee the presence of a "guide-star" in the object plane unless one places such a beacon there. In general, one must simply use the available light arising from natural scene elements, without any artificial augmentation. To exemplify this situation consider the "scene" illustrated in FIG. 13.

Figure 13:
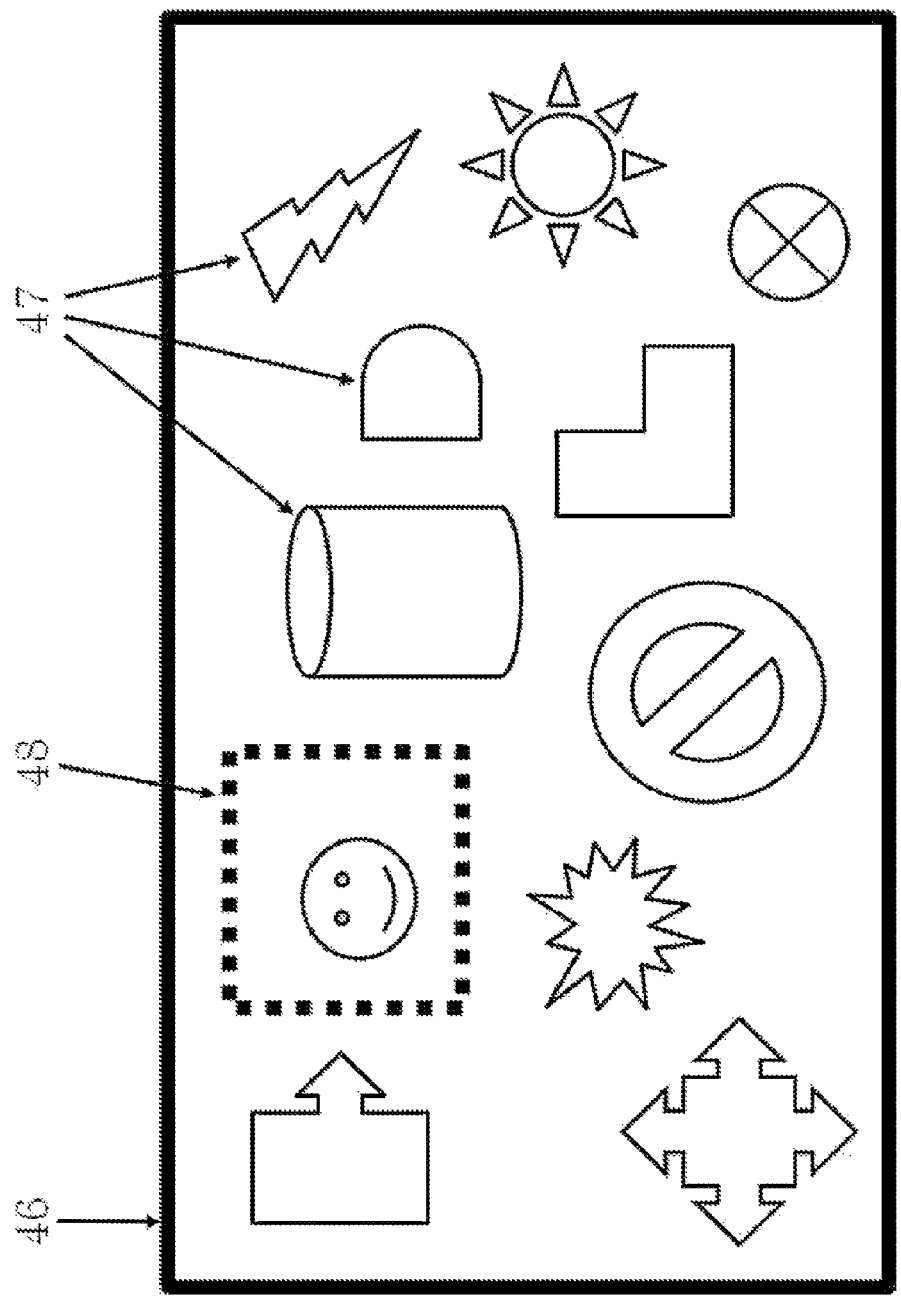
FIG. 13 is a schematic illustration of an object plane 1 "scene."

FIG. 13 illustrates that as in any object field 46 there will be a series of objects of potential interest 47 scattered across the object field/plane. However, due to the turbulence effect termed the "isoplanatic patch size" not all of the objects in the image field will exhibit identical turbulent distortion. At any given moment, one must therefore focus attention on a particular sub-region of the complete image field for adaptive correction. This sub-region is typically called a "Region of Interest" (ROI) 48. A number of commercially available cameras allow the user to select a sub-image ROI window and to pass only those pixels within the window to the output image buffer at a much higher rate than for a full image frame.

The intent for using such a sub-image region in the image plane is to broadly simulate the behavior of a wavefront sensor without requiring the presence of a known light source in the object field. In any event, the placement of a single beacon or "guide star" in the object plane would not be very useful if one wished to generate corrections in different portions of the image plane in moderate to high turbulence. Anisoplanatism in the turbulent field would limit the angular region over which any active beacon correction would be valid, since each beacon source is only useful for diagnosing turbulence errors in a relatively small angular region about its own position. Thus, for an image containing multiple ROI's, such a single known active beacon would be relatively meaningless.

To apply a passive correction, several further pieces of information are needed. The first is the time scale in which the atmosphere is expected to vary significantly. A typical number cited is 100 Hz for ground-based observations. A number of factors will cause this figure to vary in our favor. One factor is that the wind speed is slowest closest to the ground so that the turbulent field along a given path is replaced more slowly near the surface, where ground-based sensors are designed to function. Another factor is that the path weighting function for the image distortion and blur effects is largest near the system aperture, which will be typically the closest point to the ground due to terrain effects. Finally, turbulence is a function of height which is strongest close to the ground which is the source of heating or cooling of the air. Thus the strongest turbulence that has the most effect on the image degradation is also the slowest evolving.

A second factor of consideration is an efficient approach to approximating the function of a wavefront sensor. To address this problem reference is made to FIG. 11 (part A). If an annular aperture pattern that features a width (i.e. $(D_2-D_1)/2$) that is of the order of the coherence diameter is selected, then it is expected that phase perturbations across the annulus will be roughly linear, but may vary around the annulus. This suggests a pair of relationships. The phase around the inner diameter 43 ($D_1$) and outer diameter 45 edges of the annular region is modeled using the following two formulas:

$$\Phi_{inner} = A0 + A1\cos(1\theta) + A2\cos(2\theta) + A2\cos(3\theta) + A4\cos(4\theta) + B1\sin(1\theta) + B2\sin(2\theta) + B3\sin(3\theta) + B4\sin(4\theta)$$

$$\Phi_{outer} = C0 + C1\cos(1\theta) + C2\cos(2\theta) + C3\cos(3\theta) + C4\cos(4\theta) + D1\sin(1\theta) + D2\sin(2\theta)D3\sin(3\theta) + D4\sin(4\theta)$$

Here, constants A0 through D4 are to be determined. By choosing this model it is possible to include up to 8 perturbation regions around the annulus, which is sufficient to correct for the first 12 Zernike terms, or effectively cover a quadrupling of the range capability.

From a practical standpoint, however, the variables $\Phi_{inner}$ and $\Phi_{outer}$ are only placeholders for the actual model of phase we wish to estimate, given by $$\Phi(\theta,\delta) = \Phi_{mean}(\theta) + \delta X_{delta}(\theta), \quad (1)$$

where, instead of dealing with the inner and outer edge phases, the phase about the central ring of the annulus (44 in FIG. 11, part A) is modeled, over which the mean phase is modeled:

$$\Phi_{mean} = (\Phi_{outer} + \Phi_{inner})/2$$

and the radial component of the phase perturbation based on the variable:

$$X_{delta} = (\Phi_{outer} - \Phi_{inner})/2$$

Figure 14:
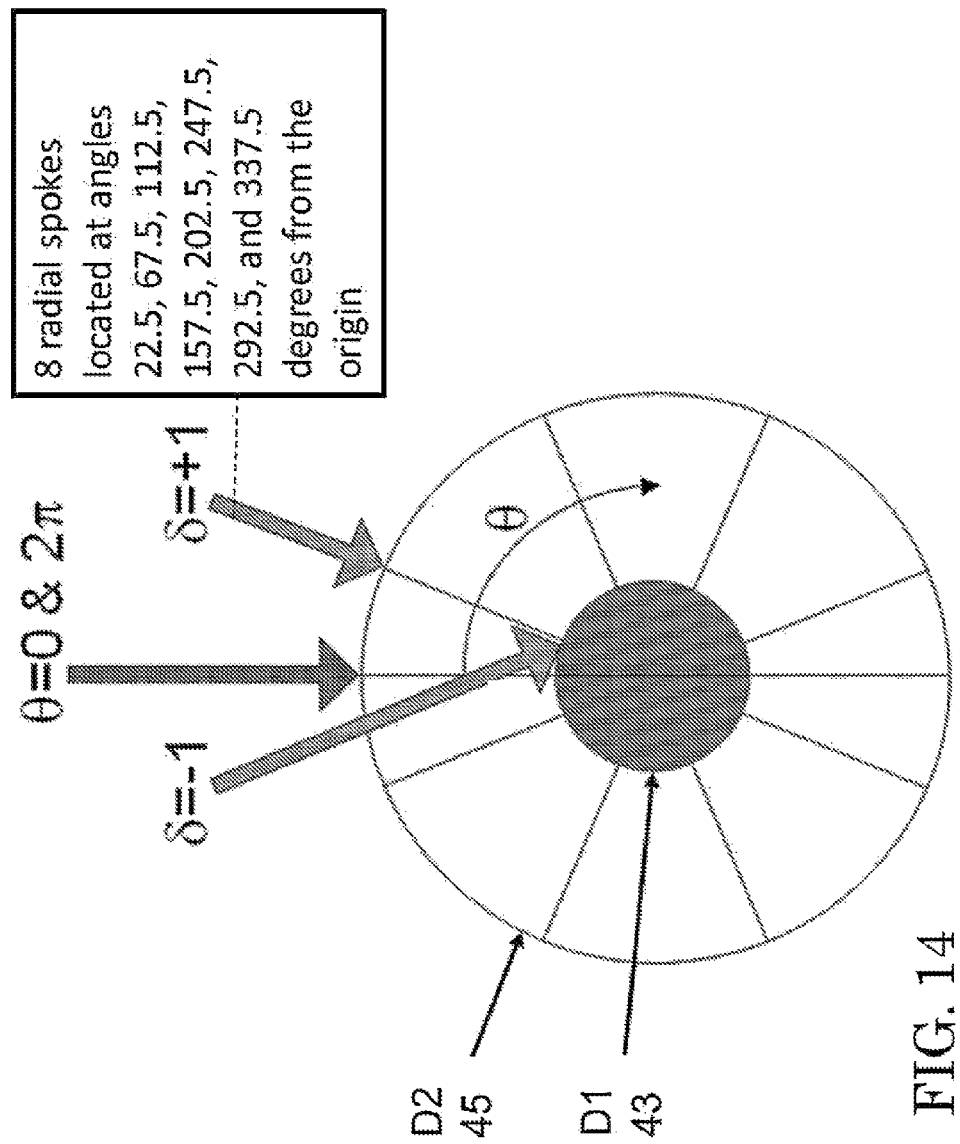
FIG. 14 schematically illustrates a series of 8 radial spokes located at angles 22.5, 67.5, 112.5, 157.5, 202.5, 247.5, 292.5, and 337.5 degrees from the origin at the top of the circle; these radial lines denote the boundaries of 8 sampled regions subdividing the annular aperture into sub-apertures for the purposes of constructing the estimated phase model.

The reason for using a different variable type (X versus $\Phi$) is that $X_{delta}$ carries a dimension of phase per delta distance. The use of these functions requires a coordinate system in the system annular aperture, illustrated in FIG. 14. The radii of the inner diameter D1 (43) and outer diameter D2 (45) are the same as in FIG. 11, but the radial variable $\delta$ has been introduced such that $\delta=-1$ along the inner radius and $\delta=+1$ along the outer radius, while the azimuthal coordinate, $\theta$, has been selected to vary in a clockwise manner.

Figure 15:
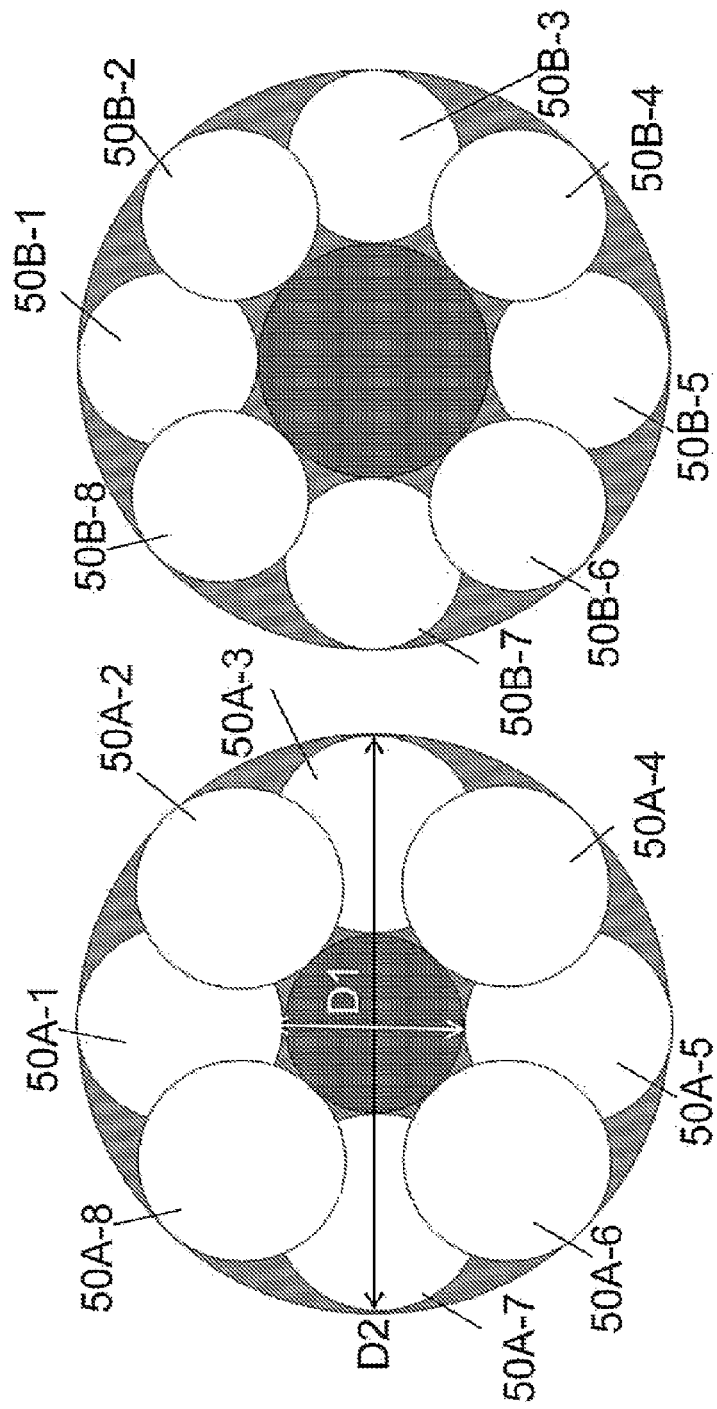
FIG. 15 schematically illustrates two examples of subdivision of an annular region into eight circular sub-aperture sampling regions for two different ratios of c=D1/D2.

FIG. 15 also illustrates a series of 8 radial spokes located at angles 22.5, 67.5, 112.5, 157.5, 202.5, 247.5, 292.5, and 337.5 degrees from the origin. These radial lines denote the boundaries of 8 sampled regions subdividing the annular aperture into sub-apertures for the purposes of constructing the estimated phase model. The approach is taken that by sampling the apparent tilt of a series of sub-aperture images, one associated with each of these 8 regions of the annulus, it will be possible to estimate the functional form of both $\Phi_{inner}$ and $X_{delta}$.

Figure 16:
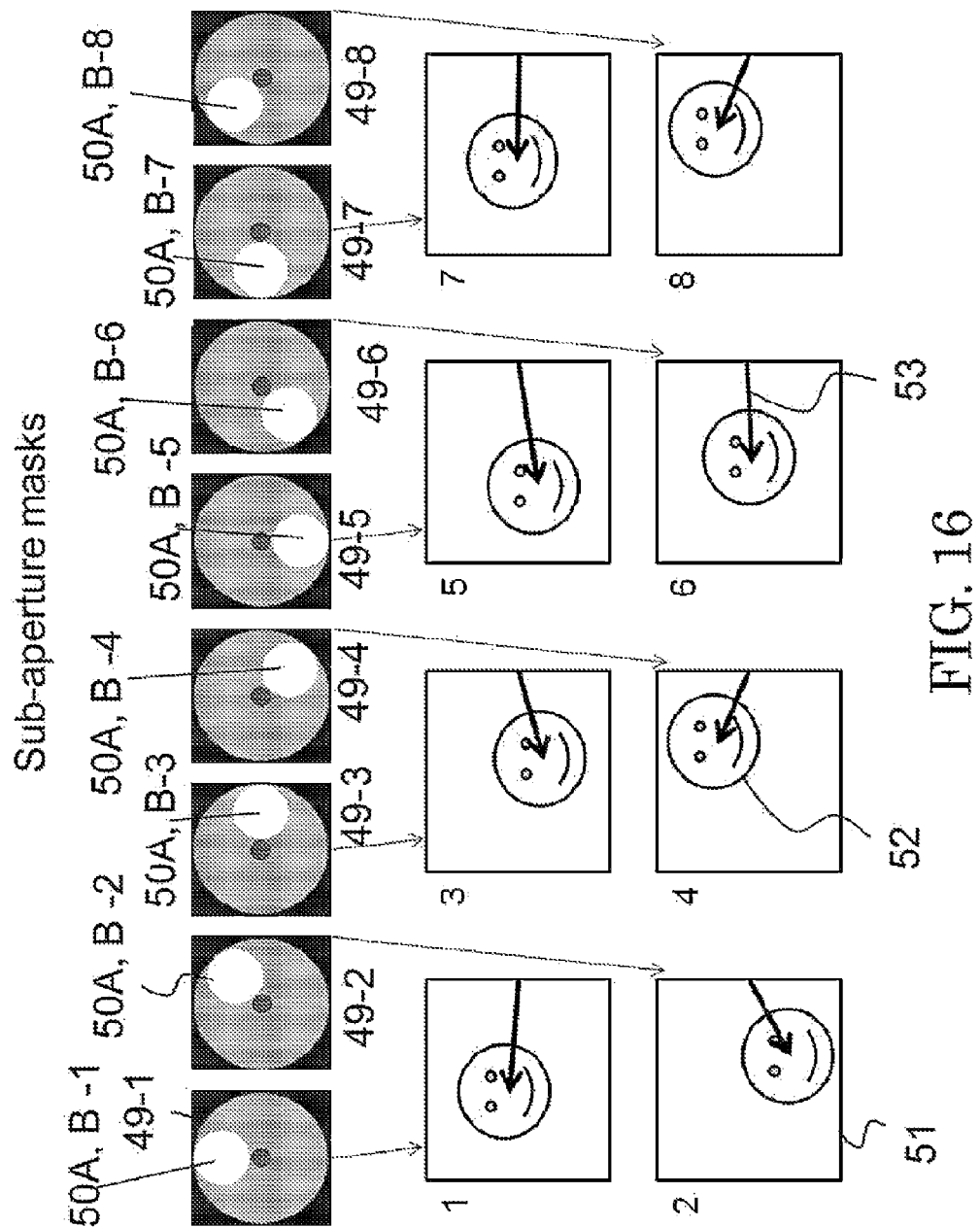
FIG. 16 schematically illustrates 8 sub-aperture masks with highlight showing the relative position of the windowed region (in white) as compared to the original aperture extent bounded by the black regions) and for each sub-aperture selected, a sub-frame image is taken (correlating to the Region of Interest in FIG. 13); each sub-aperture image being taken through a different portion of the overall aperture; whereupon the apparent location of the main feature of interest in the sub-frame will tend to be shifted slightly from image to image due to differences in the wavefront tilt experienced by light arriving from the object field in different portions of the system aperture, and this shifting in position can be tracked by using matched filtering techniques (including pattern matching) to produce a vector 53 in each sub-aperture image 51 to the centroid of the main object of interest 52.

To measure the tilt in each sub-aperture region of the annular aperture, a series of sub-aperture masks is applied to the aperture in succession. FIG. 16 illustrates two examples of subdivision of an annular region into eight sub-aperture sampling regions for two different ratios of $c=D_1/D_2$.

In these figures, the dark circular region in the center (having diameter $D_1$) is the central obscuration zone of the main annular aperture. The eight overlapping circles between the inner and outer circles represent the sub-aperture circles (e.g., 50A-1, 50B-1) to be tested in separate rapid image frame captures. Given that the atmosphere is evolving at a rate of 100 Hz, the eight (8) images that must be captured to determine the current state of the phase perturbations over the annular aperture mask must be taken at a significantly higher frame rate. The Basler camera cited above can sample at rates above 3 kHz for subframe image acquisition. At a rate of 2 kHz the Basler camera (or suitable alternative camera) could sample the 8 sub-aperture regions in 0.004 seconds, a rate fast enough to keep pace with the atmospheric evolution.

The data to be gleaned from the set of 8 sub-aperture images is schematically illustrated in FIG. 16.

To begin, prior to each image being sampled, the DMD is given a particular sub-aperture mask 49 that will include a given sub-region 50 of the total annular aperture. There are 8 sub-aperture masks (49) total (seen along the line of masks indicated by 49-1 through 49-8 in FIG. 16), but where the gray regions are only to highlight the relative position of the windowed region (in white) as compared to the original aperture extent bounded by the black regions.) For each sub-aperture selected, a sub-frame image is collected (as illustrated by Region of Interest 48 in FIG. 14). As shown in FIG. 16, because each sub-aperture image 51 is being taken through a different portion 50A, B of the overall aperture, the apparent location of the main feature of interest 52 in the sub-frame will tend to be shifted slightly from image to image due to differences in the wavefront tilt experienced by light arriving from the object field in different portions of the system aperture. This shifting in position can be tracked by using matched filtering techniques that are well known in the image processing field. The result of this pattern matching is that a vector 53 may be assigned in each sub-aperture image to the centroid of the main object of interest 52. This vector 53 points from a specific location on the edge of each sub-frame 51 to the apparent centroid of the dominant image feature 52 in the sub-frame 51. The set of eight vectors may be collectively referred to as $V_i$, where the index variable i varies from 1 to 8 (i=1 . . . 8). Each $V_i$ vector is two-dimensional. Therefore, from 8 sub-aperture sub-frame images 51(1-8) one obtains 8 vectors 53 that contain a total of 16 elements of data.

However, as was pointed out when discussing the Zernike tip and tilt terms (as shown in FIG. 4), the overall shift in location of an object does not affect image quality. That is, from the standpoint of the above sampled 8 sub-aperture images, it does not matter where the edge of the sub-frame begins, since the relative positions are all that matter. One way to remove such shifts in position is to compute and subsequently remove the effects of the origin of such vectors. This is accomplished by computing the mean or average position of the dominant feature. The average is denoted as:

$$\overline{V} = \Sigma_i V_i / 8$$

This mean shift is then subtracted from the raw vectors to produce the perturbation vectors:

$$V'_i = V_i - \overline{V}$$

Removal of the mean vector, however, means that the sum of the Vi' vectors is now zero, and two degrees of freedom have been lost since the sum of the x and y components of the vectors are now separately zero and therefore, knowing 7 of the vectors, one can always compute the 8th. This might lead to problems because the inner and outer phase models introduced just prior to Equation (1) seem to show eighteen (18) associated coefficients; whereas only 14 independent data elements remain. However, it will be shown below that at the resolution of our measurements, only 10 independent variables are required.

Consider first the mean phase function. When coefficients A0 and C0 from the inner and outer radius phase models are added, an average phase is obtained. The tilt created by this average will be zero. It is therefore unmeasureable, and is in fact not needed in the correction process (it is a piston effect which does not affect image quality).

Next, observe that the model of both the $\sin(1\theta)$ and $\cos(1\theta)$ terms in both the mean and delta terms is generated by a tilt that is constant over the annulus. Thus, these terms are eliminated when removing the mean. Therefore, anywhere $\sin(1\theta)$ and $\cos(1\theta)$ terms appear in the mean or delta expansions they may be ignored. The models of the mean and delta terms may thus be written:

$$\Phi_{mean} = E2\cos(2\theta) + E3\cos(3\theta) + E4\cos(4\theta) + F2\sin(2\theta) + F3\sin(3\theta) + F4\sin(4\theta)$$

$$X_{delta} = G0 + G2\cos(2\theta) + G3\cos(3\theta) + G4\cos(4\theta) + H2\sin(2\theta) + H3\sin(3\theta) + H4\sin(4\theta)$$

Thus, 14 data elements are sufficient to model 13 phase model coefficients.

Figure 17:
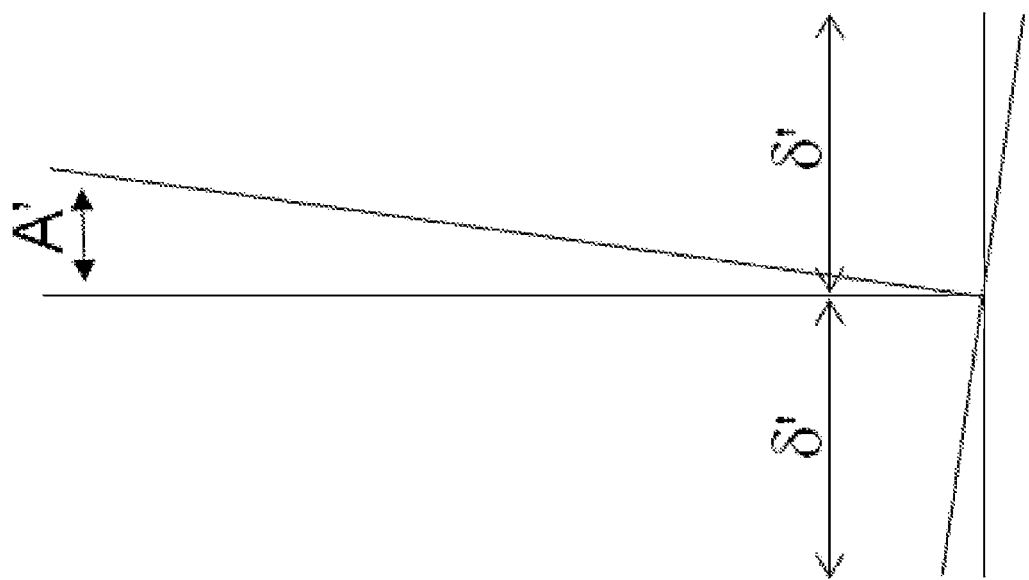
FIG. 17 schematically illustrates the conversion of an angular shift of A' (the measured shifts given in pixels of shift times angular extent per single pixel) into phase form.

To produce the equations for these 13 coefficients one must first translate the measured shifts (given in pixels of shift) into phase form. First, let IFOV denote the instantaneous field of view of a single pixel in radians. Then, a relative shift of $V_i'$ pixels will equate to an angular shift of $A_i' = \text{IFOV}*V_i'$. FIG. 17 illustrates the conversion of $A_i'$ to a phase.

If, given an angular shift A' in the radial (delta) direction, then over a distance $\delta'$ in half-width between the center of the annulus and the edge ($A_i'$ is simply the "i"th angle of type A'), the shift that will occur in the wavefront will be $\delta'*A'$. But a shift of $\lambda$ equates to a phase shift of $2\pi$. That is, the physical shift translates into a phase shift of $\delta'*A_i'*k$, where k is the wavenumber, $k=2\pi/\lambda$. (The length $\delta'$ is used to denote the physical size of half the width of the annular ring in the SLM where this phase shift must be implemented.)

In general $A_i'$ will not be directed in solely the radial direction. Therefore the radial component of $A_i'$ must be evaluated. In the following discussion, these angular vectors shall be denoted $A_i'$ in order to remind us of their vector nature. It therefore remains to determine the radial component of each sample tilt vector. The following symbology is used:

$$A_i'(\rho) = \underline{\rho}_i \cdot A_i'$$

to represent the "dot" (scalar) product between the angular vector and the corresponding radial unit vector pointing from the system aperture center to the center of the sub-aperture (in the same angular system as in FIG. 14) for the "i"th sub-aperture image. Once the component in the radial direction is known, one may generate a phase shift for this radial component, given by, $$X_{delta}(\theta_i) = A_i' k \delta'$$

where the $\theta_i = (i-1)*\pi/4$, $i=1 \ldots 8$. The $X_{delta}$ coefficients thus can be modeled directly, and the series of values obtained can be used to compute the expansion coefficients G0 through H4 directly. (Note that $\sin(4\theta)=0$ at each of the $\theta_i$ sample locations so no contribution is obtained from evaluating H4. Therefore H4 is set to zero (H4=0)).

Figure 18:
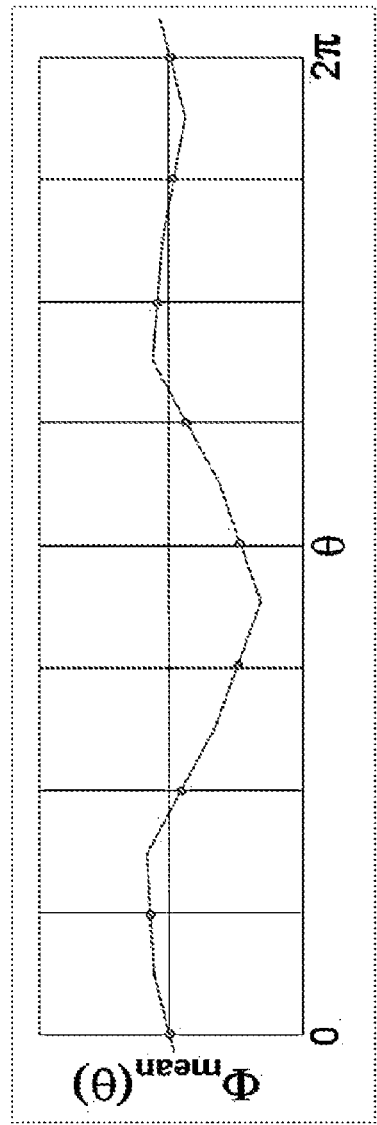
FIG. 18 illustrates the "means" to be used to splice together a sequence of sub-aperture measured tilt values computed in the azimuthal direction, forming an azimuthal phase perturbation function that is periodic over $2\pi$ in the $\theta$ variable illustrated in FIG. 14.

The process is not as straightforward for the mean phase function. The principle issue is that a tilt is sampled rather than an actual phase. In this case there may be successive azimuthal mean shifts in magnitude between successive sub-aperture images. Nonetheless, because the mean phase could be removed, it means one can always arbitrarily shift the phase pattern produced in the azimuthal direction up or down such that the average is zero. The mean shift removal also removes the first order sine and cosine dependencies. But one must still stitch together subsequent samples of the tilt to produce an overall function that is periodic over $2\pi$. A typical result is shown in FIG. 18.

To be more specific, the azimuthal component of the tilt vector for each sample is written using the following equation:

$$A_i'(\varphi) = \underline{\varphi}_i \cdot A_i'$$

Here, $\underline{\varphi}_i$ is the unit vector in the azimuthal direction for the "i"th tilt sample. Then, $A_i'(\varphi)$ is the tilt magnitude in the azimuthal direction for the "i"th sample. Because turbulence perturbations are typically weak, the magnitude of these tilts will not be very large. As can be seen in FIG. 19, the sum of these tilts must add to zero, for otherwise the curve will not be periodic. To impose this restriction it may be necessary to apply a correction to the set of $A_i'(\varphi)$'s such that the mean tilt can be computed as, $$\overline{A_i'(\varphi)} = \Sigma_i A_i'(\varphi)/8$$

and a corrected set of tilts can be defined as $$A_i''(\varphi) = A_i' - \overline{A_i'(\varphi)}$$

Such a set of azimuthal tilts ensures that any "pathological" (non-zero curl) cases are eliminated which are mathematically possible, but which are meaningless in terms of physically realizable phase models. The reason for their impossibility stems from the fact that the phase is a real-valued continuous function. The tilt is a gradient operating on this function. But the gradient of a scalar must have a zero curl.

To construct a phase model (illustrated FIGS. 19A-19F), one begins by computing the $A_i''(\varphi)$ components. Then, a plot is constructed whose total length is $\pi(R1+R2)$, which is the length around the central line ($D_2$ or 44 of FIG. 12A) of the annulus. Starting at the origin at the left end of the plot, a line is traced to the point $[\pi(R1+R2)/16, A(1)''(\varphi) \pi(R1+R2)/16]$, and continuing for the remaining points across the graph. That is, the 8 line segments are concatenated end-to-end to form a complete azimuthal function. This graph is then equivalent to a functional form that can be mathematically modeled and used to generate the mean phase coefficients through mathematical integration (directly), or, more simply, through a quadrature method.

It should be noted, however, that while it is proposed to automatically remove the mean $A_i'(\varphi)$, by computing this mean there is an independent check of the fidelity of the method. Should this quantity become large, it is an indicator that there are phase fluctuations that are not being accounted for in the 8 sub-aperture sampling set.

Practical Implementation Using the DMD

The Texas Instruments Digital Micromirror Device (DMD) can store approximately 1792 pre-loaded digital binary images in XGA format. This suggests that the methodology described previously in this section can be implemented by developing several series of related image mask templates (i.e. 1-bit images in XGA format that are downloaded to the DMD).

However, these image mask sets perform three separate tasks, only two of which have been described so far. The three tasks involve different selections of positions of the windows in the aperture depending on the function, and also on the underlying optical telescope for which these operations are performed. Consequently, different mask models are needed for both refractor and reflector telescopes (without or with a pre-existing central obscuration).

FIG. 19 illustrates several alternative apodization methods available for reducing the order of complexity of the random phase pattern. The basic models for the window masks are given in FIGS. 19A through 19F. Models 19A through 19D show the types of masks that would be used with reflector telescopes, while models 19E and 19F provide the same functionality for a refractor telescopic aperture that has no secondary mirror central obscuration (whose extent is denoted by circle 55 in each applicable figure). FIG. 19A illustrates the primary approach, where the main system aperture (60) forms the outer boundary of the annular ring. In this configuration, the inner region (55) denotes the effect of the telescope's central secondary mirror which obscures a small central region of the aperture. The apodization method for this case blocks off a larger region (57) whose radius, $r_1$ (56), is greater than that of the secondary mirror region (55). In FIG. 19B an inner apodization region is again used, involving a similar approach (and numbering system denoting analogous structures as in FIG. 19A). In addition, an outer apodization region is added, extending from circle 59 to system aperture 60, starting at radius $r_0 < D/2$ (58). In FIG. 19C the same outer apodization region is used as in 7B, but the inner radius of the annulus is defined by the secondary mirror obscuration region (55). In FIG. 19D a non-annular region is used. This region is offset from the center of the system aperture by distance 61, sufficient that the circular outer obscuration region 63 of radius 62 is completely unobscured by the absolute boundaries associated with the system entrance pupil 60 and secondary mirror 55. In FIG. 19E a similar situation to FIG. 19D is considered, but involving an embodiment in which the optical system does not contain a secondary mirror. In this case, the radius $r_0 < D/2$ (62) of the outer region can be centered on the system aperture (that is, distance 61 from 19D can be considered zero). In FIG. 19F the general case illustrated in FIG. 19B is again implemented, but here there is no secondary mirror so the inner obscured region 57, of radius 56, is unrestricted in its inner diameter. The outer edge of the system aperture is designated by the number 60. FIGS. 19D and 19E illustrate reduced circular apertures necessary for the sub-aperture images. Radial vectors 56 and 58 denote the inner and outer radii of a masked annular region. If radial vector 56 is not shown, it indicates that the mask need not have a central obscuration in the mask itself since the system obscuration will suffice. Similarly, if radial vector 58 is not present, it means that there is no need for a programmed outer edge of the mask.

Figure 19A:
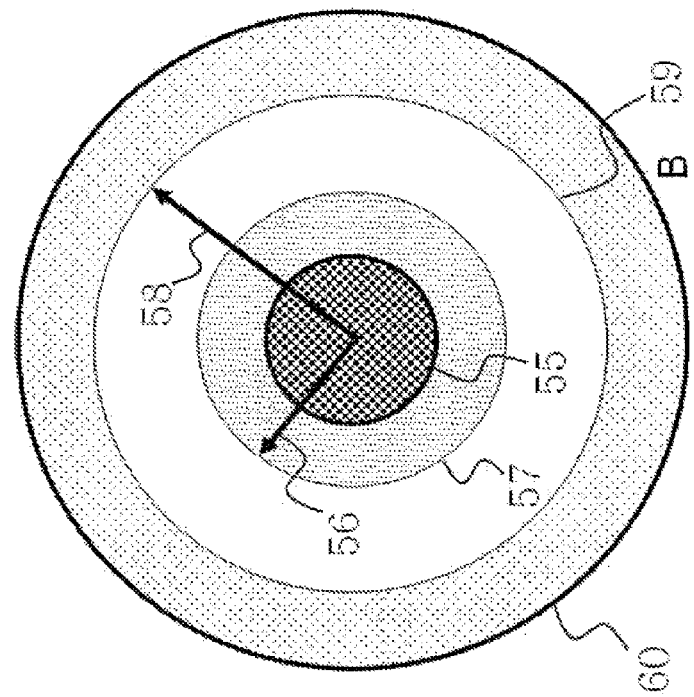
FIGS. 19A through 19F are schematic representations of the basic models for window masks.
Figure 19B:
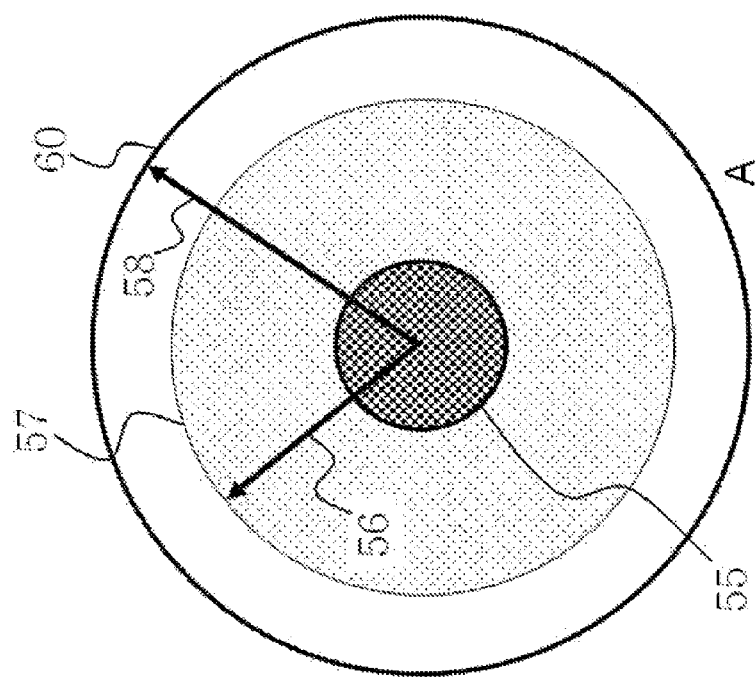
Figure 19D:
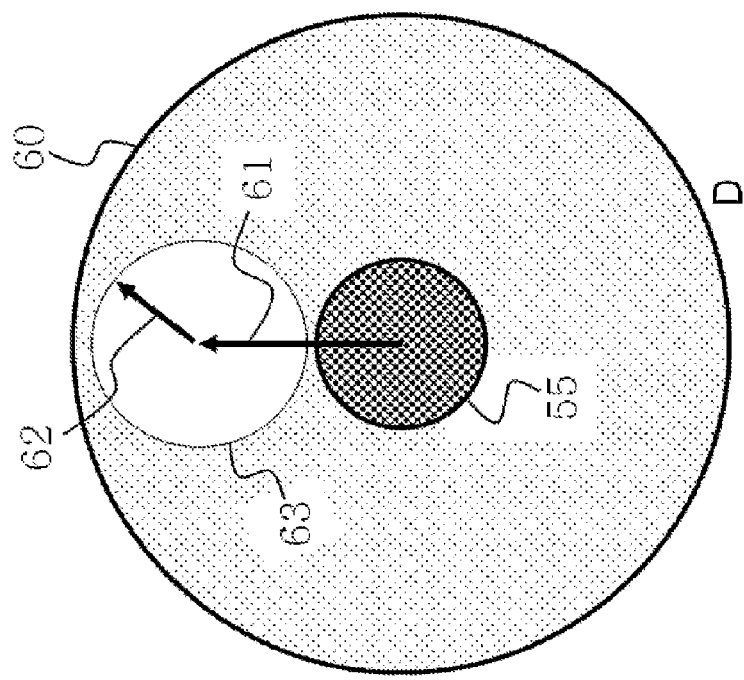
Figure 19C:
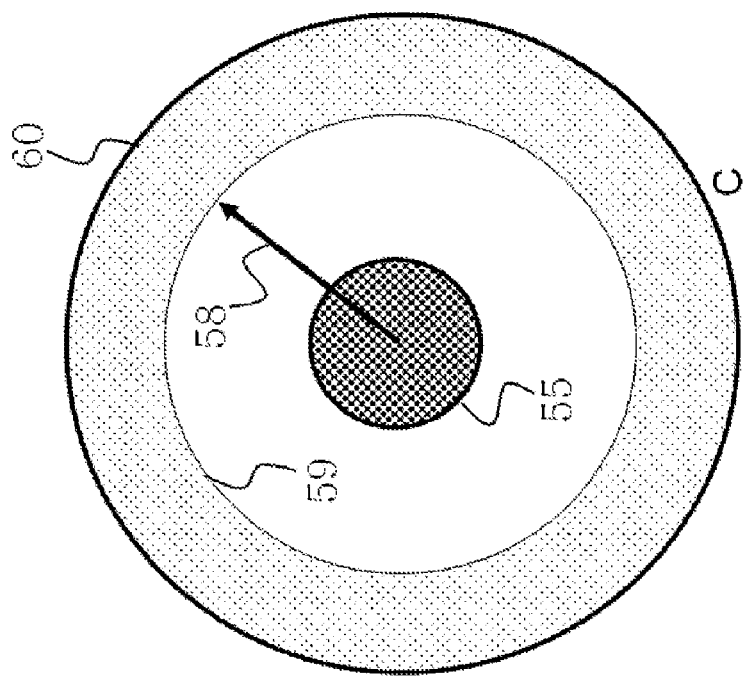
Figure 19F:
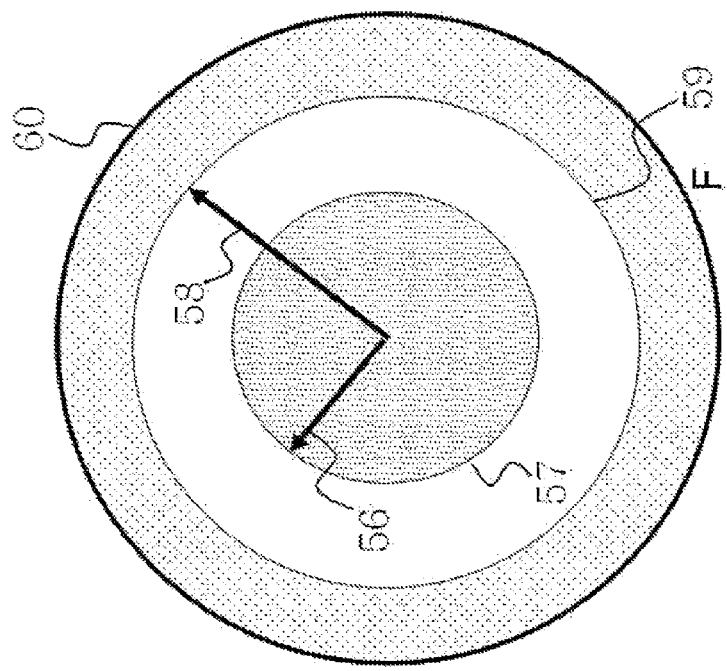
Figure 19E:
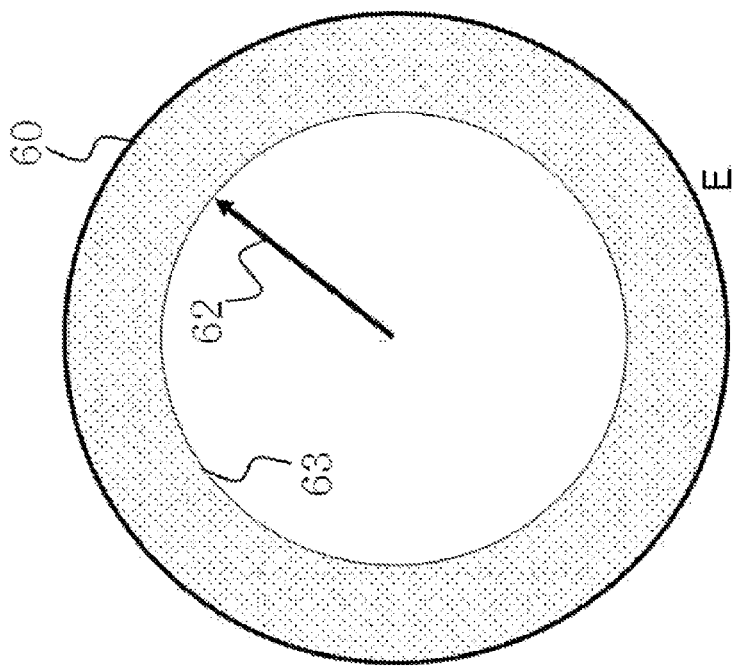

FIG. 19D is particularly useful for purposes of building sub-aperture masks. In this figure, 61 is an offset vector from the center of the aperture to the center of the mask's open circular region. The radius of the open mask region is designated as 62, the boundary of the open region 63 through which light may pass.

Using templates similar to those shown in FIGS. 19A through 19F, sets of masks of different sizes and orientations may be generated and loaded onto the DMD. These masks may then be referenced by index number to act as a programmable aperture window function at any time.

FIGS. 20-25 illustrate a series of aperture mask model sets of varying form factors and sequences. In each of these sets, the white region is the portion of the image that will allow light to pass through the mask. The outer black and inner central obscuration regions represent opaque portions of each mask image panel.

Figure 20:
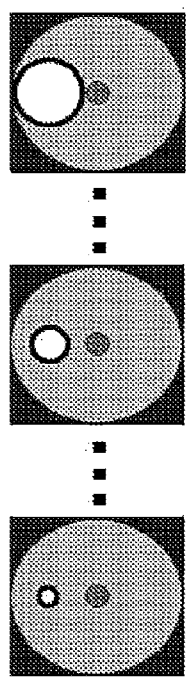
FIG. 20 is a schematic illustration of masks that may be used prior to the main sub-aperture testing phase (optionally some 50 to 100 masks in total (the dots indicate intermediate forms of the basic mask)) that could be used to sense the level of the turbulence and to determine the optimum annular aperture mask to be used in image correction.

The mask set shown in FIG. 20 may be used to initialize the system prior to main sub-aperture testing phase. This set (some 50 to 100 masks in total as the dots indicate intermediate forms of the mask are not shown) would be employed to sense the level of turbulence and to select a reasonable initial aperture size based on the transverse coherence length.

Figure 21:
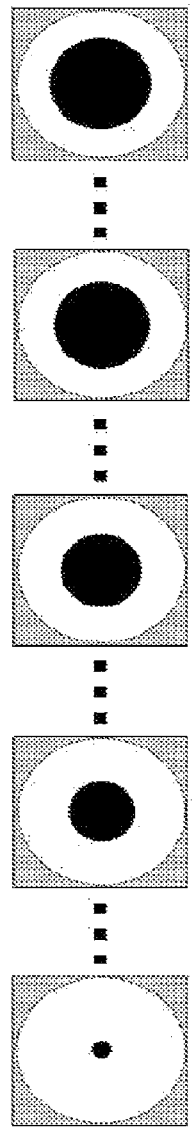
FIG. 21 is a schematic illustration showing the most basic annular aperture mask set that could be used as the default obscuration approach in which a variable amount of the center of the system aperture is blocked in producing a variable annulus width; for example, there would be some 20 of these masks pre-computed and loaded in memory on the DMD device.

The mask set shown in FIG. 21 illustrates the most basic annular aperture mask set. It would be the default obscuration approach in which a variable amount of the center of the system aperture would be blocked in producing a variable annulus width. Again, there could be approximately 20 of these masks loaded, although the precise number may vary as determined by those of ordinary skill in the art without departing from the scope of the invention.

Figure 22:
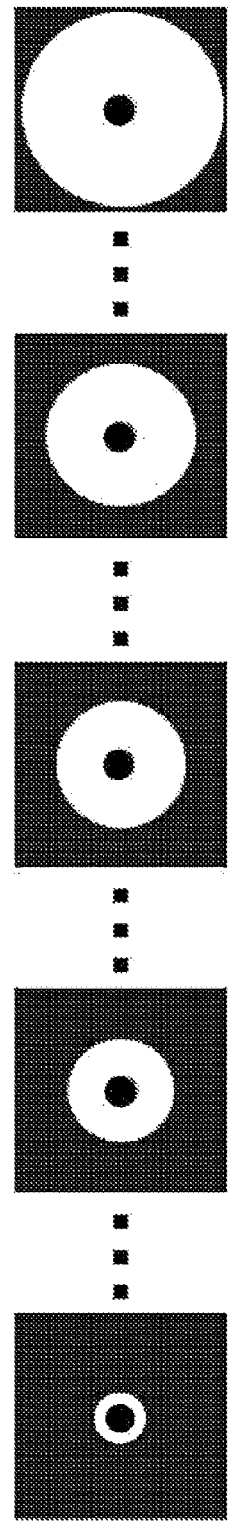
FIG. 22 is a schematic illustration showing an alternative to the set shown in FIG. 21; where instead of masking off a variable portion of the center of the aperture, but keeping the maximum outer radius, if turbulence conditions are strong enough, it may be necessary to instead mask off the outer edge of the aperture by a variable amount (using some 20 of these main masks loaded on the DMD).

The mask set shown in FIG. 22 would be an alternative to the set shown in FIG. 21. Here, instead of masking off a variable portion of the center of the aperture, but keeping the maximum outer radius, if turbulence conditions are strong enough, it may be necessary to instead mask off the outer edge of the aperture by a variable amount. Again, there could be approximately 20 of these main masks loaded on the DMD, although the precise number may vary as determined by those of ordinary skill in the art without departing from the scope of the invention.

Figure 23:
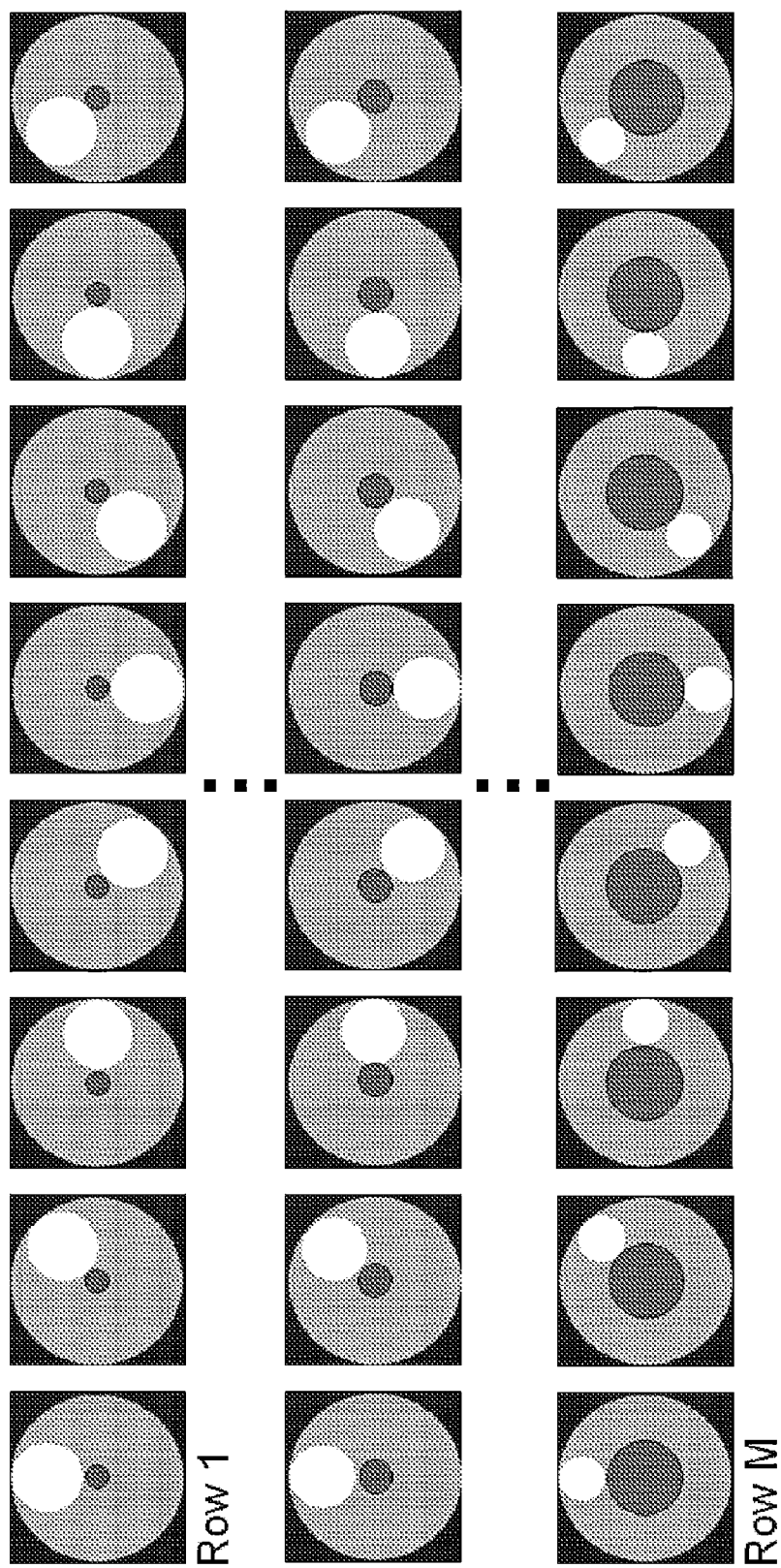
FIG. 23 is a schematic illustration of a mask set comprising a series of sub-aperture models that would be associated with the main annular mask set shown in FIG. 21, where for each main mask of the FIG. 21 mask set, there need to be 8 masks of the FIG. 23 type to provide sub-aperture sampling.
Figure 24:
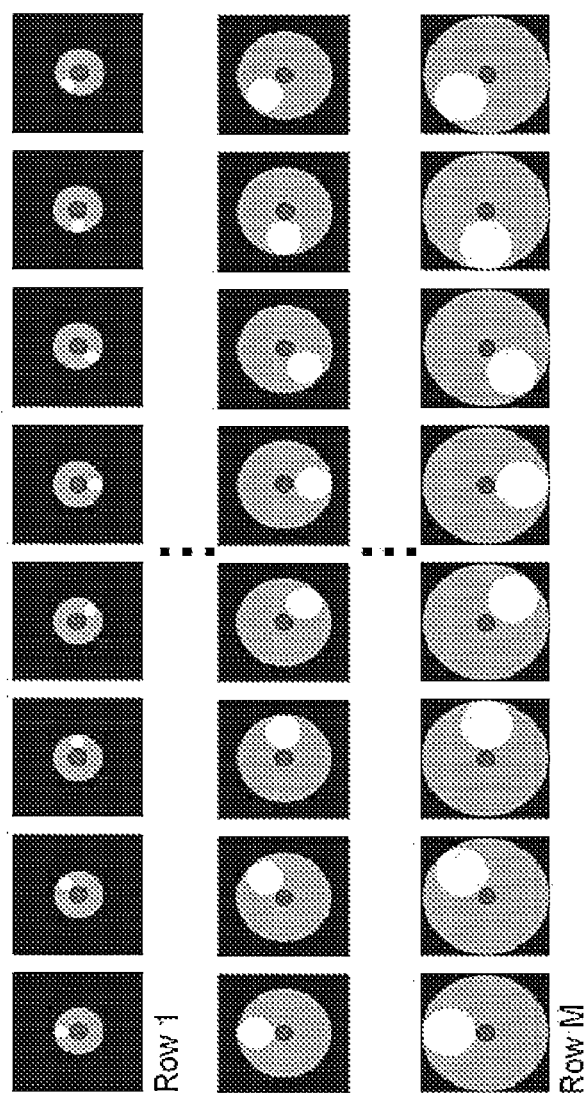
FIG. 24 is a schematic illustration showing a mask set comprising a series of sub-aperture models that would be associated with the main annular mask set shown in FIG. 22 where for each main mask of the FIG. 22 mask set, there need to be 8 masks of the FIG. 24 type to provide sub-aperture sampling.

The mask set shown in FIG. 23 is the series of sub-aperture models that would be associated with the main annular mask set shown in FIG. 21. For each main mask of the FIG. 21 mask set, there need to be 8 sequential masks of the FIG. 23 type to provide sub-aperture sampling. The mask set shown in FIG. 24 serves the same function for the FIG. 22 set as the set in FIG. 23 serves for the set shown in FIG. 21.

Figure 25:
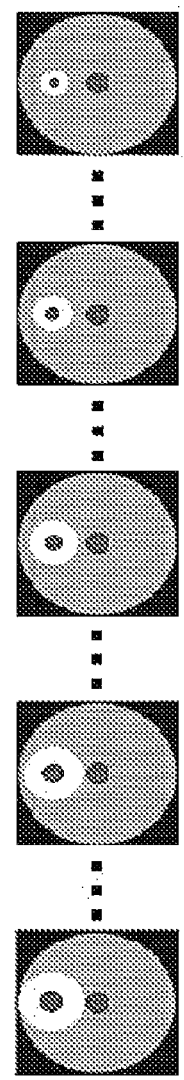
FIG. 25 is a schematic illustration showing a mask set that could be used as a further option under extreme turbulence conditions in case the central obscuration of the system was too large to permit characterization of the sub-apertures around it.
Figure 26:
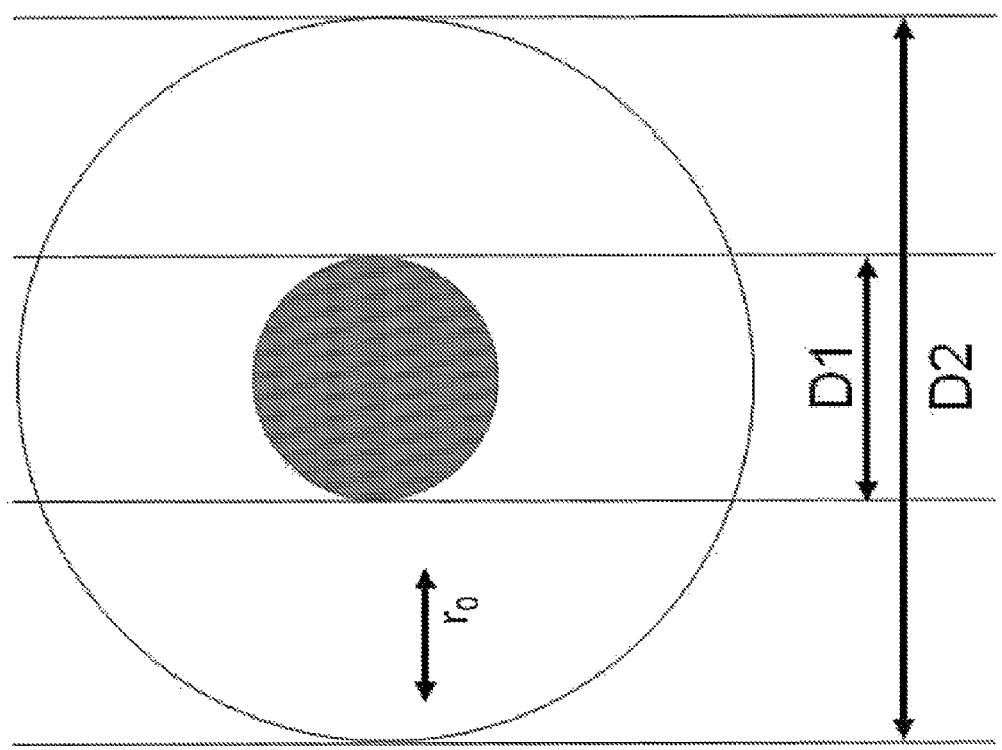
FIG. 26 is a schematic illustration depicting a typical annular mask selected from one of the annular mask sets (from FIG. 21, 22, or 25) given a current turbulence state illustrated by the present coherence diameter $r_0$ whose length is illustrated by the accompanying arrow, and where $\delta=(D2-D1)/2$. The main limitation in the choice of the mask that may be used is that $\pi(D1+D2)/2$, the circumference around the mean radius, must be less than $16*\delta$. Otherwise, eight sub-aperture images will not adequately sample the azimuthal phase depicted in FIG. 18.

Lastly, the set shown in FIG. 25 could be used as a further option under extreme turbulence conditions in case the central obscuration of the system was too large to permit characterization of the sub-apertures around it.

One might also consider models of 6 sub-aperture samples rather than 8, in order to increase system speed and frame rate. The resultant sub-aperture models would look similar, but would not provide the full angular resolution of the 8 sub-aperture sample model.

The aforementioned effects of the atmosphere on a propagating wave and the features of an optical system that could be used to detect and correct for atmospheric phase perturbations motivate a preferred embodiment system that may be utilized for sensing and modeling the atmospheric phase present in the system aperture. In accordance with the principles of the present invention, the system's spatial light modulator (SLM) or deformable mirror can be configured to conjugate this measured or modeled atmospheric phase and significantly reduce turbulent image distortion further down the optical train. However, the method for choosing the model of the system mask to be used must first be defined, based upon the numerous choices of mask that exist (see, for example, FIGS. 20 through 25).

Aperture Selection Procedure

For any given range, wavelength, and turbulence strength, a coherence length may be defined:

$$r_0 \sim 3(k^2 L C_n^2)^{-3/5}$$

and from the data plotted in FIG. 3 it is known that the peak of the system resolution curve will occur around $X=D/r_0 \sim 3$. Using the series of DMD masks shown in FIG. 20, a series of images of a scene may be taken. Let DX[i] be the equivalent aperture diameter of the "i"th mask. As long as the objects in the scene are not moving rapidly for each image in the series one may create the sum of squares of the pixel values (after adjusting for the mean brightness) in an ROI in the image. This sum will be a maximum for the clearest image, which will correspond to $X \sim 3$. For each image, DX[i] will vary, but $r_0$ is expected to be approximately constant; this will provide a measure of the coherence length. 20 images of different sizes should suffice. At a 100 frames-per-second rate, this should take 0.2 seconds. This operation will only need be performed occasionally while imaging, for example, once per minute.

$D_R = DX[imax]$ is set as the value of DX[i] that produced the maximum response of the system (i.e., i=imax). It is anticipated that $D_R$ will be slightly larger than $r_0$. One of the annular masks is selected where $(D2-D1)/2=D_R$ from one of the annular mask sets (from FIG. 21, 22, or 25), as illustrated schematically in FIG. 26.

A primary limitation in the choice of the mask that may be used derives from the fact that $\pi(D1+D2)/2$ will be the circumference around the mean radius. Under the assumed constraints, the system must not require that more than 8 sample images be taken around that circumference. This implies that, $8*2*D_R=8$ (D2−D1) must not be less than $\pi(D2+D1)/2$, or, $$(D2-D1)/(D2+D1) > \pi/16$$

Each aperture mask will thus have a restriction on the range of its D1 and D2 diameters, as well as an average mask size that is related to the full aperture size.

Overall Procedure

The steps of a preferred system procedure may comprise:

(A) Downloading a series of aperture mask patterns to the DMD Aperture controller (optionally selectable using an index number to the Aperture Controller);

Aperture Section Procedure (B) Selecting the aperture wherein (1) the master adaptive controller (or equivalent) directs the adaptive aperture controller (or equivalent) to select one of a series of aperture masks of the type illustrated, for example, in FIG. 21; (2) The master adaptive controller (or equivalent) directs the Adaptive Phase Controller (or equivalent) to set the SLM to neutral (no phase adjustment).

(C) Collecting of an image by the image capture module (or equivalent).

(D) Transferring the image to the image processing module (or equivalent) and producing a vector set of image quality metrics.

(E) Determining the suitability of the current FIG. 20 type mask by using the master adaptive controller (or equivalent).

(F) Repeating steps A through E directing different choices of FIG. 20 type aperture masks until it determination of an optimum aperture mask that maximizes resolution.

(G) Storing the value of the diameter of this optimum mask as a variable (DR).

Choosing the Main Annular Mask (H) Using the master adaptive controller (or equivalent) and the optimum type 20 mask size (DR), the master adaptive controller (or equivalent) sets the choice of main annular mask based on a choice of one of the model masks from FIG. 21, 22, or 25 annular mask sets.

Selecting a Region of Interest (I) Using the master adaptive controller (or equivalent), selecting a region of interest (ROI) in the image frame (ROI's should cycle through the complete image but may focus on "active" areas exhibiting changing characteristics from full frame to full frame).

Following Selection of an Annular Mask

Next, based on the annular mask selected . . . For (i=1 . . . 8)

(J) Using the master adaptive controller (or equivalent), directing the adaptive aperture control (or equivalent) to select one of the 8 sub-aperture masks associated with the main annular mask model determined in Step (H) above.

(K) Producing an image using the image capture module (or any device capable of producing an image).

(L) Using the master aperture control (or equivalent), directing the image processing module (or equivalent) to load the "i"th sub-aperture frame and, through pattern matching, compare this sub-aperture frame to the other 7 sub-aperture frames.

(M) Using the image capture module (or equivalent) capturing an image and passing the sub-frame image to the image processing module (or equivalent).

(N) Using the image processing module (or equivalent), upon receipt of all 8 sub-frame sub-aperture images, performing pattern matching and vector generation tasks as described in the foregoing. The perturbation vector information, $V_i'$, is passed back to the master aperture control (or equivalent).

(O) Computing the phase model of the phase correction using the master aperture control (or equivalent) in conjunction with the $V_i'$ image metric data passed back by the image processing module (or equivalent). (The conjugate of this information is passed to the Adaptive Phase Controller which translates this information into a phase model that is then set on the SLM).

(P) Using the master aperture control (or equivalent), directing the adaptive aperture controller to select the complete annular aperture mask.

(Q) Using the master aperture control (or equivalent), directing the image capture module to collect a full frame image using a full frame sampling dwell time of $\frac{1}{200}^{th}$ second, and making the resulting full frame image available to an external monitor.

Steps (I) through (Q) are repeated for numerous full frame images. Recomputation of the turbulence state (following the aperture selection procedure of steps (B) through (H) is accomplished periodically (perhaps every 10, 15, 20, 30, or 60 seconds), depending on the statistical fluctuations of turbulence effects.

Figure 27:
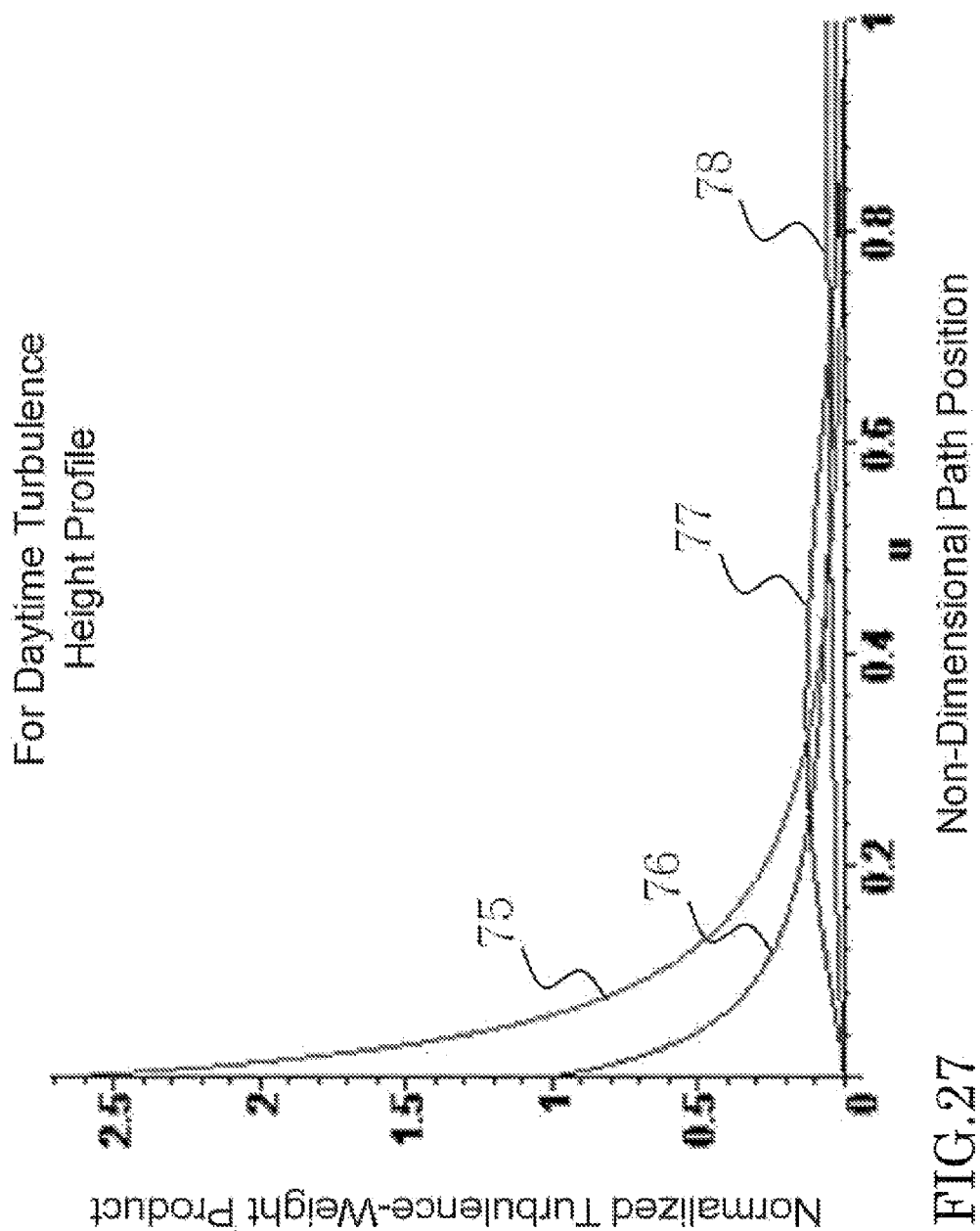
FIG. 27 illustrates the path weighted impacts of ground based turbulence for slant path propagation and the four types of propagation impacts illustrated in FIG. 32, with short-exposure blur effects [75] seen as the most significant impact.

The preferred embodiments are effective in reduction of turbulence effects such as short-exposure blur, image distortion through angle-of-arrival variations, scintillation effects, and image decorrelation (anisoplanatism). The importance of these effects depends on their path weighted impacts. For ground-based sensors, however, short-exposure blur effects are dominant. FIG. 27 illustrates the weighting functions of different turbulence effects: blur [75], angle-of-arrival [76], scintillation [77], and anisoplanatism [78]. For this daytime slant path case, the area under the blur curve is significantly greater than that of any other effect. Also note that the weighted effect is significantly focused near the 0 end of the non-dimensional path, where 0 is at the system receiving aperture, and 1 is at the object plane. Because the blur effect is strongly dependent on turbulence close to the aperture, i.e. nearer to the ground, the wind speed causing turbulence evolution will be slower, thus reducing the temporal tracking requirement.

Figure 28:
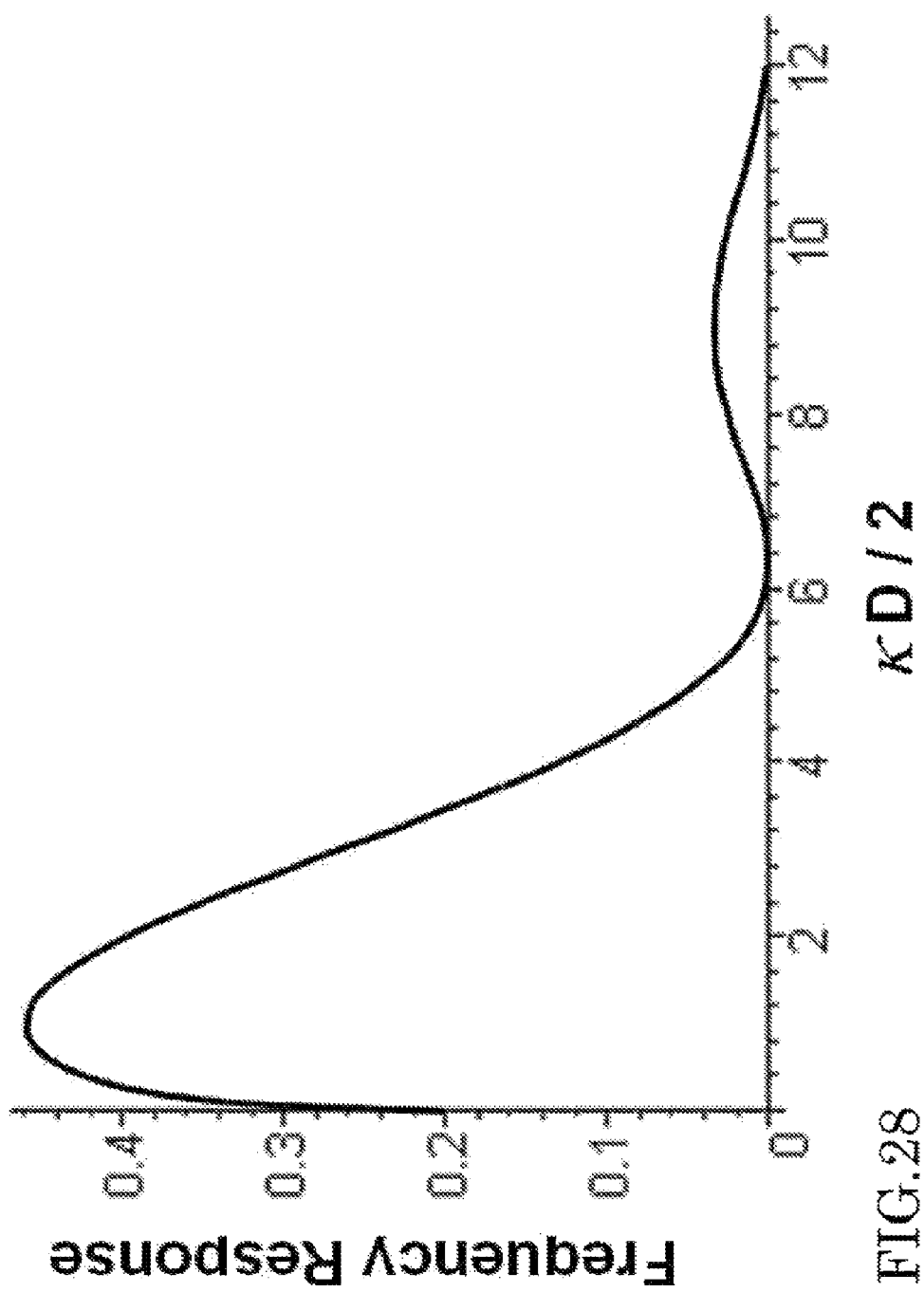
FIG. 28, illustrates the weighted impact of turbulent spatial frequencies of wavenumber κ normalized relative to the system diameter D; which in effect depicts an analysis of the focus and astigmatism terms and reveals that the most significant wavelength affecting focus and astigmatism is approximately 3 times the diameter.

The rate of evolution of turbulence features and their effects on image phase perturbations can also be gauged relative to several features. Referring back to the FIG. 4 diagram of the Zernike polynomials, it was noted that in Tofsted, D. H, "Outer-scale effects on beam-wander and angle-of-arrival variances," Appl. Opt., 31:5865-5870 (1992) (hereby incorporated by reference) the angle-of-arrival term (tip and tilt terms or n=1 row) were dominated by the length of the outer scale of turbulence. Typical values of the outer scale are on the order of 10 m. For a typical crosswind speed between 1 and 2 m/s, this means the evolution rate for the tip-and-tilt line of the Zernike diagram is of the order of 1-2 Hz (for transit of a significant portion of a wavelength). Analysis of the focus and astigmatism terms is shown in FIG. 28, which shows the weighted impact of turbulent spatial frequencies of wavenumber κ normalized relative to the system diameter D. This graph reveals that the most significant wavelength affecting focus and astigmatism is approximately 3 times the diameter.

Hence, for a system aperture of 10 cm the most significant wavelength is 30 cm. At a crosswind speed of 1.5 m/s this most significant wavelength evolves at a rate of 10-20 Hz. Hence, the evolution rate of turbulence is higher for higher order Zernike terms, but the higher order terms have less and less effect on the overall phase. Generally, the evolution rate of 100 Hz is considered typical for ground-based sensors. The proposed system is designed to provide corrections within this time scale. In effect, the passive equivalent of an active-type wavefront sensor is produced, under conditions where wavefront sensing systems are effectively infeasible.

This system thus has the capability to perform corrections rapidly and the capacity to control both the system aperture, thus removing certain turbulence modes, as well as providing a means of correcting the phase, which will produce a clean(er) image than could be produced by simply reducing the aperture size.

In the preferred embodiment system, no external radiation of energy is necessary. It thus is not a search-light or laser illuminating system, which reduces the number of systems with which it might be compared greatly. Likewise the system is designed to address a limited topic, namely the correction of received imagery for the effects/impacts of optical turbulence, and primarily the impacts of image blur that has a path weighting function that is focused just in front of the receiving aperture. Also, our system is primarily for use in ground-level observation. It thus does not involve mounting the device on an aircraft or moving rapidly through the atmosphere.

These considerations significantly reduce the number of practical systems that may have a similar claim to solving the turbulence problem for ground based sensors. Nevertheless, the resulting problem space is not a simple one, and involves the worst case scenario—a ground based sensor observing distant objects through the heaviest strength turbulence in the atmosphere. This problem is variously titled the "deep turbulence problem" or alternatively the "candlestick" problem, because of the shape of the 3D atmospheric envelope where systems/sensors can viably operate. In this alternative picture, a near-surface observer can view objects vertically through the atmosphere at much longer ranges than can be done for horizontal paths.

One key to the preferred embodiment system is that no artificial guide star is used. The system is thus truly passive; as no illumination beacon is propagated. For Army applications, this means that our system is as stealthy as practical.

By not relying on a guide star, the preferred embodiment system is not based on the detection of a coherent wavefront. The system of the present invention is significantly different from other systems because it does not require the usage of a Shack-Hartmann wavefront sensor or any other kind of wavefront sensing device. Indeed, incoherent radiation from any naturally illuminated or self-radiating source does not have a wavefront that can be characterized by any practical wavefront sensor. This is very important, because our sensor can thus function with natural illumination while other correction methods cannot.

Advantages

A system developed in accordance with the principles of the present invention provides a way for sequential compensation for turbulence effects in different portions of an imaged scene. Active or glint-based systems are only truly able to correct for the portion of a scene that contains the guide-star or glint itself, and may be restricted to a region of only a few centimeters about that main region due to the impacts of anisoplanatism in moderate optical turbulence. Conversely, the fact that turbulence close to the system aperture causes the greatest blur means that the preferred embodiment system corrects for turbulent perturbations that have the greatest overlap for different portions of the imaged scene.

A further innovation derives from how the proposed passive system goes about determining the correction it applies to its SLM. Prior art has typically relied on a method termed the SPGD (Stochastic Parallel Gradient Descent) method. The SPGD method essentially attempts to "guess" the appropriate settings to place on the SLM to effect the adaptive correction. It then uses a feedback loop to decide how well its latest guess was at correcting for the current state of the atmosphere. Consequently, an SPGD system is limited by several considerations. First, system performance is limited by frame rate. The shorter the dwell time of each frame the noisier the image will become. Second, the selected size of the system aperture is subject to two competing optimizations. A larger aperture will allow more light to enter, reducing noise, and therefore permitting shorter dwell times per image frame. However, turbulence near the system entrance pupil causes the light entering the system to experience different transit time delays at different points in the aperture, creating a wave that becomes increasingly difficult to focus (increased blur). In terms of a functional analysis of the incident wavefront, a larger system aperture requires more Zernike expansion terms to describe the wavefront. But even an efficient sampling system would require roughly as many image samples as there are Zernike components in the incident wavefront in order to successfully analyze it. The SPGD system, being merely a guessing/hunting technique, is far less efficient than a straightforward analysis such as is achieved by the Shack-Hartmann wavefront sensing technique. Thus to support an SPGD-based passive correction system would require an imager capable of sampling tens-of-thousands of frames per second under high turbulence ground-to-ground imaging conditions. What is needed is an efficient imaging system that is capable of both reducing the complexity of the imaging problem through a reduction in the number of active Zernike modes, and that uses a more efficient search algorithm than the SPGD method.

Figure 30:
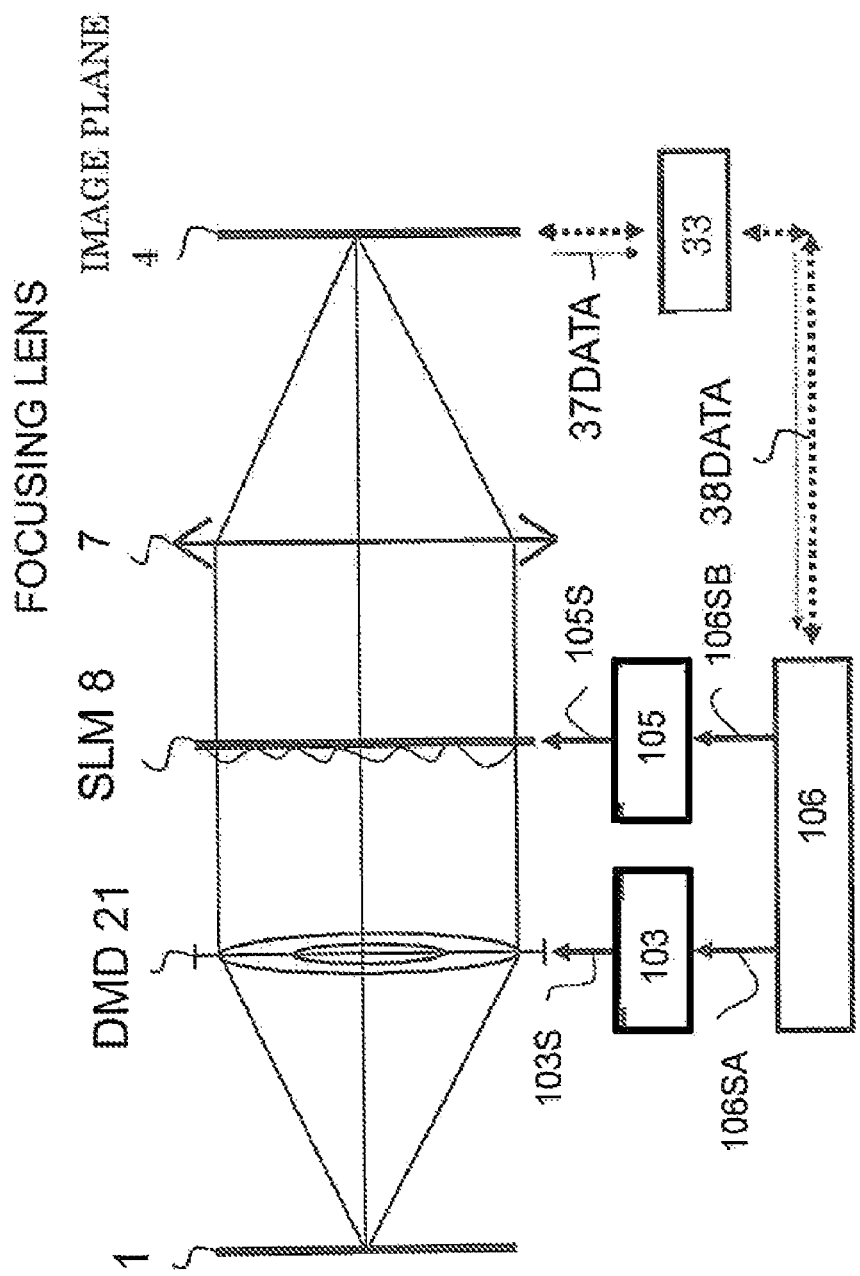
FIG. 30 is a schematic illustration of an embodiment to the present invention comprising a digital micro-mirror device, spatial light modulator, and feedback control circuitry, FIG. 31 comprises four graphs which compare $Z_2^0$ (90) with $Z_4^0$ (91) (Graph A), compares $Z_1^1$ (92) with $Z_3^1$ (93) (Graph B), compares $Z_2^2$ (94) with $Z_4^2$ (95) (Graph C), and compares $Z_3^3$ (96) with $Z_4^2$ (97) (Graph D); illustrating the point that although they appear to show differences in their central regions, in the region beyond approximately $|p|>0.8$ each function is approximately linear.

FIG. 30 shows the general flow of information and processing stages involved in control of the system. In this figure the optical system is further abstracted to simply show that the DMD's apodizing effects have been applied directly at the system entrance pupil (1). The light source passes through the apodized telescope lens (21), reflects from the SLM 8 and passes through the focusing lens (7) to be imaged on the imaging plane (4). The charge-coupled device (CCD) that electronically captures the image data at 4 communicates these data through a high speed data link (37DATA) to a processing routine (33). The processing routine 33 assesses the quality of the current image using selected control settings designated for the DMD (21) and SLM (8) via controller command links 103S and 105S, respectively. These command signals are driven by control software modules for the DMD (103) and SLM (105). The controller software sub-modules 103 and 105 tailor a specific choice of settings for these devices based on a control directing master module (106) that receives current status information concerning the most recent settings of the SLM and DMD from the image quality evaluation module 33 via data link 38DATA. The settings for the next image frame to be collected are sent to the two controller modules via data links 106SA and 106SB.

Figure 31:
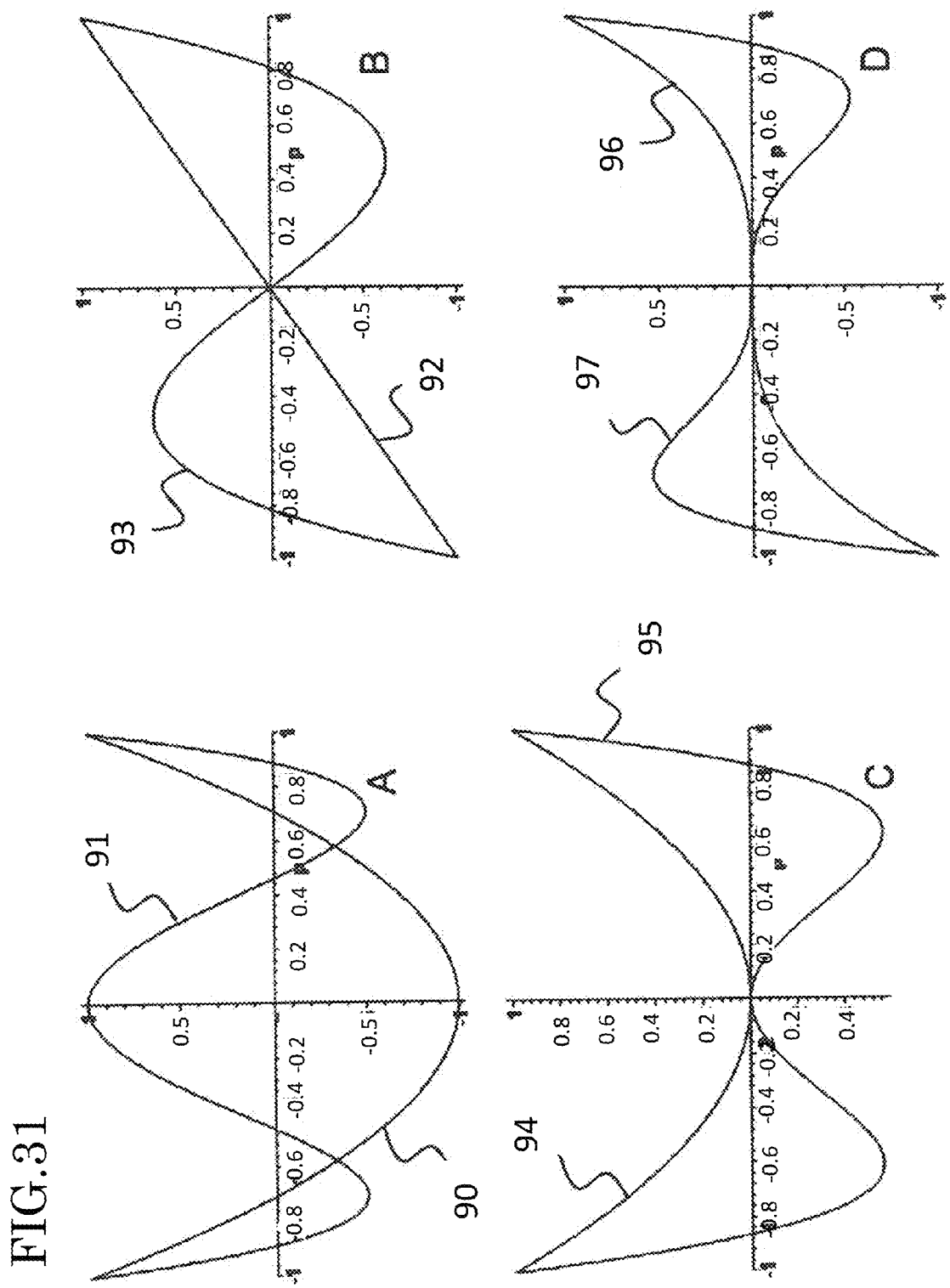

FIG. 31 illustrates a key concept explaining how the combination of a Digital Micro-mirror Device with a Spatial Light Modulator overcomes a general limitation of most passive adaptive systems. That limitation is that the feedback used by the system (data signals 37DATA and 38DATA in FIG. 30) only supplies a general metric (the sum square of pixel values in a region of interest). However, the resulting feedback does not indicate a specific direction of improvement of the signal. Hence, presumably, one would need to sample all 12 modes to yield a single correction direction. However, as FIG. 7B illustrates, the presence of a central obscuration should reduce the complexity of the coherent patch pattern. FIG. 31 offers a comparison of four pairs of radial Zernike models that feature the same azimuthal dependence (same f parameter), but differ in their radial dependencies. FIG. 31 Graph A compares $Z_2^0$ (90) with $Z_4^0$ (91), FIG. 31 Graph B compares $Z_1^1$ (92) with $Z_3^1$ (93), FIG. 31 Graph C compares $Z_2^2$ (94) with $Z_4^2$ (95), FIG. 31 Graph D compares $Z_3^3$ (96) with $Z_4^2$ (97). The point of these comparisons is that although they appear to show differences in their central regions, in the region beyond approximately |p|>0.8 each function is approximately linear. Since it is known that each pair has the same f index, then they share the same azimuthal dependence. The effect of the central obscuration is thus to effectively map Zernike terms onto one another vertically, as long as the central obscuration is a large enough fraction of the full aperture The system of the present invention is optimized to require a minimum number of image samples to be collected in order to track the evolving state of the turbulent atmosphere. The result is reduced overall noise.

A further innovation is based on an exploitation of a feature of the aperture apodization technique. Because an annular aperture is formed using the DMD, (1) the number of active Zernike modes in the remaining aperture is reduced, thereby reducing the number of sample images that must be collected in order to make a current atmospheric state analysis, and (2) the means of analyzing the phase perturbations present in the aperture is simplified, producing a method that can track the atmospheric perturbations even more efficiently than a simple circular aperture. The reason the number of active Zernike modes is reduced is because the annular-shaped apodization pattern effectively causes a number of Zernike modes to map onto one another. It therefore makes the process of assessing the state of the turbulent blur perturbations easier.

Moreover, an annular aperture also allows the system to have a larger effective aperture for a given pupil area. That is, for a given number of active Zernike modes, because the annular aperture causes certain modes to overlap one another, for a given total area (assuming the same number of modes per unit area) an aperture with a hole in the center will feature an overall wider outer radius. But the maximum angular frequency response of the system depends on the maximum diameter passed. Therefore, an annular aperture of equal area as a circular aperture will always feature a higher maximum frequency response, and therefore a greater image resolution, all other things being equal. And with greater angular frequency resolution, overall, an annular system's range capability is automatically greater than that of a circular aperture system of equal area.

Another innovation is the placement of the system apodization control device (the DMD) inside the system optical train. This appears to be unique; i.e. using a DMD to provide automatic aperture apodization control. Also, because a DMD is used, the speed of the aperture response is virtually instantaneous. This permits the system to perform a series of aperture adjustments for studying the properties of turbulence arriving at various portions of the system aperture in a manner analogous to the wavefront sensing techniques used in active systems, but where the DMD is substituted for the operations of the Shack-Hartmann sensor.

The apodization control both limits the degree of complexity of the atmospheric correction problem, to facilitate the correction sensing process, and optimizes both the solution speed and frequency response function of the system. To achieve this apodization control, the DMD is used as a surrogate for the actual system aperture is if the DMD is placed at a real image plane of the system aperture. The mechanism whereby this real image plane can be formed is by using at least two positive lenses. The first of these lenses must be placed close to the exit pupil of the system's telescope prior to its natural focal point, so that the focal point is shortened, creating a more rapidly diverging wave subsequent to the focal point. This beam is then passed through a second positive lens that produces a parallel beam similar to the wavefront upon entry through the system's entrance pupil prior to reaching the first (primary) mirror. The DMD is then placed at a focal point of the system aperture so that when the DMD aperture is modified it cuts off an equivalent amount of light from the original wave entering the system.

Figure 32:
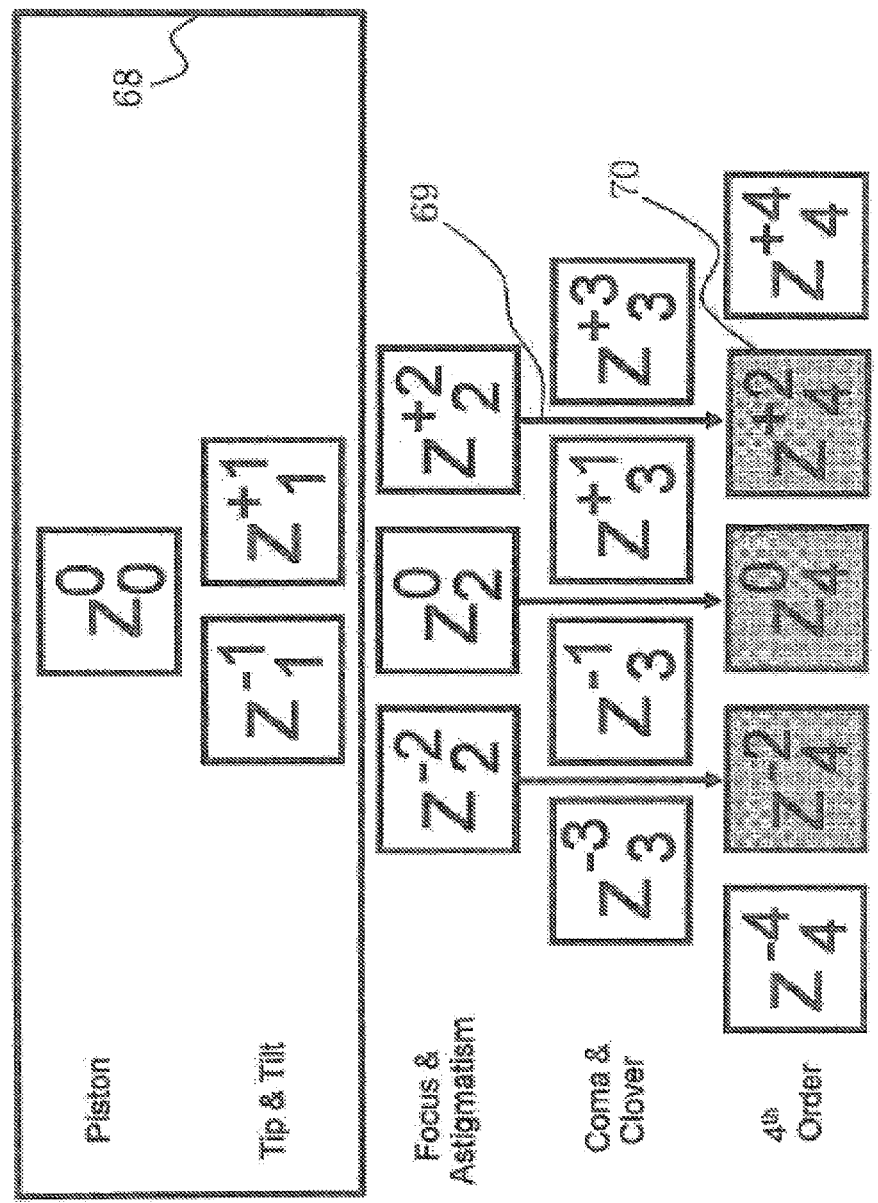
FIG. 32 illustrates using Zernike polynomials (a set of orthonormal expansion functions for a circular aperture) the impact of the central obscuration on the complexity of the tracking task that must be accomplished by the proposed invention.

FIG. 32 illustrates the impact of the central obscuration on the complexity of the tracking task that must be accomplished by the proposed invention. As has already been discussed, the first three Zernike terms in box 68 of FIG. 32 (piston, tip, and tilt) should not affect image quality. The subsequent 12 terms on the next three rows covering the Focus and Astigmatism row, the Coma and Clover row, and the 4th order row constitute the 12 terms described by Hufnagel whose correction satisfy the 12 DoC line of FIG. 5. However, based on the prior discussion of FIG. 31, with the addition of the aperture apodization, the three shaded elements of the 4th order line (including 70) will be effectively mapped upon (69) by elements of the Focus and Astigmatism row. A similar effect will occur when elements of the Coma and Clover row map onto elements of a $5^{th}$ row which was not included in this Figure. It is also an open question whether or not the Coma elements ($Z_3^{-1}$ and $Z_3^1$) of the third row will be mapped upon by the tip and tilt elements ($Z_1^{-1}$ and $Z_1^1$) such that these do not need to be actively tracked either. If this were the case, it would be possible to track the 12 elements using only 7 terms. Otherwise it would require 9 terms.

Attention is now turned to the question of the feasibility of the method itself to track either 7 or 9 Zernike terms, providing corrections sufficient to remove these terms from the incident phase front. To address this issue, this is first discussed in general terms the nature of the problem being addressed and the expected rate of evolution of the various terms.

Figure 33:
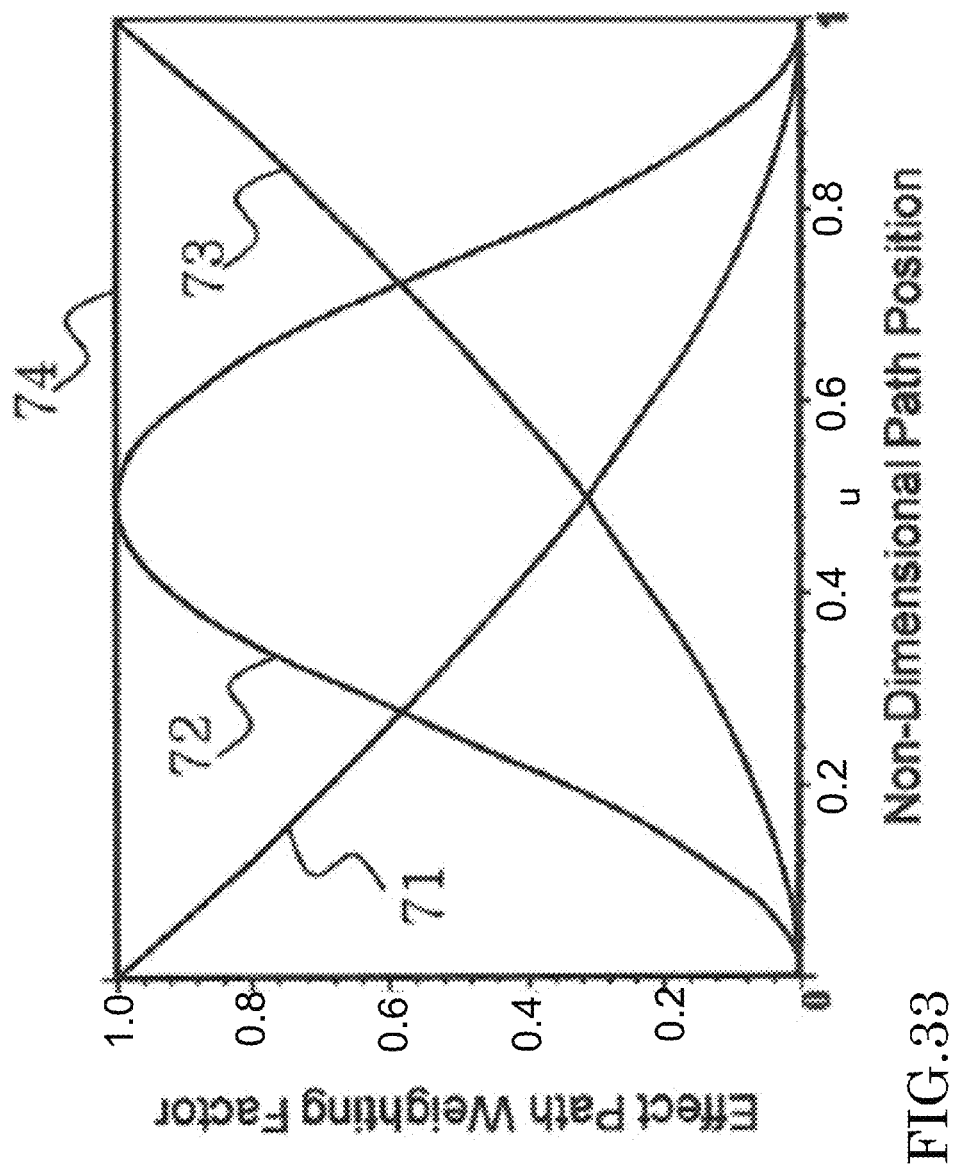
FIG. 33 illustrates the basic path weighting effects of various turbulence impacts on propagation, including short-exposure blur (71), scintillation (72), anisoplanatism (73), and angle-of-arrival (74).

FIG. 33 is the first of two figures illustrating the application area considered relevant to our invention. This figure focuses on the path weighting functions applicable to four separate image distortion effects (hence the title given to the vertical axis of the plot). The vertical axis denotes the weight factor that multiplies the turbulence strength value ($Co_2$) at each position along the optical path. The four effects are long exposure blur (71), parameterized by the coherence diameter ro, amplitude scintillations (72), parameterized by the scintillation log-variance, the isoplanatic angle (73) that characterizes the dividing of the viewed object plane into independently moving (due to angle-of-arrival) patches, and the angle-of-arrival variance which characterizes how large the image distortions from one point will be in angle from its actual position (74). These functions are plotted relative to a normalized horizontal axis path position where u=O corresponds to the receiver system aperture and u=1 is the object plane. The critical aspect of this plot is to illustrate that the image blur effect is weighted most heavily toward the system aperture while the remaining effects are weighted toward either the center of the path, uniformly along the path, or toward the object plane end of the optical path.

Figure 34:
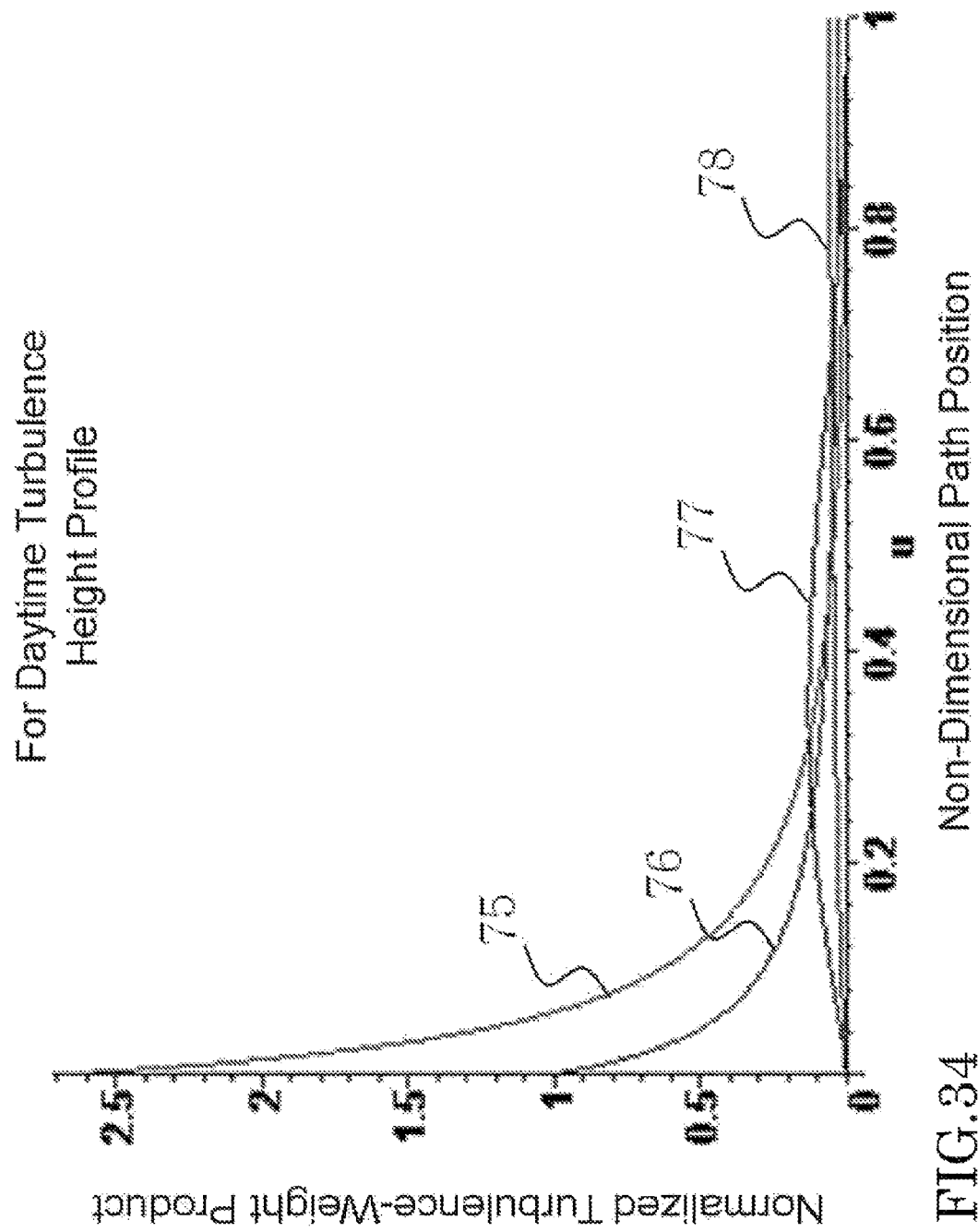
FIG. 34 is an illustration showing daytime turbulence height profile.

FIG. 34 illustrates that differences in path weighting factors, when combined with the height dependence of daytime turbulence produces a critical synergy between the turbulence strength and the path weighting factor to highlight the significant degradations of imaging capability due to image blur for surface-based imaging systems. During daylight hours, a common rule is to consider turbulence strength to diminish as a function of the height above the surface to the minus 4/3rds power. In FIG. 34 the height of the receiver is simulated as 2m above ground level (AGL), a viewed object is placed at 34 m AGL at a range of 2 km distant. Thus the viewed object appears to be 1 degree of arc above the horizon. For this scenario, and using normalized weighting functions, the image mean blur (75) greatly outweighs the effect of angle-of-arrival (76), scintillation (77), or isoplanatic angle (78). This order of effects reveals the significance of blur for surface-based imaging sensors. One should note, however, that the coherence diameter that characterizes the blur effect is scaled according $K^{-6/5}$ which implies that blur effects diminish at longer wavelengths. Angle-of-arrival effects are practically wavelength independent, meaning that at long-wave infrared wavelengths angle-of-arrival is the dominant term, even for surface based sensors.

FIG. 28 illustrates one of the remaining questions with regard to the viability of the proposed method. Although FIGS. 33 and 34, combined, suggest that if one could remove the blur effects from imagery, it would be possible to perceive objects at increased range with more clarity, the question remains how fast the atmosphere may be evolving and whether or not a system could have sufficient bandwidth to track such variations. To explore this, reference is first made to the paper entitled Tofsted, D. H, "Outer-scale effects on beam-wander and angle-of-arrival variances," Appl. Opt., 31:5865-5870 (1992) (hereby incorporated by reference) exploring outer scale of turbulence influences on image angle of arrival. There, it was reported that the turbulence spectral frequency most responsible for angle-of-arrival was of the order of size of the turbulence outer scale. For regions close to the surface (termed the surface layer, a region within 50-100 m of the ground) the outer scale of turbulence is a few meters in length. Thus, for the first two Zernike perturbation terms (the tip and tilt terms), the dominant turbulent length scale affecting these terms is the outer scale, or a length scale larger than the system aperture diameter (which is considered for the application environment to be fixed to less than 30 em, i.e. D<0.30 m). For the next row of Zernike polynomials downward in the FIG. 32 table (the Focus and Astigmatism line), one may determine the most effective size of turbulence by considering a single spatial frequency of turbulence centered about the system aperture and ask what size of turbulence will create the greatest phase perturbation. On the one hand, for a turbulence perturbation wave of spatial wavelength A and wavenumber K=2rr/λ the phase change between the center of the optical aperture and the edge of the aperture will be $\Delta\Phi1>=2\pi[1-\cos(KD/2)]$. On the other hand, due to the decreasing magnitude of the turbulence power spectrum which decreases in the inertial subrange at the rate, $K^{-11/3}$, and thus will decrease in amplitude at a rate of $K^{-11/6}$, one may plot the function $[1-\cos(X)] X^{-11/6}$ in FIG. 28 to reveal that the peak of this function occurs at X=0.9914. That is, the maximum effective perturbation wavelength is approximately A=πD. Thus, the most effective wavelength is larger than the system aperture. For example, for a nominal aperture of D=10 cm, the most effective wavelength would be approximately 30 cm. One must also consider that in the near surface atmosphere refractive turbulence is strongest when convective mixing of the air is dominant over mechanical mixing due to high wind speeds. High winds tend to more efficiently remove heat from the ground, and more rapidly mix variable temperature air, reducing the turbulence strength. Thus for the present application environment, the conditions under which turbulence is most effective occurs when wind speeds are the lowest, thus leading to a condition where the rate of evolution of the atmosphere is relatively low.

Considering the previous scenario, assuming a wind speed at 2 m equal 2 rn/s. This is a nominal speed often seen on hot desert days when turbulence strength is highest. Under this condition, the most effective wavelength for impacting focus and astigmatism would evolve at (2.0 rn/s)/0.3 m or 6.7 Hz. For a 1 m outer scale, the tip and tilt variations would occur at a rate of approximately 2 Hz. Hence, successive rows of Zernike polynomials appear to exhibit increasing rates of evolution. Conversely, higher order terms appear to have a diminishing effect on image clarity. Thus the job of tracking perturbations should be within the realm of the achievable, given an imaging system that can operate at a frame rate 10-20 times faster than the rate of evolution, sufficient to produce several guesses of the correct current settings of the Zernike coefficients within the evolution timeframe of each evolving term to be tracked.

Figure 35:
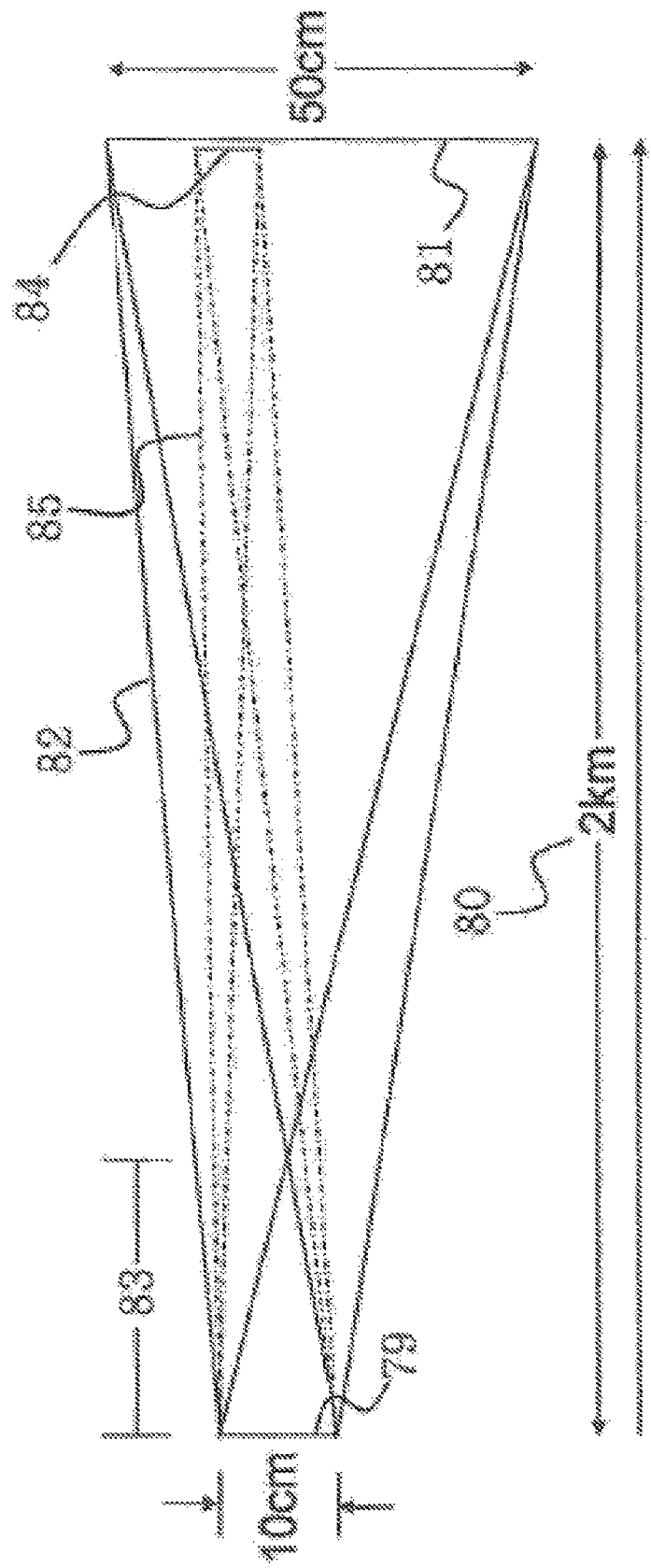
FIG. 35 illustrates a diagram of path position involving an abstract example of a problem that involves a system with aperture (79) far smaller than the imaged field (81) having a typical size of the aperture (10 cm), imaged object (50 cm), and range to object (80) of 2 km.

FIG. 35 illustrates a key factor in the feasibility of any method of image correction based on adaptive techniques. FIG. 35 shows an abstract example of this problem. A typical scenario involves a system with aperture (79) far smaller than the imaged field (81). Typical sizes of the aperture (10 cm), imaged object (50 cm), and range to object (80) of 2 km are indicated. For this scenario one may consider a visible band system operating at a mean wavelength in the green portion of the spectrum of λ.=0.55 μm, and a strong turbulence regime of $C_n^2=10^{-13}$ $m^{-2/3}$ at 2 m height. For this scenario, if the terrain were flat such that the object viewed is at the same height as the sensor, the coherence diameter would equal: $r_o=3.018(k^2LC_n^2)^{-3/5}=6.8$ mm, resulting in a ratio $X=D/r_0=14.8$. Alternatively, for the slant path scenario indicated in FIG. 28, using the turbulence strength indicated here, $r_0=17.6$ mm resulting in a reduced X=5.7. For this scenario a coherence length may also be computed that is weighted toward the object end of the path, resulting in $r_0=48.0$ mm. This parameter is diagnostic of characteristic sizes on the object that will appear to experience independent angle-of-arrival fluctuations (i.e. are in separate isoplanatic regions), as characterized by the isoplanatic angle which is approximately $r_0/L$.

Note that the effects of anisoplanatism (objects extending to dimensions larger than an isoplanatic region) affect every adaptive system, creating independently wandering patches of the imaged object in the image plane. Therefore any imaging system may need to be augmented by a separate image post-processing system that stitches clear sub-images together (i.e., a lucky patch technique) and dewarping of the image. However, such a system is inadequate to remove the impacts of short-exposure blur, which is the principle objective of the current invention. Based on the scenario outlined above, one expects that for the indicated turbulence level, the value of the parameter X will be somewhere between 5 and 15, indicating that the performance of any lucky image based system will be severely degraded by the atmospheric scenario presented.

Equally true, for active adaptive systems involving laser illumination of an object plane one of two situations will occur: Either the illumination pulse will be focused within a single isoplanatic region on the object plane, or it will not. The first case may also be considered to include the case of an active illuminator placed directly at the object plane to serve as a guide star type source. If the first instance occurs, then the active imager's wavefront-detection-based solution will be strictly applicable only for the particular isoplanatic patch from which the guide beacon emerges. If the second instance obtains, then the active imager's solution will be derived from multiple independent isoplanatic regions exhibiting independent statistics, making it difficult to imagine how the solution from these independently emitting regions can produce anything resembling a coherent wave at the receiver system's aperture suitable for analysis by a Shack-Hartmann wavefront sensor. Hence, although a passive sensor system might initially appear inferior to an active adaptive system, for extended scene objects which are larger than the isoplanatic patch size, a non-illuminating passive approach appears at least as reasonable and entailing less risk than any active system approach.

Also included in FIG. 35 are lines (82) extending from the outer edges of the entrance pupil to outer edges of the viewed object. These extended lines illustrate that there is a region of the path in which lines from opposing sides of the aperture pass through approximately identical optical turbulence, particularly turbulence of the size scales that most affect the lowest order modes of the Zernike perturbation expansion functions. This region is approximately of length (83), and represents a greater or lesser portion of the path depending on the extent of separation of the points considered in the object plane. However, notice that for the scenario considered above, a region consisting of a single isoplanatic patch of dimension—5 cm is a size that is less than the diameter of the aperture and thus corresponds in the figure a region of extent (84), connected to the aperture via dashed lines (85). For such a section of the image, the corresponding atmospheric elements accounting for virtually all of the blurring effects over this section are identical for this section of the object plane. A passive system could thus be directed by a control software program to direct its blur corrections to addressing a single portion of the image, and systematically work to improve image quality over a mosaic of the object plane, in any sort of static imaging scenario. For dynamically varying portions of any object scene, it would be possible to track these dynamic elements by focusing the system's correction attentions on a particular portion or even a dynamically changing portion.

Figure 36:
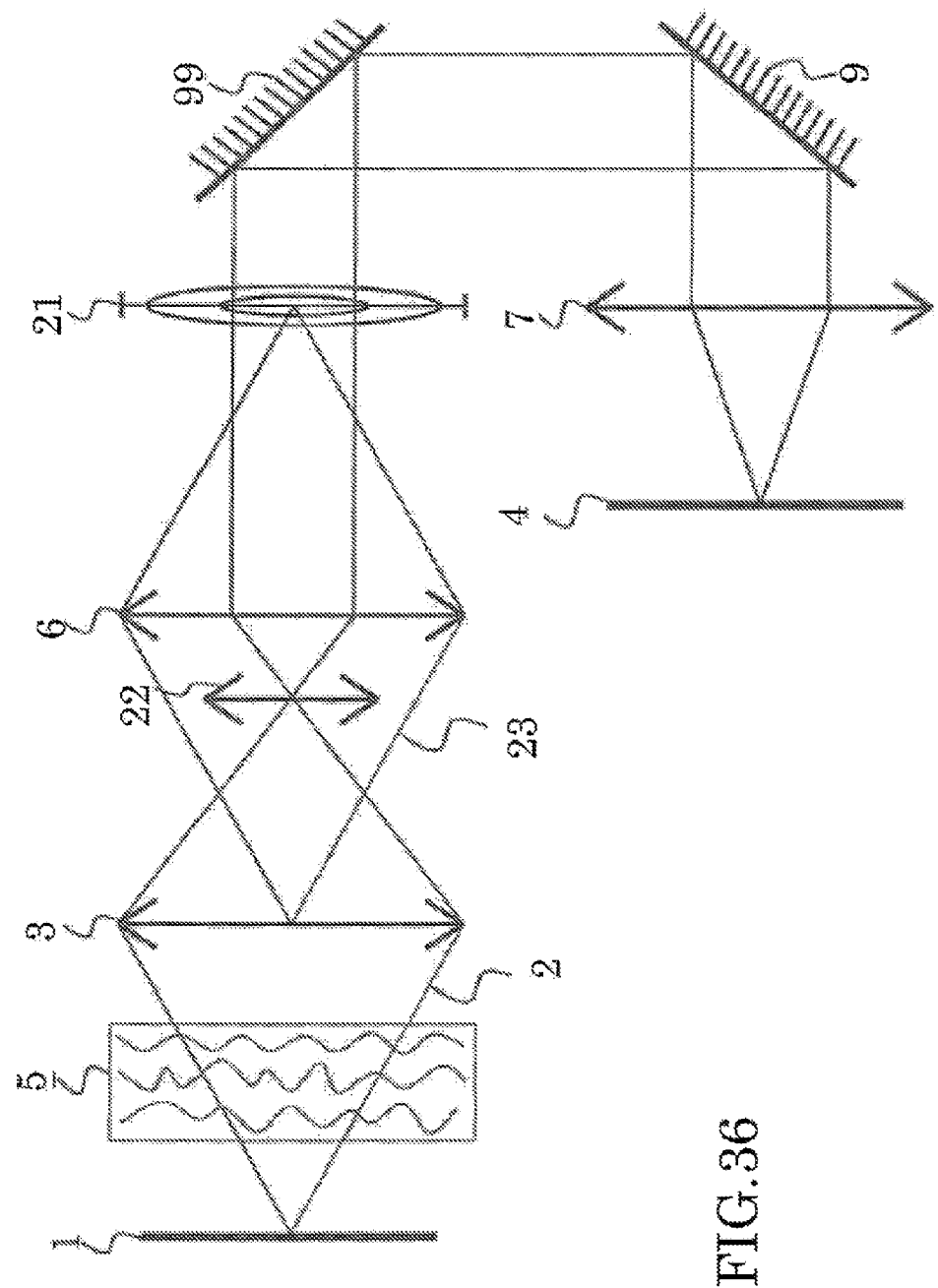
FIG. 36 is a schematic illustration of a preferred embodiment, substantially similar to FIG. 7A, thus retaining the same numbering system and definitions as described in that figure, but replacing the adaptive SLM 8 with a simple mirror 9 in the optical system.

FIG. 36 is an additional preferred embodiment of the present invention. FIG. 36 is identical to FIG. 7A, thus retaining the same numbering system and definitions as described in that figure, but replacing the adaptive SLM with a mirror 99 in the optical system. Such an embodiment is not a complete version of the invention, but represents a possible intermediate stage of development as well as a more economical system for some applications as the cost of the SLM is significantly larger than that of the DMD 21. By limiting the adaptive method to only modifying the aperture shape according to the selection options indicated in FIGS. 19A through 19F, and, in particular, apodization methods of FIGS. 19D and 19E, it may be possible to restrict the number of independent coherence regions present in the effective receiver aperture, thereby improving image quality, albeit at the expense of overall diffraction limited capability. For such a system the form of the control architecture would be equally truncated, removing elements SLM 8, 105, and 105S from FIG. 30.

It is noted that the assemblies described herein could work in association with either a reflector telescope or a refractor telescope. In addition, the reflector (system with reflector mirror objective) or refractor telescope (system with refractor lens or off-axis mirror without central obstruction) combination could be connected to either a DMD-only embodiment or a DMD+SLM embodiment; thereby creating four possible embodiments. That would seem to make 4 possible embodiments, etc. In addition, a preferred embodiment could operate with a deformable mirror instead of the SLM (in addition to the DMD). A preferred embodiment combination may operate using (a) control software operating using a single sum of squares metric for the full image or (b) control software operating using a sum of squares metric multiplied by a Gaussian window focusing on a portion of the image frame. A preferred embodiment combination (DMD-only embodiment or a DMD+SLM) embodiment may optionally include a system in which the user may select a region of interest for weighted improvement scheme. Optionally, a preferred embodiment combination (DMD-only embodiment or a DMD+SLM) may optionally include mosaicing software to merge image portions. Optionally, a preferred embodiment combination (DMD-only embodiment or a DMD+SLM) may optionally include monitoring software to assess portions of an image frame which appear to have significantly changed triggering focused relook and update. Optionally, a preferred embodiment combination (DMD-only embodiment or a DMD+SLM) may optionally include image dewarp procedure applied to deblurred image.

As used herein, the terminology "target" means a person or persons, or portion thereof, animal or animals, thing, object, or a combination thereof As used herein the terminology "point of interest" or "points of interest" refer to an signature or area in the image which appears to be a target but may or may not be a target; i.e., potentially the point of interest may be a target; subject to further processing or testing.

As used herein, the terminology adjustable apodizer includes but is not limited to the Digital-Micro-mirror Device (DMD). One key to the adaptive aperture controller or DMD 21 is that the center of the system aperture is variably obscured.

As used herein the terminology "processor" includes computer, controller, CPU, microprocessor, multiprocessor, minicomputer, main frame, personal computer, PC, coprocessor, and combinations thereof or any machine similar to a computer or processor which is capable of processing algorithms.

As used herein the terminology apodization means changing the shape of a mathematical function, an electrical signal, or an optical transmission.

As used herein the terminology the terminology "process" means: an algorithm, software, subroutine, computer program, or methodology.

As used herein the terminology "target signature" means the characteristic pattern of a target displayed by detection and identification equipment.

As used herein, the terminology "algorithm" means: sequence of steps using computer software, process, software, subroutine, computer program, or methodology.

As used herein, the terminology "optical train" or "optical assembly" means the arrangement of lenses and/or elements to guide light through the system to form an image at the image plane. The position and angle of lenses or elements may be adjustable to guide light along the optical path.

As used herein, the terminology "plane of incidence" is the plane spanned by the surface normal to the optical axis. In wave optics, the latter is the k-vector of the incoming wave.

As used herein, the terminology "image plane" means the plane in which an image produced by an optical system is formed; if the object plane is perpendicular to the optical axis, the image plane will ordinarily also be perpendicular to the axis. As used herein, the terminology "principal plane" means a plane that is perpendicular to the axis of a lens, mirror, or other optical system and at which rays diverging from a focal point are deviated parallel to the axis or at which rays parallel to the axis are deviated to converge to a focal point.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method for reducing the effects of turbulence comprising:
providing an opening for entrance of light; the light being capable of being formed into an image;
providing a plurality of optical elements in an optical train configured to focus light;
providing a variable aperture operatively associated with the at least one optical element; the variable aperture being placed in the optical train at an image plane and comprising mask settings for shielding portions of the light;
providing an imager;
providing at least one processor operatively connected to the variable aperture and imager; the at least one processor configured to control the passage of the light through the variable aperture;
selectively masking portions of light using the mask settings of the variable aperture;
obtaining image results using the settings;
comparing image results obtained by the mask settings, and
determining the mask settings that provides the optimal image results.

2. The method of claim 1 wherein blur effects related to atmospheric perturbations affecting image quality are mitigated and wherein the method further comprises:
providing a spatial light modulator positioned in the optical train and operating to modulate the phase of a light beam spatially; the spatial light modulator being placed in a Fourier plane of the system;
forming a coordinated pair of correction signals applied to a variable aperture of an optical correction system and a spatial light modulator, the variable aperture allowing variable amounts of light to pass therethrough and
assessing feedback from an imager of light passing though the variable aperture and spatial light modulator using the at least one processor; the at least one processor assigning current settings to the variable aperture and spatial light modulator based upon results of current and/or previous settings of the variable aperture and spatial light modulator.

3. The method of claim 2 wherein the step of selectively masking portions of light using mask settings comprises using first mask settings for shielding portions of the light and second mask settings for selectively sampling portions of the light that would have passed through the first mask settings.

4. The method of claim 3 wherein the opening for entrance light enables the entrance of a plurality of light wave fronts arising from an object scene; the plurality of light wave fronts being capable of forming an image at the image plane; the plurality of light wave fronts passing through the plurality of optical elements that focuses the light wave fronts onto the image plane; the first mask settings of the variable aperture operating to shield portions of the light wave fronts and the second mask settings operating to selectively mask portions of the light wave fronts that would otherwise pass through the first mask setting; and wherein the imager is configured to collect the wavefronts; and wherein the method further comprises providing a wavefront corrector and a controller algorithm operatively associated with the at least one processor; the at least one processor configured to control the passage of light through the variable aperture by:
selecting one of plurality of first mask settings and its associated second mask settings;
obtaining a sequence of intermediate sample image results using the settings;
comparing image results obtained by the respective mask settings,
determining-an optimal wavefront corrector correction for reducing the effects of turbulence currently present,
applying the correction setting to the wavefront corrector; and collecting a full frame image using settings corresponding to the optimal first mask setting and wavefront correction setting determined.

5. The method of claim 3 wherein the second mask settings comprise a sequence of circular second mask settings of different diameters that are sequentially implemented and wherein the images are collected and analyzed for image clarity to determine the optimal selection of the next first mask setting for turbulence currently present.

6. The method of claim 4 wherein the wavefront corrector comprises a plurality of settings, the plurality of settings comprising piston adjustments that adjust a sequence of deformable mirror pistons by performing fluctuations of the current choice of piston settings.

7. The method of claim 4 wherein the first mask settings are annular and the wavefront corrector is controlled by the at least one processor based upon the results obtained using previous settings of the variable aperture and wavefront corrector.

8. The method of claim 4 wherein the wavefront corrector comprises a spatial light modulator operatively associated with the at least one processor, and wherein light is passed through the variable aperture using a sequence of second mask settings to collect and analyze a sequence of sub-aperture images, and wherein the at least one processor operates to compare the results obtained by the image capture device for the sequence of sub-aperture images using pattern matching to detect angle of arrival offsets between different images collected through different portions of the first mask setting to provide a wavefront tilt correction solution for the spatial light modulator.

9. The method of claim 4 wherein the plurality of optical elements comprises at least one lens operatively associated with the variable aperture such that the light passes through at least one lens before entering the variable aperture and wherein the first plurality of mask settings comprise a plurality of annular masks settings, each annular mask setting selectively masking portions of the light, allowing light to pass in the shape of an annulus that permits the maximum angular frequency response of the system.

10. A method of mitigating blur effects related to atmospheric perturbations affecting image quality in an imaging system comprising:
forming a coordinated pair of correction signals applied to a variable aperture of an optical correction system and a spatial light modulator, the variable aperture being positioned in the optical train in a real image plane of the entrance pupil and allowing variable amounts of light to pass therethrough and the spatial light modulator being positioned in the optical train and operating to modulate the phase of a light beam spatially; the spatial light modulator being placed in a Fourier plane of the system;
assessing feedback from an imager of light passing through the variable aperture and spatial light modulator using at least one processor; the at least one processor assigning current settings to the variable aperture and spatial light modulator based upon results of current and/or previous settings of the variable aperture and spatial light modulator.

11. The method of claim 3 wherein the imager has a method for producing a sub-aperture image containing at least one region of interest having a designated point, and whereby by drawing a vector from a predetermined point on the periphery of the sub-aperture image to the designated point a vector having a magnitude and direction is produced for each sub-aperture image of the associated first mask setting, the vector magnitude and direction being utilized by the at least one processor as feedback for control of the variable aperture and spatial light modulator to improve image quality, and wherein the at least one processor is configured to use the second mask settings associated with the first mask settings to create sub-aperture frames comprising a different area within the annulus of light passed by the associated first annular mask setting, and wherein at least one processor is configured to select a region of interest in the sub-aperture frames, compare each sub-aperture frame to the other sub-aperture frames using pattern matching and perform vector generation based upon a vector generated from the periphery of the sub-aperture frame to a point in the region of interest.

12. The method of claim 1 wherein the variable aperture is controlled by a first controlling algorithm on the at least one processor and wherein the method further comprises providing a spatial light modulator controlled by a second controlling algorithm on the at least one processor and a feedback control circuit to test the clarity of the images or pattern matching offsets between sub-aperture images being produced by the current settings of the optical adjustments of the variable aperture and spatial light modulator.

13. The method of claim 6 wherein the first mask setting is annular and the wavefront corrector piston adjustment settings are set by the at least one processor based upon the results obtained from analysis of multiple test images collected under previous settings of the variable aperture and wavefront corrector and a plurality of test images at the range of approximately $1/5000^{th}$ to 1/500 th second are collected and used to obtain information about the turbulent effects of the atmosphere, and subsequently a longer exposure image in the range of 1/1000 th to 1/50 of a second is obtained using updated settings of the wavefront corrector and the previous setting of the variable aperture.

14. The method of claim 3 wherein the step of determining the mask settings that provides the optimal image results comprises determining a first mask setting that provides an optimal image result wherein the first masks are annular masks.

15. The method of claim 10 further comprising:
providing an opening for entrance of light; the light being capable of being formed into an image;
providing a plurality of optical elements in an optical train configured to focus light; the variable aperture being operatively associated with the at least one optical element; the variable comprising mask settings for shielding portions of the light;
providing an imager; the at least one processor operatively connected to the variable aperture and imager; the at least one processor configured to control the passage of the light through the variable aperture;
selectively masking portions of light using the mask settings of the variable aperture;
obtaining image results using the settings;
comparing image results obtained by the mask settings, and
determining the mask settings that provide the optimal image results.

16. The method of claim 10 wherein the variable aperture comprises a digital micro-mirror device and wherein the variable aperture comprises a main central obscuration zone of the main annular aperture, and wherein overlapping circular areas between the inner and outer circles of the main annular aperture produce sub-aperture frames to be tested in separate image frame captures, and wherein each sub-aperture frame produced comprises a region of interest selected by at least one processor, and wherein the at least one processor sequentially cycles through the regions of interest to sequentially produce improved images of different portions of the complete system field of view wherein each sub-aperture frame set generates vectors based upon pattern matching, and wherein the vector information is processed by the at least one processor to generate correction signals to the variable aperture and spatial light modulator to improve image quality for each region of interest, and wherein the vectors based upon pattern matching by the at least one processor are used to compute the phase model of the phase correction, which is passed to an adaptive phase controller which translates this information into a phase model that is then set on the spatial light modulator, and wherein the at least one processor operates to direct a variable aperture controller to control selection of an annular aperture mask.

17. A method of reducing the effects of turbulence in an imaging device comprising:
  (a) selecting one of a series of aperture masks;
  (b) setting phase modulation adjustment of a spatial light modulator to neutral
  (c) capturing an image using an imager;
  (d) creating a vector set of image quality metrics from the captured image;
  (e) determining the suitability of the mask selected;
  (f) repeating steps (a) though (e) until an optimum aperture mask is selected based upon maximizing resolution;
  (g) storing the value of the annular ring width of the optimum annular aperture mask as a variable DR, where (D2−D1)/2 =DR and D2 is the outer diameter and D1 is the inner diameter of an annular aperture mask;
  (h) using the optimum annular ring width DR, and based on the available choices of masks satisfying this width criterion, selecting the main annular mask based on a choice of one of a group of annular mask sets satisfying this criteria;
  (i) selecting a region of interest in the image frame containing a feature of interest; the region of interest being obtained by cycling through the complete image while focusing on active areas exhibiting changing characteristics from full frame to full frame;
  (j) selecting a plurality of sub-aperture masks associated with the main annular mask determined in step (h); each of the plurality of sub-aperture masks defining a sub-aperture image containing the same region of interest;
  (k) for each sub-aperture image, performing pattern matching of the selected sub-aperture image by computing the relative shift in position of the selected sub-aperture image region of interest in each sub-aperture image, and generating a vector defining the location of the main feature of interest in each of the sub-aperture images, each vector originating from a predetermined location on the edge of each sub-aperture image frame and pointing to the centroid of the dominant image feature in each sub-aperture frame; and
  (l) computing a wavefront correction.

18. The method of claim 1 wherein the at least one processor is configured to control the passage of the light through the variable aperture by:
  (a) selecting one of a series of aperture masks;
  (b) setting phase modulation adjustment of a spatial light modulator to neutral
  (c) capturing an image using an imager;
  (d) creating a vector set of image quality metrics from the captured image;
  (e) determining the suitability of the mask selected;
  (f) repeating steps (a) though (e) until an optimum aperture mask is selected based upon maximizing resolution;
  (g) storing the value of the annular ring width of the optimum annular aperture mask as a variable DR, where (D2−D1)/2=DR and D2 is the outer diameter and D1 is the inner diameter of an annular aperture mask;
  (h) using the optimum annular ring width DR, and based on the available choices of masks satisfying this width criterion, selecting the main annular mask based on a choice of one of a group of annular mask sets satisfying this criteria;
  (i) selecting a region of interest in the image frame containing a feature of interest; the region of interest being obtained by cycling through the complete image while focusing on active areas exhibiting changing characteristics from full frame to full frame;
  (j) selecting a plurality of sub-aperture masks associated with the main annular mask determined in step (h); each of the plurality of sub-aperture masks defining a sub-aperture image containing the same region of interest;
  (k) for each sub-aperture image, performing pattern matching of the selected sub-aperture image by computing the relative shift in position of the selected sub-aperture image region of interest in each sub-aperture image, and generating a vector defining the location of the main feature of interest in each of the sub-aperture images, each vector originating from a predetermined location on the edge of each sub-aperture image frame and pointing to the centroid of the dominant image feature in each sub-aperture frame; and
  (l) computing a wavefront correction.

19. The method of claim 16 wherein the at least one processor computes the phase model of the phase correction by computing the average phase adjustment utilizing the mean phase using the coefficients A0 and C0 from the inner and outer radius phase models to obtain an average phase around the inner diameter and outer diameter of the annular region using the following two formulas:

$$\Phi_{inner} = A0 + A1\cos(1\theta) + A2\cos(2\theta) + A2\cos(3\theta) + A4\cos(4\theta) + B1\sin(1\theta) + B2\sin(2\theta) + B3\sin(3\theta) + B4\sin(4\theta)$$

$$\Phi_{outer} = C0 + C1\cos(1\theta) + C2\cos(2\theta) + C2\cos(3\theta) + C4\cos(4\theta) + D1\sin(1\theta) + D2\sin(2\theta) + D3\sin(3\theta) + D4\sin(4\theta)$$

where θ is the azimuthal coordinate, and wherein the tilt created by the average phase adjustment average will be zero, and wherein both the sin(1θ) and cos(1θ) terms in both the mean and delta terms is generated by a tilt that is constant over the annulus and the sin(1θ) and cos(1θ) terms are eliminated when removing the mean, and wherein the constants A0 through D4 are determined by completing the steps of claim 16, and where the variables $\Phi_{inner}$ and $\Phi_{outer}$ are only placeholders for the actual model of phase that is estimated given by, $$\Phi(\theta, \delta) = \Phi_{mean}(\theta) + \delta X_{delta}(\theta)$$

and wherein instead of using the inner and outer edge phases, the phase about the central ring of the annulus is modeled, over which the mean phase is modeled:

$\Phi_{mean}=(\Phi_{outer}+\Phi_{inner})/2$ and the radial component of the phase perturbation is based on the variable:

$X_{delta}=(\Phi_{outer}-\Phi_{inner})/2$ and wherein the use of these functions requires a coordinate system in the system annular aperture, such that the radial variable $\delta$ has been introduced such that $\delta=-1$ along the inner radius and $\delta=+1$ along the outer radius, $\theta$, is the azimuthal coordinate, and wherein the models of the mean and delta terms may be written as:

$\Phi_{mean}=E2\cos(2\theta)+E3\cos(3\theta)+E\propto\cos(4\theta)+F2\sin(2\theta)+F3\sin(3\theta)+F4\sin(4\theta)$ $X_{delta}=G0+G2\cos(2\theta)+G3\cos(3\theta)+G4\cos(4\theta)+H2\sin(2\theta)+H3\sin(3\theta)+H4\sin(4\theta)$ whereby to use the 13 phase model coefficients E2, E3, E4, F2, F3, F4, G0, G2, G3, G4, H2, H3, and H4, the measured phase shift of pixels are first translated into phase form wherein IFOV denotes the instantaneous field of view of a single pixel in radians, and a relative shift of Vi' pixels will equate to an angular shift of Ai'=IFOV*Vi', and if given an angular shift in the radial (delta) direction, then over a space $\delta$ in half-width between the center of the annulus and the edge, for an angle Ai', the shift that must take place in the wavefront will be $\delta$*Ai' which translates into a phase shift of $\delta$*Ai'*k, where k is the wavenumber, k=$2\pi/\lambda$ and the radial component of each sample tilt vector is computed using Ai'($\rho$)=$\rho$i·Ai' to represent the scalar product between the angular vector and the corresponding radial unit vector pointing from the system aperture center to the center of the sub-aperture for the "i"th sub-aperture image; and $$\overline{V} = \sum_{i=1}^{i=I} V_i / I$$

where $\overline{V}$ represents the mean vector, $V_i$ represents the vector for each sub-aperture image and I is the number of sub-aperture images, and wherein the mean vector is subtracted from vectors $V_i$ to produce the perturbation vectors $V_i'$:

$V_i'=V_i-\overline{V}$ and wherein that the sum of the perturbation $V_i'$ vectors is equal to zero, and wherein the perturbation vector information, $V_i'$, is used by the at least one processor to compute the phase model of the phase correction and the conjugate of this information is passed to an adaptive phase controller which translates this information into a phase model that is then set on the spatial light modulator and the at least one processor operates to direct an adaptive aperture controller to cause the variable aperture to select the complete annular aperture mask.

20. The method of claim 1 wherein the image of a scene of interest cannot be seen clearly by an unaided telescopic imager due to the presence of turbulence, and wherein the variable aperture comprises a programmable digital mirror device controlled by micro-electro-mechanical pivoting members which allow variable amounts of light to pass therethrough according to predetermined programmable mask settings.

* * * * *